US008548909B1

(12) United States Patent
Snow et al.

(10) Patent No.: US 8,548,909 B1
(45) Date of Patent: Oct. 1, 2013

(54) METHOD AND SYSTEM FOR BUILDING AN INTERNET PORTAL

(75) Inventors: Harvey Snow, Burbank, CA (US); Patrick Law, Los Angeles, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 2287 days.

(21) Appl. No.: 10/335,561

(22) Filed: Dec. 31, 2002

Related U.S. Application Data

(60) Provisional application No. 60/381,523, filed on May 17, 2002.

(51) Int. Cl.
*G06Q 40/00* (2012.01)
(52) U.S. Cl.
USPC ............. 705/42; 707/705; 707/707; 715/200; 715/201; 715/700; 715/762
(58) Field of Classification Search
USPC ................... 705/42; 707/705, 707; 715/200, 715/201, 700, 762
See application file for complete search history.

(56) References Cited

U.S. PATENT DOCUMENTS

| | | | | |
|---|---|---|---|---|
| 5,940,843 | A | * | 8/1999 | Zucknovich et al. ......... 715/210 |
| 5,979,757 | A | * | 11/1999 | Tracy et al. .................... 235/383 |
| 6,301,567 | B1 | * | 10/2001 | Leong et al. ..................... 705/33 |
| 7,904,333 | B1 | * | 3/2011 | Perkowski .................... 705/14.4 |
| 2002/0055909 | A1 | * | 5/2002 | Fung et al. ....................... 705/42 |
| 2003/0229900 | A1 | * | 12/2003 | Reisman ......................... 725/87 |

OTHER PUBLICATIONS

West et al. Unified Theory of Content Management Targest Users. Information WEek; Oct. 30, 2000; 810; ProQuest Central. p. 104.*
PR Newswire. Microsoft to Acquire NCompass LabsStrategic Addition of Web Content Management System Extends Microsoft.Net Enterprise Servcer Family. New York. Apr. 30, 2001:1. ProQuest document.*
M2 Presswire. Lynx Technology: Lynx announces managed services and hosting centre. Coventry. Mar. 16, 2001: 1. ProQuest document.*

* cited by examiner

*Primary Examiner* — Muriel Tinkler
(74) *Attorney, Agent, or Firm* — John M. Harrington; Johnson, Marcou & Isaacs, LLC

(57) ABSTRACT

A method and system for building an Internet portal provides a portal toolkit platform consisting at least in part of a portal application server and a web server associated with the portal toolkit platform that is accessible by at least one end user. A business is allowed to access the portal application server and fill one or more content management templates from a selection of content management templates governing content elements to be presented to end users via the website server. When an end user accesses the website server, content governed by the template is presented for the end user by the portal application server via the web server. The business can populate a database with content and populate the web server, for example, with a set of images, HTML files, and other assets such as PDF files and build an Internet portal on top of the toolkit as an approach to integrating transaction systems. The portal toolkit platform provides internationalization, content management, scalability and performance, personalization, navigation, and allows legacy systems to be quickly leveraged.

34 Claims, 51 Drawing Sheets

| Tag type | Explanation |
|---|---|
| Global Phrase | This tag gives content authors the ability to insert global phrases into the content. For example, if an author wants to insert the banks' phone number into a document, and the author wishes to insure that a change in that phone number will not affect the content, this tag can be used. |
| Image | This tag builds the image tag inside of content. This protects the content author from needing to understand any details about where an image is stored. It further allows the inclusion of an image to be protocol neutral. I.e. if the frameset is HTTP, the image will be an HTTP image, and if the frameset is HTTPS, the image will be HTTPS. |
| Link | The author can put in a link. This protects the author from understanding the internals of an HREF tag. It allows for load balancing algorithms to be resolved at runtime. |
| Menu | This allows authors to insert menus into their documents. |

Fig. 16

| Verb | Behavior of the verb | Conversions and precedence rules |
|---|---|---|
| CHOOSE <content\|contentlyst>FROM <expression> | The CHOOSE is not an operator, but a statement. expression must be a list. content and contentList are reserved words where content is a String and contentList is a String[]. There should be exactly one CHOOSE statement in a rule definition. This statement defines whether a list of String or a String will be returned. It also restricts the return value(s) to be a subset of the values within the list returned by expression. | |
| RETURN | The RETURN is a statement. The RETURN statement terminates the execution of the rule immediately. The value returned by the rule is the value in the content or contentList variable as described in the CHOOSE statement. Since a RETURN statement will cease execution of the rule, a CHOOSE statement must be executed before any RETURN statement is reached and executed. | |
| IF-ELSE | The IF-ELSE is a conditional statement. The IF-ELSE statement is similar to JAVA or C if-else statement. | The express of an IF statement always evaluates to a Boolean type. |
| GET <expression1> FROM <expression2> | For each value in expression1, if the value is found in expression2 value list then return it as one of the return value(s). This operation will return a list. | |

FIG. 30a

| | | |
|---|---|---|
| | expression1 can be a primitive or a list.<br>expression2 must be a list.<br>Expression1 and expression2 must have the same type except for expression1 can be of Integer type and expression2 of Float type respectively or vice-versa.<br>Example:<br>Integer x[] = GET [2, 3, 4] FROM [5, 4, 3]; //x = [3, 4]<br>Float y[] = GET 2.0 FROM [2.0, 3.1, 4.2]; //y = [2.0]<br>List a = GET "c" FROM ["a", "c", "d", "c"]; // a = ["c"] | |
| REMOVE<br><expression1><br>FROM<br><expression2> | For each value in expression1, if the value is found in expression2 value list then remove it from expression2 list of values, the remaining values in expression2 list is the result of the operation.<br>This operation will return a list.<br>expression1 can be a primitive or a list.<br>expression2 must be a list.<br>expression1 and expression2 must have the same type except for expression1 can be of Integer type and expression2 of Float type respectively or vice-versa. | |

FIG. 30b

| | | |
|---|---|---|
| | Example:<br>Integer x[] = REMOVE [2, 3, 4] FROM [5, 4, 3];<br>// x = [5]<br>Float y[] = FEMOVE 2.0 FROM [2.0, 3.1, 4.2]; //<br>y = [3.1, 4.2]<br>List a = REMOVE "c" FROM ["a", "c", "d",<br>"c"]; // a = ["a", "d"] | |
| RANDOM CHOICE FROM <expression> | This operation will return a random element among the elements of expression.<br>expression must be a list.<br>Example:<br>String s = RANDOM CHOICE FROM ["a", "b", "c", "d"];<br>// s = "a" or "b" or "c" or "d" | |
| EXECUTE RULE <expression1> [WITH <expression2>] | This operation will execute the rule <expression1> and usually the result of this operation will be assigned to a variable.<br>expression1 must be of type String.<br>Example:<br>List product AdList = EXECUTE RULE "product AdListRule";<br>To prevent the Rule Engine from going into an infinite loop, rules already on the stack cannot be called again. Let say we have rule A calling rule B which in turn call rule C, then rule C will not be allowed to call rule A, B or C, rule B will not be able to call rule A or B and rule A cannot call rule A.<br>The WITH <epxression2> is optional. If the | |

FIG. 30c

| | | |
|---|---|---|
| | EXECUTE RULE has a WITH clause, then the expression2 must be a list. expression2 is an input list to the rule. Within the rule the input list can be accessed through the reserved variable 'InputList'.<br>Example:<br>Rule A:<br>List 1 = EXECUTE RULE "B" WITH ["a", "b", "c"];<br>Rule B:<br>List t = RMOVE "a" FROM InputList; //t = ["b", "c"] | |
| <expression1><br>CONTAINS<br>MEMBER<br><expression2> | This operation checks if the value(s) of expression2 is present in the expression1 list of values.<br>This operation will return a Boolean value of true or false.<br>expression1 must be a list.<br>expression2 must be a primitive element or a list.<br>Example:<br>[1, 2, 3] CONTAINS MEMBER 2; // returns true<br>["a", "b"] CONTAINS MEMBER ["b", "d"]; // returns false<br>[1.0, 2.0, 3.5] CONTAINS MEMBER [3.5, 1.0]; // returns true | |
| <expression1><br>CONTAINS<br>TEXT<br><expression2> | This operation checks if the expression2 string value is a substring of expression1 string value.<br>This operation will return a Boolean value of true or false. | |

FIG. 30d

| | expression1 and expression2 must both be of type String.<br><br>Example:<br><br>"Hello World" CONTAINS TEXT "World"; // returns true<br><br>"Hi there!" CONTAINS TEST "HI" // returns false | |
|---|---|---|

FIG. 30e

Fig. 45 citigroup

Portal Toolkit Generic structured content Input form

[Help]

Business: [Argentina ▼]   Content ID: [Checking 12 ▼]   new ID ☐

Language: [English ▼]

Content Type: [Products and services ▼]

| Teaser text: | |
|---|---|
| Link Information: | Link text:<br>[    ]<br>Image ID ☐<br>[    ] |
| Short Descryption: | |
| Long descryption: | |
| Detail: | |

METHOD AND SYSTEM FOR BUILDING AN INTERNET PORTAL

CROSS REFERENCE TO RELATED APPLICATION

This application claims priority to applicant's application having U.S. Ser. No. 60/381,523 filed May 17, 2002, incorporated herein by this reference.

FIELD OF THE INVENTION

The present invention relates generally to the field of electronic commerce, and more particularly to the tools necessary to build an Internet portal, such as an Internet financial portal.

BACKGROUND OF THE INVENTION

An Internet portal is a place on the Internet where people are able to use a rich range of services. An Internet financial portal is an Internet portal that is devoted to offering financial services to various communities. The Internet financial portal can enable financial institution customers to better manage their finances, for example, by performing transactions, obtaining information, and performing "what-if" analyses. Further, the creation of such portals can present key business opportunities for a financial institution, such as converting prospects into customers, cross-selling current customers a wide range of services, enhancing the corporate image by branding the financial institution's assets under one umbrella, enhancing customer service and reducing operating cost by creating a robust self service area. There is a present need for a global financial institution to be able to create Internet financial portals for its entities, such as consumer banking Internet portals.

SUMMARY OF THE INVENTION

It is a feature and advantage of the present invention to provide a method and system for building an Internet portal, such as an Internet financial portal, that allows business units of a financial institution to populate a database with content and to populate a web server with a set of images, Hypertext Markup Language (HTML) files, and other assets such as Portable Document File (PDF) files.

It is another feature and advantage of the present invention to provide a method and system for building an Internet portal, such as an Internet financial portal, that is supported by a regional data center of the financial institution with hardware and operational support after deployment of the portal by a business unit of the financial institution.

It is an additional feature and advantage of the present invention to provide a method and system for building an Internet portal, such as an Internet financial portal, that enables business units of a financial institution to build the Internet portal on top of a toolkit as an approach to integrating transaction systems, such as a consumer banking transaction system, a brokerage system, an alert notification system, or a credit card system.

It is a further feature and advantage of the present invention to provide a method and system for building an Internet portal, such as an Internet financial portal, that provides internationalization, content management, scalability and performance, personalization, and quickly leveraging current production systems or legacy systems, as well as navigation.

It is a further feature and advantage of the present invention to provide a method and system for building an Internet portal, such as an Internet financial portal, that utilizes various combinations of vendors' tools to assist in the creation of such a portal but provides numerous additional features, aspects, and functionality not previously available.

To achieve the stated and other features, advantages and objects, the method and system for building an Internet portal according to an embodiment of the present invention provides a portal toolkit platform consisting at least in part of a portal application server and includes a web server associated with the portal platform accessible by at least one end user. A business is allowed to access the portal application server and fill one or more content management templates from a selection of content management templates governing content elements for the web server to be presented for the business by the portal application server. When an end user accesses the website server, content governed by the template is presented for the end user by the portal application server via the web server. The portal toolkit platform provides runtime support for multiple businesses, provides runtime support for multiple end user languages, allows each business to create or change information architectures, provides the business a default information architecture, allows the business to integrate an on-line financial transaction engine, supports multiple businesses on a single portal application server, and allows the business to create or change a look and feel, a default look and feel. Further, the portal toolkit platform via, for example, the portal application server provides the business an online financial account opening tool, a site search tool, end user customization, third-party content feeds, plug-in adapters to multiple industry tools, market feeds, utilization of MIS, support of multiple end user client devices, and end user data aggregation.

In a content management aspect of the present invention, the portal toolkit platform via, for example, the portal application server allows the business to manage content elements consisting of one or more of flat HTML files on the website server, flat files on the portal application server, images on the web site server, PDF files on the website server, and database content in a portal application server database. In presenting content for the end user, the portal toolkit platform via, for example, the portal application server allows reuse of a pre-existing technology infrastructure with client side aggregation and control of an information architecture and content by the content.

In an embodiment of the present invention, content is presented by computer programs without handcrafting web pages by a programmer. Further, the portal toolkit via, for example, the portal application server allows integrated single end user sign-on and session coordination. Content is controlled according to one or more of end user business, end user language, and end user community. The end user's membership in a community is established at least in part through stored meta-data attributes found in a profile object for the end user. The content is served by either or both of the portal application server and by other servers and is associated with one or both of the end user and particular pages.

The content that is presented for the end user is stored in user tables of the portal application server. Further, the presented content can be associated with a description of a particular product. According to an embodiment of the invention, the content is presented by either or both of server side assembly and client side assembly.

An embodiment of the invention enables businesses to build on top of a toolkit as an approach to integrating transaction systems, such as a consumer banking transaction system, a brokerage system, an alert notification system, or a credit card system. Those types of transaction and information systems provide the business entity with the opportunity, for example, to service accounts while reducing the cost of human interaction, and also allows the business entity to cross-sell and up-sell customers to other products. In addition, there is a general advantage of Internet portals to enable the business entity to acquire new customers. Key aspects of the method and system for an embodiment of the present invention include, for example, internationalization, content management, scalability and performance, personalization, and quickly leveraging current production systems or legacy systems, as well as navigation.

The present invention provides a method and system for building an Internet portal, such as an Internet financial portal, an aspect of which is selecting particular Internet domains as the space in which to create transactional financial portals. An embodiment of the invention addresses a number of business requirements, such as employing one particular set of hardware to support multiple businesses. The communication means for the various businesses is likely to be within multiple languages which require many different ways to represent and paint characters on a display screen. For example, Chinese characters read from right to left; Hebrew is read from right to left; but English and Spanish are read from left to right. An important aspect of the present invention is the employment of one piece of code that is written essentially for the enterprise and is able to service all of these character sets and all of these languages.

Another core feature of an embodiment of the present invention involves, for example, quickly leveraging current production transactional systems. For example, if a consumer banking system is already in production, an embodiment of the invention enables integration of the particular consumer banking system in order to get to market as quickly as possible. Likewise, if other types of systems, typically called legacy systems, are already in place with some type of web interface, instead of re-writing those systems, this aspect of the present invention enables getting those systems into the portal and in front of the customer as quickly as possible by leveraging the solutions that were already current in the enterprise.

An additional aspect of the present invention provides personalization in which a set of rules is employed from a database and managed from a content management system in order to match content against a user profile. For example, if the enterprise wishes to cross-sell a user on a product, one rule can be 'Do not sell a user a product that the user already owns.' This aspect employs a rule engine that understands the product set that a user has and integrates that rule engine with a profile, for example, from the consumer banking institution. The method and system for an embodiment of the present invention involves, for example, management of content such that the content is very efficiently served by the server, which enables scalability and low cost for hardware. Further, the content is refreshable without recycling the server, so that the server can be centrally told that new content is waiting for it without causing any customer down time from recycling the server and without losing resources on the server by taking the server out of commission. Thus, a content management system for an embodiment of the present invention enables high performance and high availability for content transitions through the content management system. Further, the variables upon which a rule is based can be introduced at runtime with no code change to the rule engine; if a new system is integrated that must make a rule based on a new element stored in the user's profile, that new element can immediately be used by the rule engine without any configuration or code changes to the system.

The information architecture of the portal site for an embodiment of the present invention is extremely flexible, both in terms of the way in which a site is constructed and in terms of the ability of the site to make rapid changes without making code changes. Towards that end, an embodiment of the invention involves the creation of an array of navigation software, so that the database itself can contain the component parts of the portal. This aspect avoids a necessity of replacing whole pages if one piece of the information architecture is replaced. Typically, in designing a website, a considerable amount of software is written in order to support the information architecture. Within the international portal toolkit (sometimes also referred to herein as "portal toolkit" or "toolkit" or "IPT") of an embodiment of the present invention, there is no software that supports any particular information architecture, regardless of whether the information architecture is drawn from the database, which means that the information architecture is controlled by the content rather than the code.

As previously explained, key aspects of an embodiment of the present invention include, for example, internationalization, content management, scalability and performance, personalization, and quickly leveraging current production systems or legacy systems. In the internationalization aspect, a data structure is created such that multiple businesses are supported, and each business is allowed to have multiple languages. Thus, when a piece of content is served, a content identification (ID) can be associated with a number of businesses or a number of languages. For example, all of the banking links that are produced in the international portal toolkit for an embodiment of the invention come from one set of content, which is in the database, so the display content is the only thing that changes in accordance with business or language.

The content management aspect of the present invention includes, for example, an international content management system. A robust object, referred to as content cache, is created in the infrastructure, so that content can be refreshed at run time without recycling the server and in order to serve content extremely efficiently. A unique aspect of the content cache of the present invention is that the cache is based on an object or entered paradigm instead of a table paradigm or an HTML page paradigm. Thus, when a cache entity is defined, the cache is told that the particular object will be cached. That is an advantage in writing a piece of software, for example, with products and services modules in the international portal toolkit of the present invention. A module is used to encapsulate, for example, some type of business function. Therefore, when a channel is provided for products and services, a products and services module is written. In an embodiment of the present invention, within the products and services module, a cache object is written which encapsulates the entire data associated with presenting a products and services page. An advantage of this feature at run time is that all of the data is ready and marshaled, it is not necessary to search for the data. Another advantage of this feature is that if something is changed on the products and services page, even if it is in another piece of database elsewhere, that object alone can be refreshed at run time.

Another important aspect of the content cache for an embodiment of the invention is that when the cache is refreshed, there is absolutely no run time impact to customers, because the cache is invented through a swapping mechanism. Typically, the entire system is slowed to a crawl while content is being refreshed, and once that operation is completed, the system speeds up again. However, the content management system for an embodiment of the present invention enables the cache to be refreshed in real time while the system is up, with absolutely zero customer impact, and the system does not slow down at all. In addition, the content cache for an embodiment of the present invention knits various functions that can be boiled down to only a few functions, which speaks to the scalability as well. A further aspect of the present invention, in terms of cache and content, which supports the legacy websites as previously mentioned, is referred to herein as the international portal toolkit "Light" module (or "IPT Light" module) that allows for the robust caching of legacy websites. The IPT Light module operates on a very similar paradigm to the content cache. A major difference is that older websites can be imported wholesale in order to be able to service them. When those websites are imported, use is made of session management and other important features and requirements of the international portal toolkit for an embodiment of the present invention that are not necessary for simply serving them as flat web pages.

An embodiment of the present invention involves key features of the profile object, which is the tool that is used in order to understand what content to serve to which customer. For example, the profile object is very tightly coupled to understanding the products that a banking or financial institution customer has by creating an account summary object inside the profile which marries the products that are offered to the balances of the customer, so that rules can be made around the customer. Thus, the financial resources of the customer are tightly coupled to the personalization engine which makes it possible to make rules based on the financial positions of a customer. These rules are made to the content management system and inserted into the database. This is done in run time without the necessity of restarting the system or writing, code. The products that a customer holds are integrated with the personalization engine with the products and services channel in order to allow cross sales to take place efficiently. For example, in an embodiment of the present invention, a rule can provide that if a customer has twice as much money in his checking and savings accounts combined as he owes on his credit card, the customer is sent a message that it would be a good idea to pay off the credit card. This rule is supported automatically by having the personalization engine coupled with the account summary object. For another example, if the system knows that a customer has previously written overdrafts, from information imported into the profile object, the customer can be easily sold customer overdraft protection. This rule can done in run time, if the business decides it is an important business rule, so there are two approaches to the personalization aspect.

The aspect of quickly leveraging websites involves, for example, the IPT Light module already mentioned, which integrates legacy flat websites with all of the other features of the portal, such as session management, frame management and the like. An embodiment of the invention also provides a comprehensive framework for what is referred to as 'client side assembly'. Generally, portals perform what is called 'service side assembly', such as scraping screens and pouring the scraped screens into a single frame and presenting that single frame to users. That is typically a very expensive technology, especially when integrating with transaction engines that have various types of security features to disable that sort of activity. Therefore, an embodiment of the present invention provides an infrastructure that simply allows a current production or legacy website that is to be incorporated into the portal to set inside the frame of the portal.

The navigation aspect for an embodiment of the present invention provides navigation objects that draw from a database structure in order to support the manufacture of links, menus, images, and global phrases. All of those features are wired into the personalization engine so that one user can be shown a customer image, another user can be shown a financial institution image, and another customer can be shown a standard bank customer image. The navigation tool framework is approachable, for example, from two directions. Within an Information Technology (IT) developer's code, objects can be used, such as objects called 'Link Maker', 'Form Maker', 'Image Map Maker', 'Image Maker', and 'Menu Maker'. In an embodiment of the present invention, within a piece of database content, a special tag is placed which produces, for example, a menu, a link, an image, or a global phrase. That is an extremely important business tool that enables the businesses themselves to manage what menus appear on a page, what images appear on a page, and what links appear on a page, instead of requiring an HTML program or a coder to go in and make changes.

A customer or a prospect utilizes a portal built according to the method and system for an embodiment of the present invention, for example, by clicking on a link or typing a Universal Resource Locator (URL) into a browser of the customer's computing device. The link or URL takes the customer to the home page of the portal on which the customer is able to see a menu that may be customized somewhat, based on the cookies that are presented to the system that represent the state that was preserved on the client computing device. A link to a login page may be displayed, and if the user is a customer, the customer may be likely to click on the login page. The customer logs in and immediately sees a home page, for example, with account information and ads which may be targeted for the customer based on the personalization rules previously described. In addition, the menu is targeted to the customer.

For example, the customer can be presented with a credit card link if the customer has a credit card, or if the customer does not have a credit card, the customer may not be presented with a credit card link. On the other hand, at that point, a particular business may take the opportunity to present the customer with a credit card link every time the customer logs in regardless of whether or not the customer has a credit card. If the customer does not have a credit card it can be simply a description of the credit card product, and if the customer does have a credit card, the customer can be presented with a link to the transaction system that displays information about the customer's credit card. The customer can then proceed, for example, to obtain quotes or news or other kinds of typical portal activity. The customer can also perform, for example, banking transactions, brokerage transactions, or deal with the customer's credit card accounts, and the like. The customer signs off when finished.

Additional objects, advantages and novel features of the invention will be set forth in part in the description which follows; and in part will become more apparent to those skilled in the art upon examination of the following, or may be learned from practice of the invention.

BRIEF DESCRIPTION OF THE DRAWINGS

FIG. 16 is a table the shows examples of tag types for an embodiment of the present invention;

FIGS. 30a-30e is a table that illustrates examples of verbs utilized for an embodiment of the present invention;

FIG. 45 shows a sample generic structured content input form for an embodiment of the present invention;

DETAILED DESCRIPTION

Figure 1:
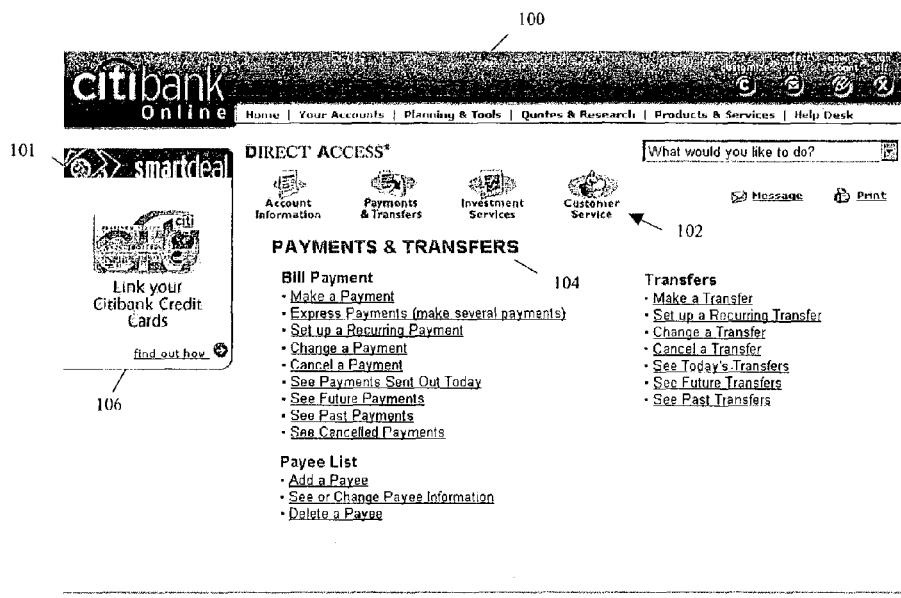
FIG. 1 shows a sample Graphical User Interface (GUI) screen for an online banking system portal.

In order for a global financial institution that provides consumer-banking services worldwide to attract and retain its large and diverse customer base and distinguish itself from competitors, the financial institution must offer a breadth, depth and quality of services that are unparalleled in its industries. A key component of this strategy is a consumer online Internet banking product that provides, for example, a multi-language, multi-business online banking system offering robust financial transaction capabilities, including account information, bill payment, money transfers, and the like. As the online Internet banking core feature set grows and matures, some financial institution businesses wish to integrate the online banking system with portal servers in their regions. This integration augments the financial transaction capability of the online banking system with other financial products, and with a variety of transaction tools and information provided by the portal. The reasoning behind this decision becomes clear when one understands what an Internet portal really is. Put simply, portals aggregate and present web content. The point of this aggregation is to provide a single point of access to varieties of content that are relevant to the portal's target audience. Of course, the mix of content may also be expected to vary depending on the business goals of the portal host.

Among the most popular sites on the Internet are "horizontal portals." These sites are the original portals of the Internet, and they typically feature a very wide range of content and function. In most cases, they began as search engines and rapidly evolved into 'megaportals,' whose wide focus reflects a business model supported by advertisers who want to sell their products to the largest possible audience. Other successful uses of portal technologies have an extremely narrow focus, but go into much greater detail and operate as 'financial information only portals.' A third type, and the one most relevant for the present discussion, includes 'transaction financial portals.'

Within a financial institution, the underlying portal technology in use tends to vary by business and region. The primary business purposes for a portal integration include customer acquisition, customer retention, and cross-sell. A portal helps businesses to reach these goals by providing them with the ability to offer differing levels of federated services to a variety of end-users. For example, a business portal might offer free real time foreign exchange (FX) information to attract 'visitors' and encourage them to return again and again. Sites that use this tactic effectively are said to be 'sticky.' To induce these visitors to register with the site, a business can provide additional services, for example, free of charge in exchange for e-mail addresses and other contact information. In this way, visitors can become 'friends.' Continuing in this vein, a business can extend offers of preferential rates or special discounts for friends who open a new account with the business. In this way, friends may be transformed into 'customers.' Finally, these customers can be cross-sold additional products or services. Over time, a business can use a portal to attract new customers and deepen relationships with existing customers. To take advantage of this marketing strategy, and to leverage a financial institution brand globally, businesses require a single, baseline portal solution that can be used to integrate any web-based product or service, for example, with the online banking system and other transaction engines into a seamless customer experience. The international portal toolkit (IPT) for an embodiment of the present invention addresses this important need.

FIG. 1 shows a sample Graphical User Interface (GUI) screen 100 for an online banking system portal. The central 'work area' is a frame 102 containing the standard online banking system channels above a 'Payments & Transfers' menu 104. The portal frameset adds top and side frames 106 for branding and navigation. Typically, the content of these frames includes a variety of business-defined menus and "Smart Deals" 101 that are linked to customer profiles. The IPT for an embodiment of the present invention provides, for example, a personalization function in the core IPT product. In the IPT personalization feature, rules are not embedded in the code and are configured with a Content Management (CM) tool. Rules are migrated to production as part of content management releases, and the IPT profile object is integrated with the rule engine, so the rule engine can use profile attributes. Based on a user profile, object types, such as ads, menus, images, links and global phrases (such as customer support telephone numbers), are alterable at runtime. Along with the personalization feature, IPT includes, for example, content modules for search, advertising, and a help channel.

An embodiment of the present invention also provides a "limited implementation" of the IPT, referred to herein as 'IPT Light', that integrates the toolkit's power with existing business driven methods for authoring and managing the marketing content of financial portals. IPT Light accomplishes this goal by minimizing the breadth and depth of file conversion required by the IPT. For example, an existing site built with static HTML files can be integrated with core portal functions without making changes to the static files. Rather than limiting the available options for adding dynamic site content, IPT Light offers a migration path to the IPT. IPT Light leaves in place existing business processes for developing and presenting web content and enhances the ability of a business to leverage the robust infrastructure of the IPT. This means that no significant reengineering of business methods is required to take advantage of attractive IPT features, such as Single Sign-On (SSO) or other customizations, such as real-time market information. Thus, IPT Light offers a simplified solution for using a complex tool set.

The international portal toolkit of the present invention is designed to provide businesses with building blocks for constructing a common gateway, for example, where all financial institution businesses have an opportunity to leverage each other and cross-sell products and services. Businesses can use the IPT to couple the Internet channel with their overall marketing strategies and get those strategies to market quickly and efficiently. The IPT does this by allowing business managers to focus on building the content of their web sites, rather than trying to master the various technologies that are used to enable these sites. To jump start the process, for example, the IPT for an embodiment of the invention provides a reference implementation that emulates the on-line banking system look and feel. A business can use this reference implementation to deliver a rich array of web-based content. Businesses also can choose to make moderate or extensive changes in order to create a customized look and feel that may have greater appeal in their local markets. An aspect of the present invention involves this aspect of a unique look and feel, as well as the various combinations of tools described herein which enable the gateway or portal solution for an embodiment of the present invention.

The IPT for an embodiment of the present invention supports a number of important business goals, such as cross-selling customers a wide range of services, converting prospects into customers, enhancing customer service and reducing operating cost by creating a robust self-service area, and enabling a global financial institution brand. A portal allows a business many opportunities to cross-sell products to its existing customer base. For example, customers who access the site to pay bills can be presented with a variety of 'Smart Deals' 101 that are keyed to their customer profiles. Each offer that is accepted deepens an existing relationship and increases a business's ratio of accounts per customer. By offering some amount of valuable, volatile information for free, such as FX rates, a business can create a 'sticky' web site that attracts repeat visitors. By adding additional levels of value for those visitors who register with the site, such as market news, stock quotes, and portfolio tracking, a business can make 'friends.' Finally, as friends return to visit the site, a business can present offers specifically tailored to induce those friends to open one or more accounts and become financial institution customers.

The IPT for an embodiment of the invention enables a robust self-service area. A business can use a reference implementation module to create an efficient help desk channel. Through the task-level integration mechanism, a business can link that channel to the transaction engine's help desk. A business that adheres to the look and feel of the reference implementation leverages the basic user interface paradigms established by the on-line banking system. Besides taking advantage of the proven transacting capability of the on-line banking product, the business also realizes the user interface controls and characteristics that are the current global standard. The IPT is agnostic about issues related to 'look and feel,' and businesses are not forced to use the reference implementation. Instead, through the use of style sheets and templates, a business is free to use the IPT to create its own look and feel by modifying the presentation tier of any of the reference implementation modules.

The IPT architecture for an embodiment of the present invention also supports numerous technology goals, such as reusing existing technology infrastructure with client-side aggregation. The IPT allows frames from existing web systems to live inside the portal. This design enables the portal to integrate, for example, with the on-line banking system, as well as with other systems using a variety of protocols. It also segregates the knowledge base into the most appropriate divisions for the technology teams. Client side aggregation offers the advantages, such as lower runtime cost, speedier time to market, minimization of the effort needed to integrate and use services, improvement of user response time performance, management of a large enterprise where many teams have domains of knowledge that are external to the IPT, and support for many businesses on one application server. The net result of this strategy can be readily seen in reduced hardware and operational costs. Another technology goal supported by the IPT architecture is leveraging a single, global technology infrastructure for the production of portals. This strategy offers many opportunities to leverage the financial institution's global reach to build a robust portal infrastructure. It provides an economy of scale that reduces costs, shares domain experience and centralizes critical problem solving resources, thus reducing business risk and increasing potential rewards.

Further technology goals supported by the IPT architecture for an embodiment of the invention include, for example, providing a foundation for application development that does not force developers to adopt unnatural or restricting paradigms and creating a robust and extensible framework that provides a performance-enabled database mechanism, supports multi-lingual phrases (including double-byte character sets), supports multiple device types, includes strong navigation support, enables personalization, and adapts to changing business requirements.

The international portal toolkit for an embodiment of the present invention enables numerous profitable marketing and operational strategies by providing features, such as single sign-on, integration with on-line banking and other transaction engines, friends registration, personalization, a content management system, access to the full range of web content types, robust navigation and data capture tools, dynamic cross-links in any content, customizable look and feel, reference implementation with pre-configured presentation modules, a relational database, and support for third-party tools. For example, IPT portal end users can enjoy the convenience of a single logon screen controlling access to most, if not all, of the transaction engines and federated services combined in the portal. The portal uses the integrated online banking system transaction engine's credential store to authenticate customers and friends. In addition, the IPT builds a fully featured transaction engine into the financial portal of a business by integrating with the on-line banking product.

Beyond a robust transaction capability, the on-line banking product also contributes an access server component that the IPT for an embodiment of the invention uses to control the interaction of all federated services. This approach preserves the on-line banking look and feel for portals that are based on the default choices in the reference implementation. Further, since the integration extends to an individual transaction level, a portal can call any on-line banking task from any page of content without changing a single line of code. On-line banking integration also provides a key source of personalization information. The IPT reference implementation includes, for example, an account summary GUI module, which uses Open Financial Exchange (OFX) messages to provide customers with summary information within a portal frame. This can be used for personalization and for other business defined needs.

With respect to friends registration, the IPT for an embodiment of the present invention provides businesses with a powerful, flexible mechanism for transforming static web sites into dynamic vehicles for customer acquisition. The key to this feature is the IPT's precise control over information access, which enhances the 'stickiness' of a site by making available different levels of business information in exchange for user information. Because businesses that provide financial products and services must know with whom they are dealing, the process of gathering demographics and personal information is critical for virtually all customer acquisition scenarios. The IPT transforms this standard practice into a series of mutually rewarding encounters that enable a business to turn visitors into friends and friends into customers. Through the friends registration process, visitors are asked to provide the business with typical qualifying data, such as Social Security numbers, e-mail addresses, and so on. Though not yet customers, these registered visitors are welcomed as friends and given limited access to valuable information and services. To entice a new friend to become a customer, a business can offer wider access to valuable proprietary information once that the friend opens a new account. Similarly, the IPT also enables a business to focus on current customers with offers keyed to specific user profiles. In this scenario, the portal becomes a potent tool for cross-selling products and services to existing customers, thus deepening their relationships with the business. A business can fine-tune offerings for specific demographic segments, perhaps reserving the most valuable information for the most profitable customers.

The IPT personalization feature for an embodiment of the invention allows a business to display alternative content to different users, based on information about those users collected from a variety of sources. For example, the on-line banking transaction engine provides an important source of customer account data, and an IPT-based portal can be used to gather and display summary and detail information from the on-line banking system, as well as from other customer-selected sources. Each user of the system has a profile that stores the information used to drive the personalization feature. This runtime profile is built using information, for example, from the portal database, back-end systems, such as the on-line banking and other transaction engines, and the user's current state as defined by their activity inside of a particular session. Certain content types are extended to support this feature. In particular, data structures allow for personalization of ads, menus, links and client side JavaScript. Further, the toolkit's extensible architecture enables a business to add other personalized content types by extending the model as appropriate. The account summary object of the user profile, for example, can be used to personalize ads based upon variable information about what products a customer currently holds, as well as the customer's assets and liabilities. This gives a business the opportunity to cross-sell products that are not already in customer's profile. This feature can be extended to include business-defined variables. The primary driver for the personalization feature is a set of rules. The rules themselves are strings that are parsed to choose a runtime variable, such as a user's name, or a piece of content from a list, such as a specific ad from a list of ads, based on an evaluation of user profile information.

An important part of the IPT for an embodiment of the invention is an integrated content management or CM system. As financial institution web sites have evolved and grown, it has become apparent that ensuring a consistent look across businesses and simplifying logistical issues surrounding the creation, approval and deployment of content demands a sophisticated content management system, and the IPT is designed with this in mind. The CM system integrates standard industry tools, such as Interwoven tools, with the IPT and covers the entire content lifecycle end-to-end, including authoring, workflow, and publishing. It handles both static and dynamically served content, including adding records to populate the IPT database. This frees content developers from having to know how the IPT manages its content and allows application writers the freedom to identify content by a well-known name.

For access to a full range of web content types, the IPT for an embodiment of the invention provides mechanisms for handling content forms, such as flat files that are traditional web files like images (Graphics Interchange Format or GIF and Joint Photographic Experts Group format or JPEG) HTML, Acrobat, and Flash content, database files consisting of business rules and customer demographics information, and dynamic files of content gathered from market data, news feeds or from third-party vendors. The IPT also enables developers to easily add navigation components to portal pages. The tools include, for example, a Menu Maker, a Link Maker, and support for building custom forms. The database tables, which store the content of each menu and link, provide navigation control based on business language and user profile attributes. This feature is also tied into the CM system, which manages population of the database and ensures the integrity of internal references. The IPT navigation tools enable a business to link content in arbitrary ways. Each menu is created as a hierarchy of links, and menus can include organizational items that are not linked to content. Further, developers can change menus by adding content to a database; no code modifications are needed. In addition, the IPT generically supports the creation of any type of web form, and the results, i.e., the user input, can be stored in the portal database.

Content developers can use the IPT database for an embodiment of the invention to add menus, links, global phrases and images. Instead of being driven by hard code, the presentation of these elements is governed by a CM template (using <link> and <image> tags) and stored in the portal database. For example, a link tag can point to other portal pages or other web sites. If a link is used throughout the site, changing it globally becomes a trivial database maintenance task, requiring no IT or operational involvement. This feature allows a business to add navigation elements on the fly by changing menus to reflect the context of a particular product, marketing initiative, and so on. When tags are inserted into other content, they are resolved appropriately with the related language and personal information at runtime. By default, an IPT reference implementation for an embodiment of the invention uses the look and feel defined, for example, by the financial institution's on-line banking system. However, a business that wants to modify the appearance of its portal can do so readily. The runtime appearance of the portal content is defined and controlled in the JavaServer Pages (JSPs) and both Cascading Style Sheets (CSS) and Extensible Stylesheet Language Transformations (XSLT) style sheets. A business can customize a portal's look and feel by using the CM system to make global changes to the JSPs or to the style sheets.

As a starting point for portal development, the IPT provides, for example, a reference implementation that contains examples of proper structure and use of the framework objects, Epicentric modules, and JSP. Developers can view the reference implementation, for example, as a guide to the building of a customized portal. The IPT modules are core development constructs made from Java code and do not constitute a fully realized portal, but serve as building blocks for portal application developers. These modules can be called directly by URL or integrated into JSP pages, and they can be extended with additional Java code for customization purposes. The reference implementation for the IPT provides modules, such as news (web clipping), data, products and services, research, navigation, file, account summary, search, advertising, and a help channel.

Figure 2:
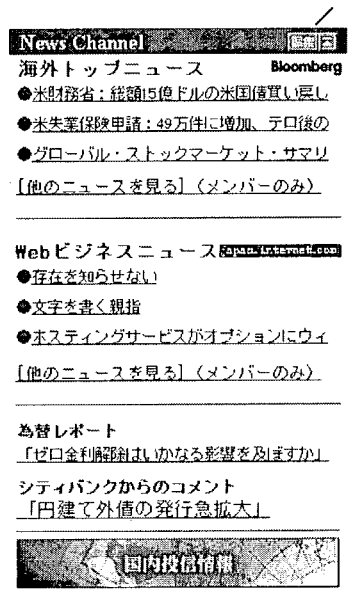
FIG. 2 is a sample news panel GUI screen display for an embodiment of the present invention.
Figure 3:
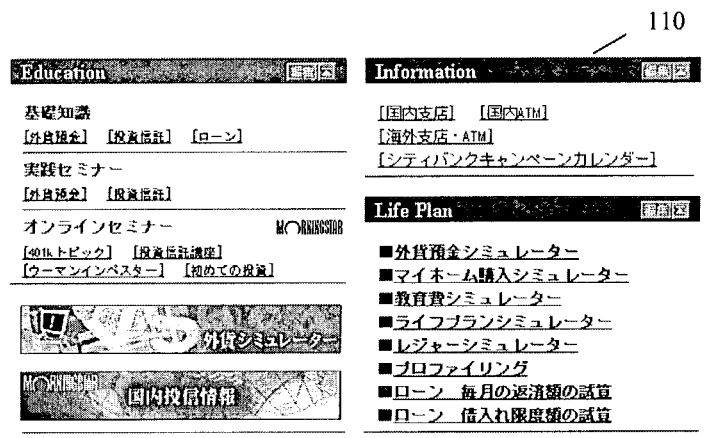
FIG. 3 is a sample news panel GUI screen display of an image captured from an implementation of clipped content for an embodiment of the present invention.

For news (web clipping), the IPT for an embodiment of the invention uses an extended clip module to enable a portal to acquire and present content from other web sites. A business content developer can configure the news module to retrieve and display multiple blocks of content from the portal server itself or other web sites in real time. Each block can consist of any HTML construct on the source page. For example, a construct can be a paragraph, table, table row, and the like, or it can be a specialized block of news headlines parsed from a source page, displayed with a category heading/logo and linked to the associated story on the source site. Users can select which blocks to display and in what order. FIG. 2 is a sample news panel GUI screen display 108 for an embodiment of the present invention. All of the content is cached in the memory of the portal server, providing excellent performance. Further, since modules can be instantiated multiple times on the same system, this module provides a very simple way to add user-customizable blocks of content to a page. For example, in addition to a "news" panel containing headlines, top stories, and the like, further instances of the module can be added to a user's page containing other blocks of content clipped from "behind the scenes" pages specially prepared for that purpose. FIG. 3 is a sample news panel GUI screen display 110 of an image captured from an implementation of clipped content for an embodiment of the present invention.

Figure 4:
FIG. 4 is a sample data panel GUI screen for an embodiment of the present invention.
Figure 5:
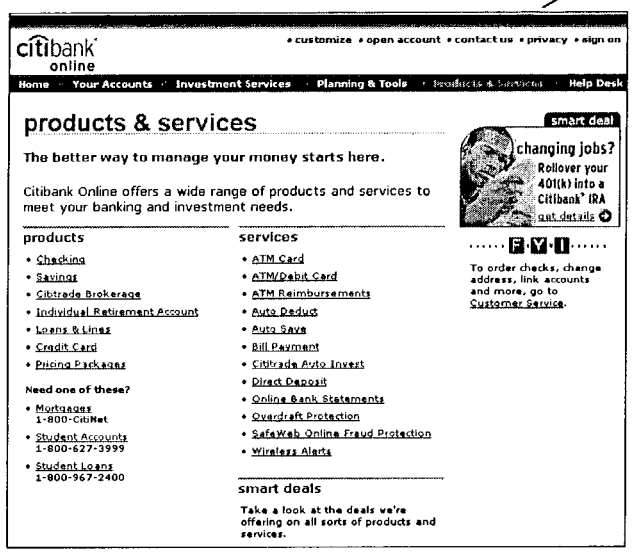
FIG. 5 is a sample products and services GUI screen for an embodiment of the present invention.

The data module for an embodiment of the invention can be used in its default mode to display content retrieved from database tables such as FX rates, interest rates, images via URL, and the like to end users. Any Java Database Connectivity (JDBC)-compliant database with network connectivity to IPT can be used to provide the data. FIG. 4 is a sample data panel GUI screen 112 for an embodiment of the present invention. Users can configure the items they want displayed on their portal home page and the order in which they are presented. The IPT also offers a robust products and services channel with, for example, three views, each supporting a different level of detail. The first view enables a business to define an overall hierarchy of products and services by creating multiple families or categories. FIG. 5 is a sample products and services GUI screen 114 for an embodiment of the present invention. A second view provides additional detail by giving short descriptions of the products and services in each category. The third view displays the full details associated with each individual product. This module can be configured to use only the first and/or third views when appropriate for business needs. In addition, the look and feel of this module is completely configurable with no code changes.

Figure 6:
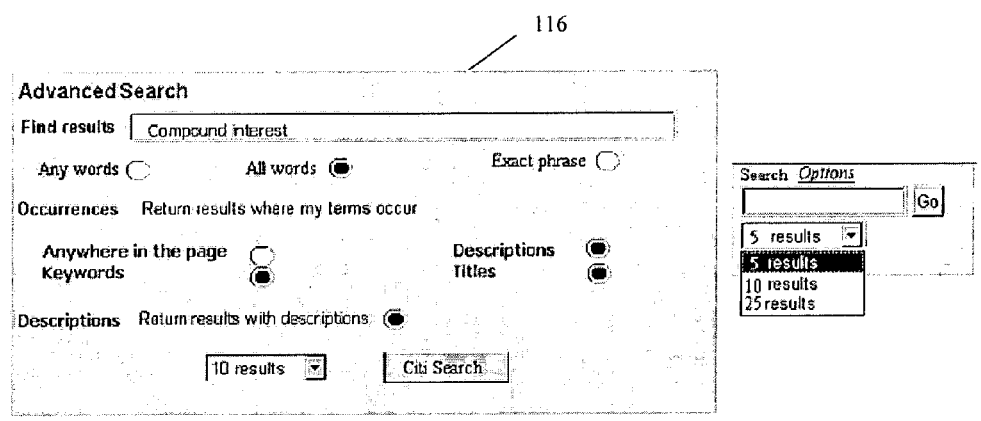
FIG. 6 is a sample advanced search GUI screen for an embodiment of the present invention.

The search module for an embodiment of the invention can be used to implement a powerful search capability in a business portal built with the IPT. This feature has a number of characteristics. For example, users can specify criteria and execute a search through the database content. Both simple and advanced searches can be done. FIG. 6 is a sample advanced search GUI screen 116 for an embodiment of the present invention. Searches are carried out against the content of the database of the current business and in the language of the user's session. A business can filter or otherwise eliminate results from the search engine based upon rules that may be as complex or as simple as the business requires them to be.

The advertising module for an embodiment of the invention can be used to create static or interactive ads for a business portal. The IPT advertising module includes default advertising rules. Ads are configurable in the advertising module's rule engine. Ads can be triggered by customer-personalized rules. An ad can be as simple as a flat JPEG image, or it can be an image map with a set of associated links. Typical examples are 'apply now' or 'more information' link buttons. The ad module can serve one ad or multiple ads onto a web page.

Figure 7:
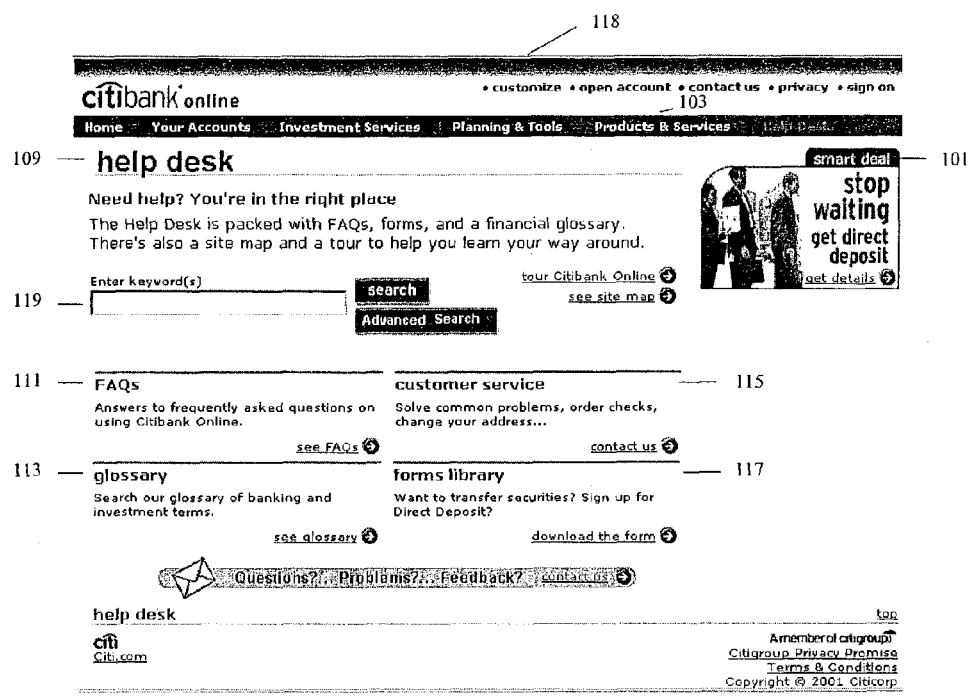
FIG. 7 is a sample implementation of the help channel GUI screen for an embodiment of the present invention.

The help channel module can be used to build a "help desk" for a business portal. FIG. 7 is a sample implementation of the help channel GUI screen 118 for an embodiment of the present invention. The help channel 109 module includes, for example, FAQs 111, a glossary 113, customer service 115 integrated with customer service for the on-line banking system, a forms library 117, an extensible framework for business-specific views, and a mini-search view 119 that allows for context-sensitive links (i.e., related topics) to be placed on all pages The IPT for an embodiment of the invention utilizes a relational database, which is a collection of data items organized as a set of tables. Data can be accessed or reassembled from these tables in many different ways without having to reorganize the database tables themselves. In addition to being relatively easy to create and access, a relational database has the important advantage of being easy to extend. After the original database is created, a new data category can be added without requiring that all existing applications be modified. A database, such as Oracle 8i, can be used for the IPT and is a powerful solution that enables many of the more compelling portal applications. For example, because IPT is based on a relational database, it not only provides a way to deliver content, but also allows storage of any pertinent information about a customer's relationship.

The IPT is a proprietary framework that integrates and supports a number of commercially available tools, such as the WebLogic Express Servelet engine, the iPlanet web server, the Interwoven TeamSite, and the Epicentric Foundation Server. For example, WebLogic Express from BEA Systems processes the IPT framework code, modules, and the Java libraries upon which they are built. This server intercepts all requests for JSPs and executes them with its servlet engine. The iPlanet Web Server provides the 'front end' for an IPT-based web site. A product of the Sun Netscape Alliance, it also manages, logs and responds to Hypertext Transfer Protocol (HTTP) requests from user browsers and serves static content, such as HTML, image files, and the like.

Interwoven TeamSite is a component, for example, of the International Content Management System (ICMS) that provides the hierarchy of activities and user permissions that control content development and publishing for many IPT systems. TeamSite provides content creation and deployment workflows, content templates, file version control, creation and rollback of editions, and audit reporting. It runs on the global ICMS server administered by eConsumer's Internet Delivery Systems organization. Epicentric Foundation Server provides JSPs and Java libraries for implementing page construction and integration, module registration and management, and user authentication and customization features. At a lower level, Epicentric libraries also provide thread management, as well as basic object classes for manipulating web content. These vendor tools are not tightly coupled with the product, and none of them are irreplaceable for its functions to continue. An alternative at a reasonable cost is possible for each vendor tool. An embodiment of the invention does utilize many of the features of the J2EE platform, and in particular, an embodiment of the invention makes use of a Java virtual machine and a Java Servlet engine, as well as a Java servlet page engine and an RDBMS system.

Additional features of IPT for an embodiment of the present invention include, for example, inter-domain single sign-on, aggregation, business MIS functions, automated form generation and processing, account opening, enhanced configuration management, performance MIS, interest rate content type, alerts/alarms and system management functions.

The IPT for an embodiment of the present invention provides a platform that enables, for example, the businesses of a financial institution, such as a global bank, to build financial portals that are both informational and transactional. A core goal of the platform for an embodiment of the invention is to enable such businesses to efficiently manage the Internet experiences of their customers and prospects through a single integrated interface. The architecture of the IPT system of the present invention comprises a set of software and hardware tools that are the components of the system of the invention, which includes, for example, network devices, relational database management systems (RDBMS) systems, application servers, and the like. The framework of the IPT system of the present invention comprises the proprietary software components that are customized in order to integrate these tools and enable the platform of the present invention.

Key features of the IPT platform for an embodiment of the invention include, for example, reuse of existing technology infrastructure with client side aggregation; scalability and performance resulting in lower runtime cost; a high degree of control of the information architecture and content of an IPT deployment by the content rather than the software resulting in getting to market faster; support of many businesses on one application server to reduce cost requirements and maintenance; leveraging one global infrastructure for the production of portals so that one system supports many different business propositions. Using this approach, each business can build upon the foundation to roll out their business specific applications using the tools, and solutions provided by an embodiment of the present invention. A further key feature of the IPT platform of the invention is to reduce production costs by allowing content to be presented by software instead of by crafting each web page by hand.

Major functional aspects of the IPT platform for an embodiment of the invention include, for example, runtime support for multiple businesses and multiple languages; an ability to create or change different information architectures; a default information architecture; integrated single sign-on and session coordination; integration of an on-line banking transaction engine; an ability to change, or create any look and feel; a default look and feel; online account opening; and site search tools. Other major functional aspects of the IPT platform include for example, content personalization; "friends" registration; content management; and user feedback/correspondence.

The IPT for an embodiment of the invention provides a software framework that supports a natural approach for most of these major functional aspects and addresses generic problems inherent to several of them. Those generic problems can be classified as functional groups, such as serving content; managing content; allowing servers to work in union; registering and maintaining portal users; performance, resilience, and scalability; and vendor framework. Turning first to serving content, "content" is defined as any information displayed on a user's screens. Major factors that control what a user sees on the user's screen include, for example, business, language, and community. With regard to business, each business controls to what communities a user belong. Regarding language, each business can display its content in one or more languages.

With respect to community, each business can allow a user to join, or can assign users to, one or more communities. A community is defined as any group of users, for example, for which predetermined personalization rules determine what sort of content can be served to a user. For example, a runtime community can be named 'has checking', to whom checking accounts are not marketed. For another example, a community can be based upon a backend data warehouse named 'bounces checks', and if a customer is in the 'bounces checks' community, and not in a 'has overdraft' community, overdraft privileges can be sold to that customer. Both language and business are communities in the sense that the content to be shown to a user is selected on the basis of language and business. Based upon the community to which a user belongs, different content can be displayed. Membership in a community can be established through meta-data (stored, for example, in an Epicentric database) contained, for example, in an Epicentric user-management system and/or at runtime, by using the attributes found in the profile object. In an embodiment of the invention, all classes of users have profile objects.

Turning next to managing content, each business manages its own content, and the IPT for an embodiment of the invention does not offer default content. Each business is responsible for the creation and testing of its own content. The international portal toolkit uses, for example, Interwoven content management software to manage content. Several types of content can be managed, such as flat HTML files on the web server, flat files on the application server, images on the web server, PDF files on the web server, and database content in the portal database. Turning now to allowing servers to work in union, a group of servers work together in order to serve content to users. Some of those servers belong to a federation of servers and thus are able to participate in important services, such as single sign on and session management. Other servers present content without being part of the federation. Examples of servers that are not obligated to be part of the federation are servers participating in server side assembly and servers participating in client side assembly that serve content from independent windows or serve images from within portal frames.

Turning now to registering and maintaining portal users, different businesses need to maintain different information about a registered user. The portal for an embodiment of the present invention supports this in a generic fashion using one database structure. This does not preclude individual businesses, for example, from extending the Oracle database in accordance with its own implementation needs and requirements. Businesses are free to extend the content tables of the database or the user tables, in order to solve their business problems, and the essence of the IPT of the present invention embraces the fact that they do so.

Scalability is also based upon the economic assumption of reasonable cost. For that reason, the application layer for an embodiment of the invention is built in such a manner that several businesses can share a runtime environment. This allows one set of hardware and software licenses to be leveraged by an entire region, or later as the Internet bandwidth becomes greater, by the entire enterprise.

The international portal toolkit for an embodiment of the present invention comprises, for example, a software platform that offers an open architecture built on top of a set of J2EE tools, such as the Oracle relational database, J2EE servelet engine (Web Logic Express with clustering capability), Epicentric (a J2EE portal builder), Web Server (Iplanet web server), Interwoven (a content management system that allows businesses to manage most types of web content), and Framework (a proprietary J2EE framework composed of Java Classes, a database schema with default content, and a set of JSP files that integrate the tools mentioned above). The runtime aspect of this framework takes advantage of the Epicentric platform, as well as any other tools added to the core toolkit. Vendor software and patches for the IPT architecture include, for example, Web Server (WS): Solaris 8 release 4/01s, latest OS Patch cluster; Iplanet Web Server 4.1 SP7, Interwoven Open Deploy Server 4.5.1, and proprietary INC software; Portal Server (PS): Solaris 8 release 4/01, latest OS patch cluster, Sun JDK 1.3.0 (Java Hotspot Client VM), Weblogic Express Server 6.1 (with Clustering On), Interwoven Open Deploy Server 4.5.1, Epicentric Foundation Server 3.5 Service pack 1, Oracle Client 8.1.7.0, content management software; and proprietary INC software; Database Server (DB): Solaris 8 release 4/01, latest OS patch cluster, Oracle Server 8.1.7.0, Oracle Server Patch to upgrade to 8.1.7.1, SSH Client for Workstations (NTr. 0/W2K), content management software, and proprietary INC software.

As an example of how a business can use the open architecture for an embodiment of the invention effectively, assume that a business has a requirement to allow its customers to ask questions of a financial advisor and receive replies via some sort of structured secure e-mail. The business decides that the way to accomplish this is to allow for a set of financial advisors to use the portal for the task. The business creates a new database structure to support the function that joins a 'financial advisor' table to a user_data table of the IPT. The business generates the form to interface the financial advisors from the content of a financial institution forms structure and uses the tools, for example, of Menu Maker and Link Maker to add this channel to the information architecture. Now, effectively all that the business needs to do is create the JSP pages and the module that will control the application. The business can naturally support the requirement for multiple languages, and if the entity is a region instead of a business, it can support the function across several businesses.

Figure 8:
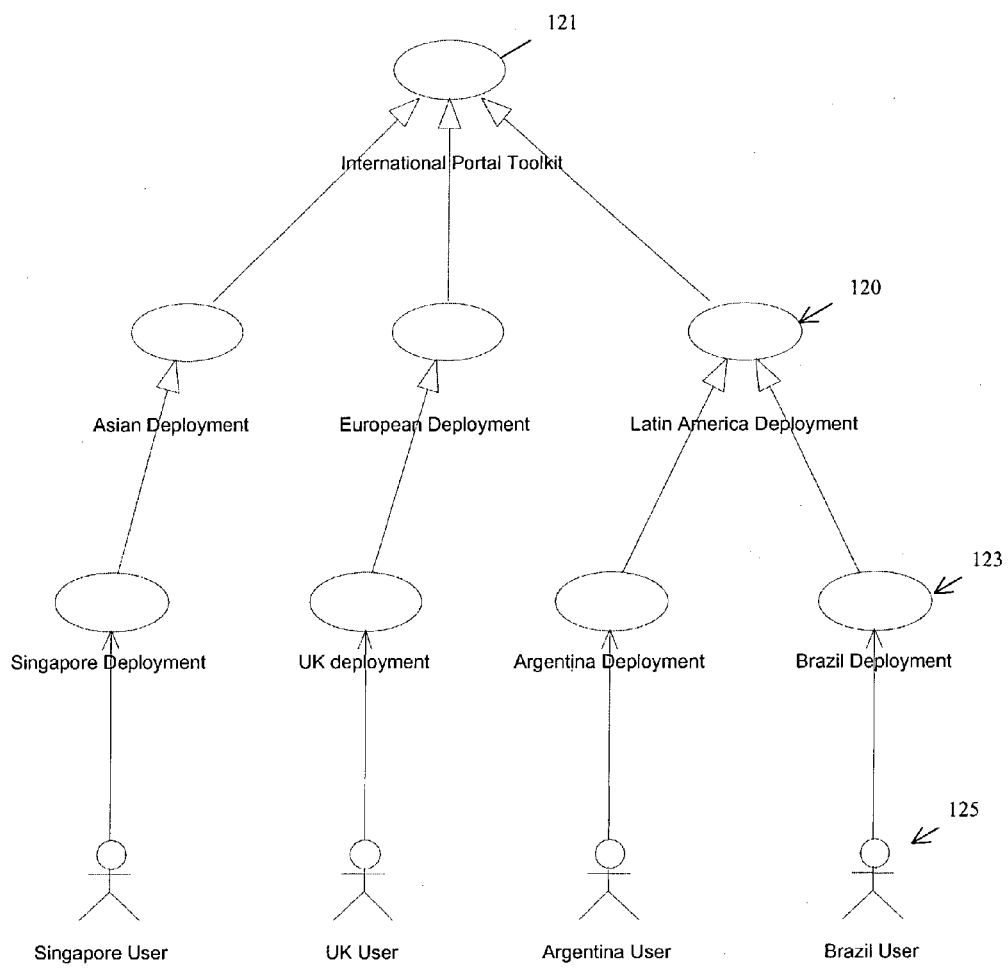
FIG. 8 is a diagram that illustrates an example of deployment for localization of the IPT for an embodiment of the present invention.

The development model for an embodiment of the invention is open and can be delivered as an integrated software framework, enabling the businesses to solve the fundamental problems inherent, for example, in creating multi-language financial portals. The full power of the underlying tools in the toolkit suite for an embodiment of the invention are exposed, and each time versions of an underlying tool are upgraded, sufficient notice and advice is given to the businesses so that they can migrate to the new infrastructure if they desire. In the foregoing example, either a business or a region can create the customer-financial advisor interaction application. If it is sufficiently generic, the module can then be incorporated into subsequent releases of the IPT for an embodiment of the invention, and the entire community can have access to it. FIG. 8 is a diagram that illustrates an example of deployment of the IPT 121 for an embodiment of the present invention for localization. Preferably, the IPT 121 is released to the regional centers 120, which in turn create regional modules, and the deployment facilities 123 are regional. Each business 125 customizes the content and can build additional modules on top of any regional solutions.

The toolkit for an embodiment of the invention provides, for example, two basic deployment models, a first of which is a turnkey solution and a second of which is a customization solution. The turnkey solution allows business units to populate the database with content and to populate a web server with a set of images, HTML files, and other assets, such as PDF files. Thereafter, following some predefined deployment procedures, a regional data center 120 supports the business' portal with hardware and operational support. The customization solution allows a business, in cooperation with its internal IT departments and integration partners, to customize and enhance the toolkit to deliver regional and local functionality. Each business 125 is able to deploy any of the commercial tools provided, integrate other commercial tools and services into their portals, or develop their own solutions on top of the basic J2EE platform.

The architecture for the portal according to an embodiment of the invention is a three-tier architecture, in which data is stored in a database, an application layer processes the runtime logic required to serve content, and a web layer distributes content and images to the end user.

Figure 9:
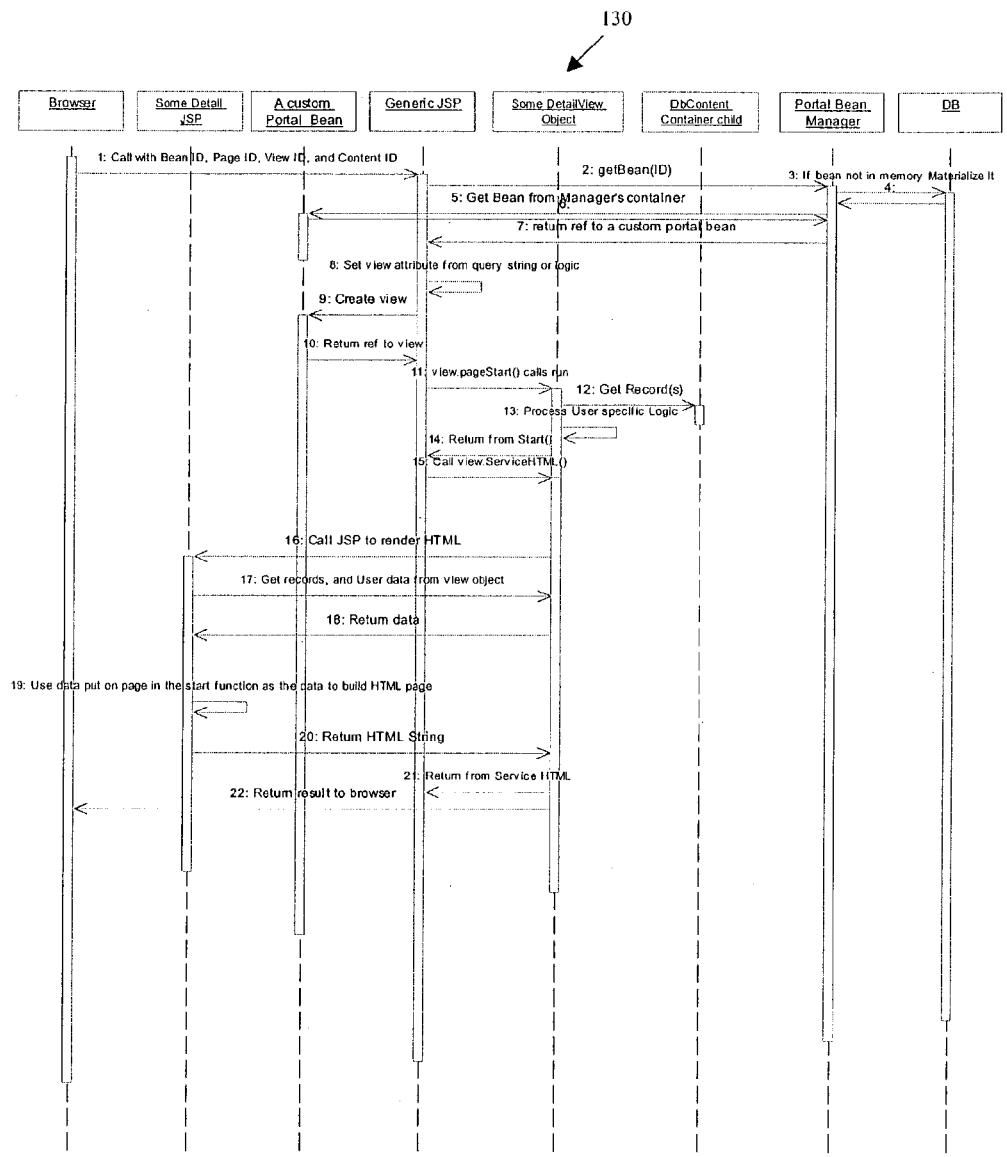
FIG. 9 is a sequence diagram that illustrates an example of the processing of an HTTP request after initialization of the system for an embodiment of the present invention.
Figure 10:
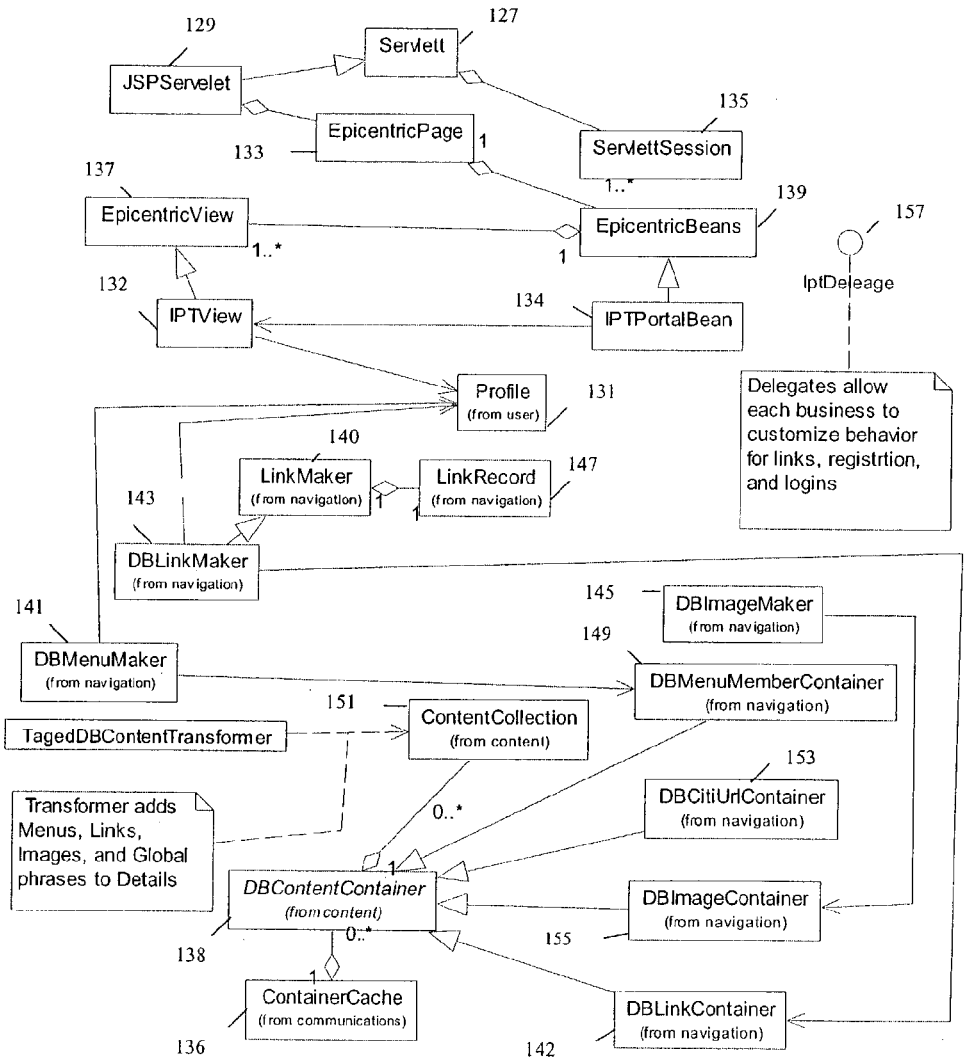
FIG. 10 is a schematic diagram that illustrates an example of on object overview of the software framework for an embodiment of the present invention.

FIG. 9 is a diagram which illustrates an example of a sequence for the processing of an HTTP request after the system for an embodiment of the present invention is initialized. Referring to FIG. 10, the sequence diagram 130 shows the sequences involved in servicing a detail's content page from the system. This diagram serves as a touch point for all pages served, and more generically when pages are served with many modules, this diagram serves as the threading model used when many modules are put on one page. All views should implement the interface Java.lang.runnable, so that all of the modules are ready to do parallel processing. This is an important feature, for example, in order to present advertisements and related topics.

Figure 11:
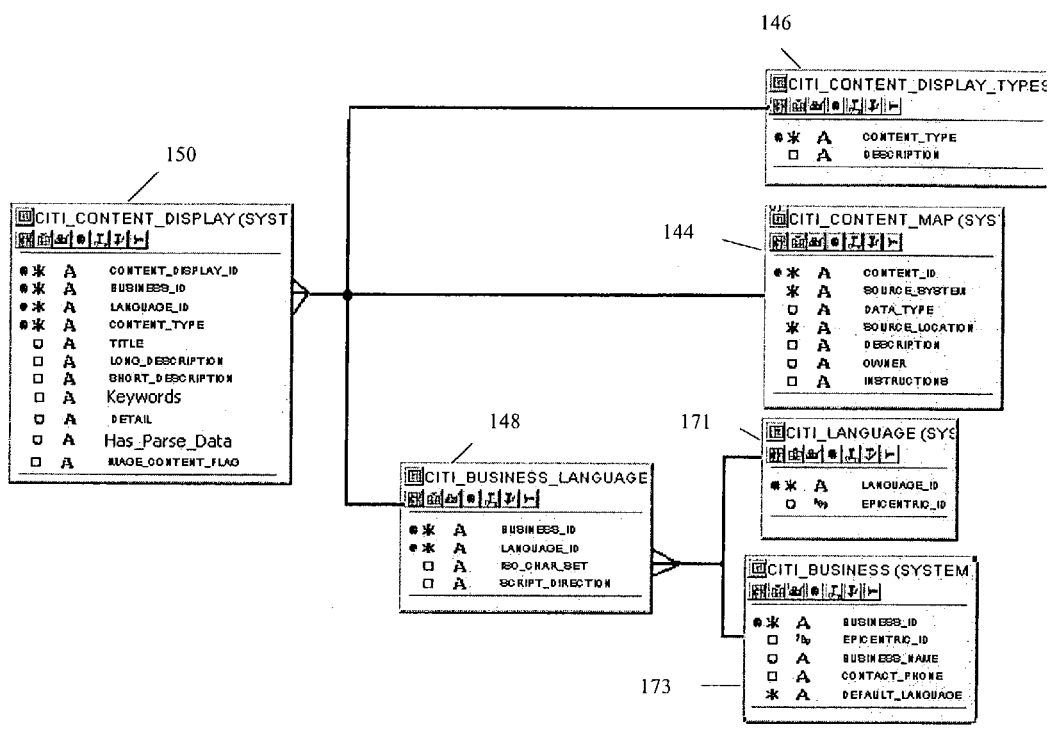
FIG. 11 is a table that illustrates an example of a complex key consisting of Content ID, Content Type, Business, and Language for an embodiment of the invention.

FIG. 10 is a schematic diagram that illustrates an example of on object overview of the software framework for an embodiment of the present invention. Referring to FIG. 11, the basic framework addresses the functional groups in a robust manner. It shows how the major components use, and are used by, the framework in order for the portal to present content to the runtime users of the live system. The unifying image, illustrating what the IPT framework provides, is an Internet delivery system serving multiple businesses free to control the content, information architecture, and look and feel of their own sites. Wherever possible, it uses the foundation of the underlying tools in order to accomplish these goals. For example, a great deal of content is stored in the database, but the framework caches content in a hierarchy reflecting the requirement that multiple businesses serve content in multiple languages. The framework allows for particular businesses to take over control at critical points in the application by delegating control components developed by the individual businesses when necessary. The open architecture of an embodiment of the invention is illustrated here. Although it is anticipated that a business will use an embodiment of the invention in a particular way, by storing data in a database, the business can take advantage of the services provided by an embodiment of the invention without being locked into this paradigm.

Referring further to FIG. 10, content for which the portal is responsible is contained in the ContainerCache 136. For the most part, the cache collects this content from the database when the system is initialized, or on demand when content has been refreshed by the content management system. The objects that understand the syntax of the queries to the database are inherited from the DBContentContainer 138 object. This object understands what Structured Query Language (SQL) to present to the database and how to distribute the data from an SQL response into appropriate data records for applications and tools that need this content. At runtime, based upon the business to which a customer belongs and the language that the customer speaks, display content is marshaled by extracting it from the content cache. The content cache lives in the JVM's memory, which allows any content served to be served out of memory rather then from the database.

The portal toolkit for an embodiment of the invention supplies a robust foundation for arbitrary information architectures based upon the basic building block, links and menus. The MenuMaker uses the Link Maker 140, and all links in the system are contained in the DBLinkContainer 142. The link container is separated into specific containers that contain a set of links per business per language. For example, if a server hosts five businesses, each of which supports two languages, then there are ten containers in the DBLinkContainer 142. Runtime performance is fast, because the natural hierarchy allows efficient content searches. An extension of the framework can include device type as part of the runtime profile object 131, in which case, it is simple to create content tailored to these devices and to create a set of presentation JSP pages to support the various devices.

A database model for an embodiment of the present invention serves major functional requirements, such as storing content for the businesses, storing information about the user, and storing system configurations particular to a business and languages within that business.

Focusing on the IPT database schema, the database is composed of the logical entities, namely, user tables, system tables, and content tables. FIG. 11 is a table that illustrates an example of a complex key consisting of Content ID, Content type, Business, and Language for an embodiment of the invention. The core system tables include, for example, citi_content_map 144, citi_content_display_types 146, and citi_business_language 148. These tables are at the heart of the content serving framework for an embodiment of the invention and work together with the rest of the IPT schema to allow users to create their own modules without extending the database. For each logical piece of content, one record exists in the citi_content_map table 144. However, for each piece of content, many records might exist in the citi_content display_view. All display content can be found in the citi_content_display_view which joins the citi-content_clob table and the citi-content-display table 146. Display content is stored on the granularity of each business owning display content for each language that the business supports.

For an individual piece of display content, records associated with the display of details about that content, the links required to navigate to that piece of content, disclaimers associated with the content, and images associated with the content, and the like, can be created. This allows one Content ID to appear in the display table once for a link, another time for a detail, and other times for other related content display matters. By taking advantage of the notion that all content display is typed, several records in the Content_Map can be used to associate content with one value coming from a query string, or in the body of a post message. For example, it can appear as a menu item, as well. In this way, generic modules can be written to create content channels, such as products and services or research, that have no knowledge whatsoever about any particular business's product set or the research categories that a particular business supports.

Figure 12:
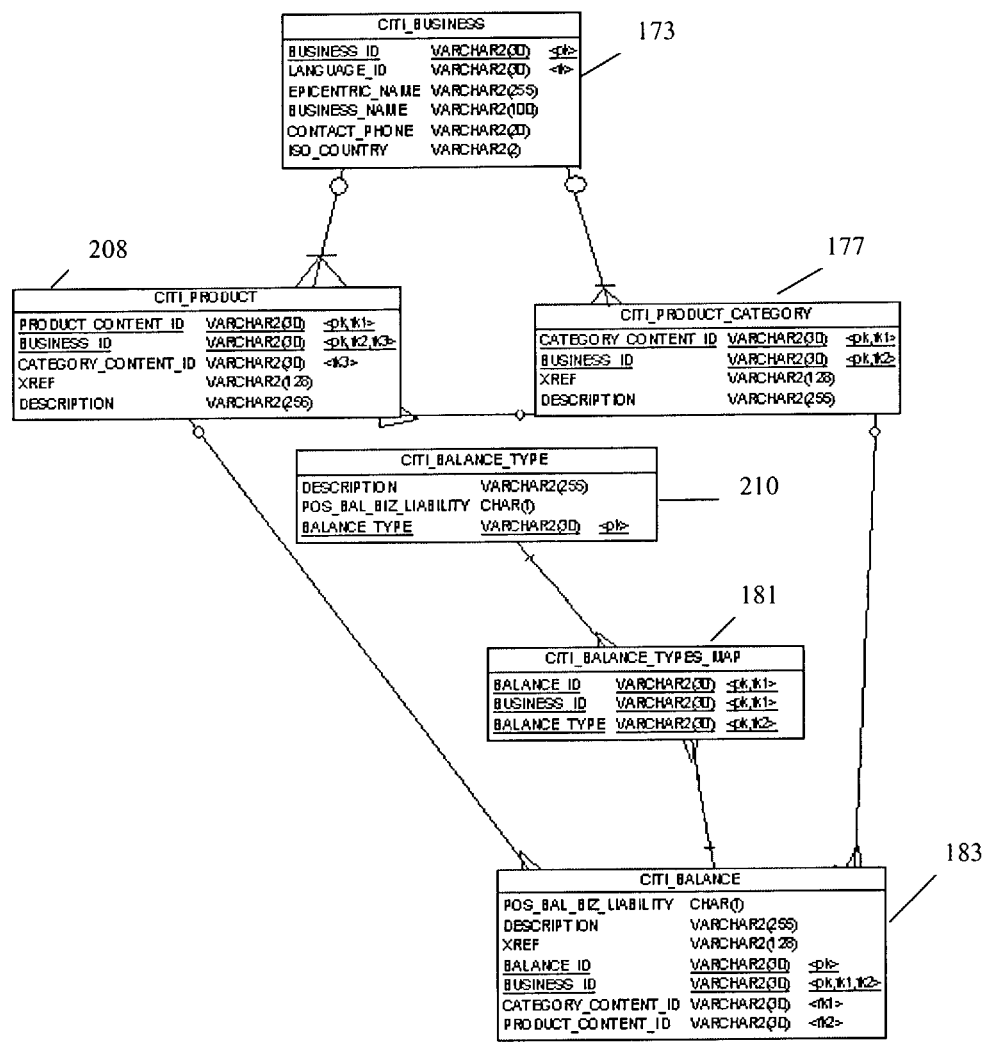
FIG. 12 is a table that illustrates an example of various balances and groups of balances that can be contained by individual products for an embodiment of the present invention.

The database for an embodiment of the present invention is modeled to contain data for generic Internet content and user information container. It is also modeled to contain information about financial products. The product tables do not contain descriptions of products, which are contained in the content display table. The product tables are modeled to capture the complex information pertaining to how to group products by category, and how to understand the various balances and groups of balances that can be contained by individual products. FIG. 12 is a table that illustrates an example of various balances and groups of balances that can be contained by individual products for an embodiment of the present invention.

In an embodiment of the invention, help content is stored as display content of type 'help or FAQ etc.,' rather than as a 'help' table or a 'FAQ' table. In general, it is not necessary to extend the database for particular business needs. Instead, the database structure is general enough to be extended by adding content or fields to the existing schema, rather than adding new tables. Deployment teams can build on top of these structures, and as a result, there is a good chance that several businesses can benefit from the modules they develop. For example, in order to display the content associated with a particular checking product to a customer, this value can be passed into an advertising campaign manager to assure advertising for the right product, as well as to display information about the product, and it can be done using only one content ID. Database display content type is defined as any content that is described in the database at a level that is sensitive to both language and business. Content types are tabular sets of data associated with information that can be presented to users in a structured manner. Content types do not support a one-to-many model. Some content is presented to users from a set of content types, and the products and services channel exemplifies this model.

Figure 13:
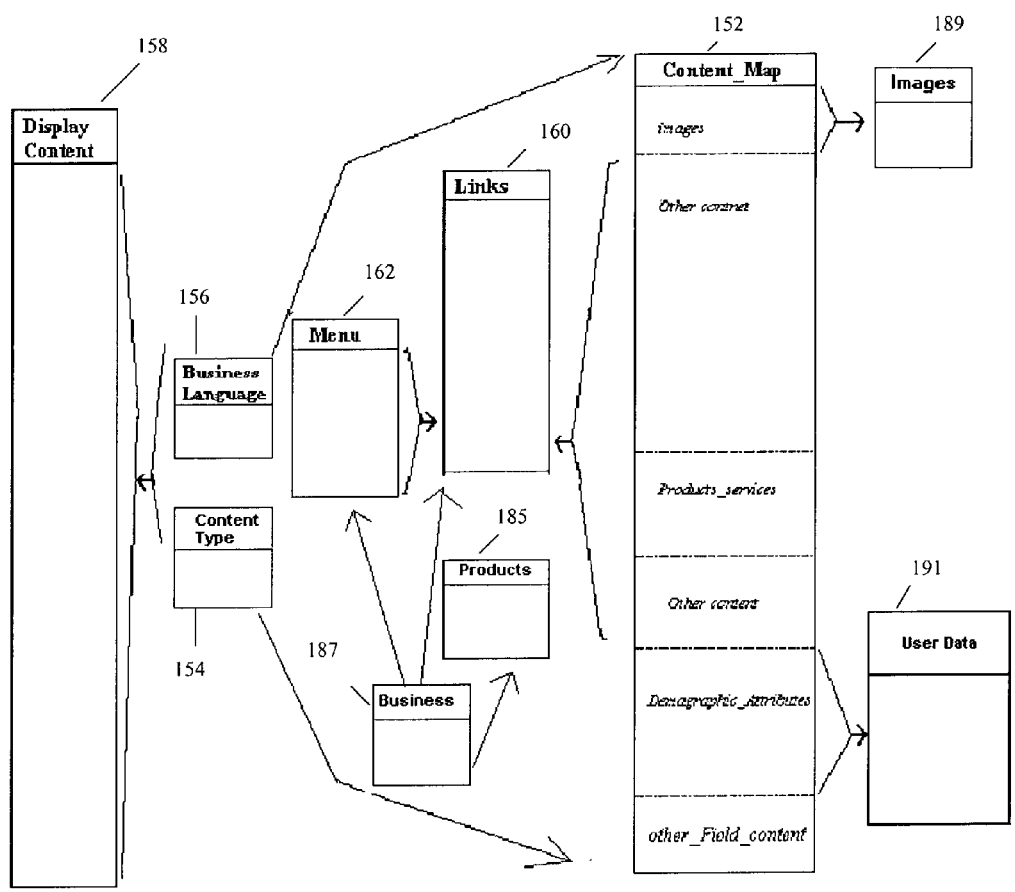
FIG. 13 is a table that illustrates an example of the database structure for an embodiment of the present invention.

Content types for an embodiment of the invention are cached by a DbCache object and manifest themselves as a collection of DbContentContainers 138. FIG. 13 is a table that illustrates an example of the database structure for an embodiment of the present invention. From a data perspective, the general scheme for display content is as follows: The unique system key to each record of content is contained in the Content_Map 152. A one-to-one relationship exists with any abstract Content Type 154. If the Content Type 154 is to be displayed, it will have a display table associated with it as well. For each Language156 that each business supports, a Display Content 158 may also be entered. By using the display link table, a business may support content in some languages and not others. Related to the Content_Map table 152 are two important data structures, namely, the Links structure 160, and the Menu structure 162. Using these relationships, the portal toolkit of the present invention can link in two ways to all content that is served. One such way is links from menus, and the other such way is links directly inside the text of content. Using the framework, it is possible to embed tags in the content to display menus, images, global phrases, and links. This is an important feature of the database, in that it puts the user in control of the information architecture internal to a page of content and is a key to creating a dynamic system that is not necessarily hierarchical in nature. Using the Content Map table 152 ensures that all content records are properly related, and allows for new channels of the information architecture to be built without making any database changes. A primary reason for this is that through this method, new content can be added to existing channels of the architecture without any code changes.

It is possible to make changes in the information architecture by changing the database in other ways as well. For example, with regard to adding a product to the product and services page, when a business wants to add a new product to the portal, the business uses an Interwoven form to create a new product. Thereafter, the IPT system 121 proceeds to extract the product ID from the form and create a new Content_Map 152 record in the database; to extract the name of the product from the form and create a new Link 162 record for each language that is to be supported; and to add an entry to the Menu table 162 for the link inside the product and services menu. Once this is done, a link automatically appears on the correct menu. It is not necessary to make any code changes, and the new product automatically becomes live when the change is migrated to production. This product database structure allows, for example, grouping a financial institution's products to the IPT content Ids and storing information about a financial product family, the product itself, and the types of balances held by these products on a business-by-business basis. In order to support the product in multiple languages, the business creates a new product display record in Interwoven for each language the business supports, chooses the product with which this record is associated from a drop-down list, and publishes it. The portal system then extracts the data from the form and populates the Menu structure 162, the Link structure 160, and the content display structures 158 appropriately. A key that binds all of this together is that all content records that are in the database share one content_ID that is used in the Menu 162, Link 160, and Content_Map 152 tables.

Figure 14:
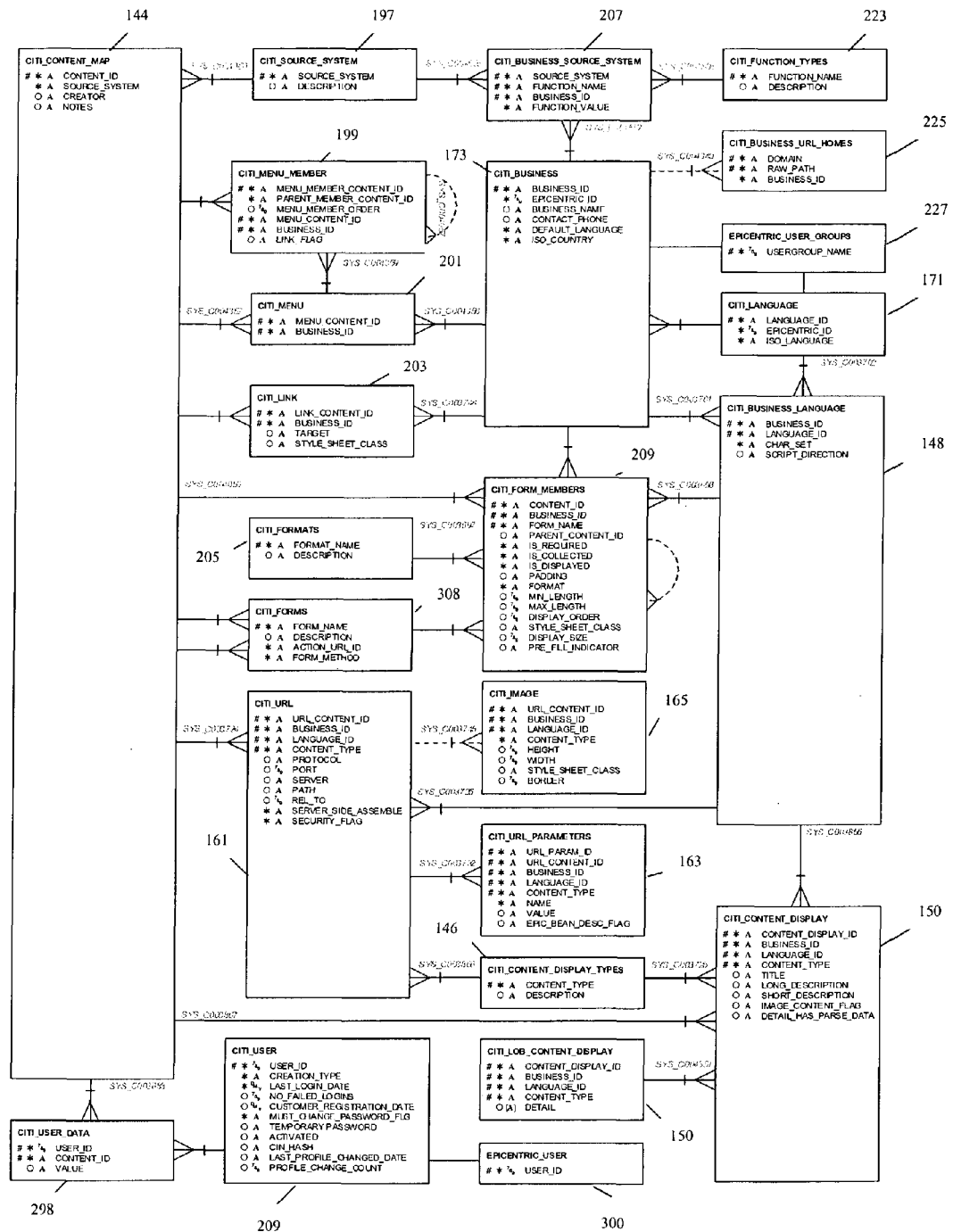
FIG. 14 is an entity diagram that expresses an example of the data model for a version of the IPT for an embodiment of the present invention.
Figure 15:
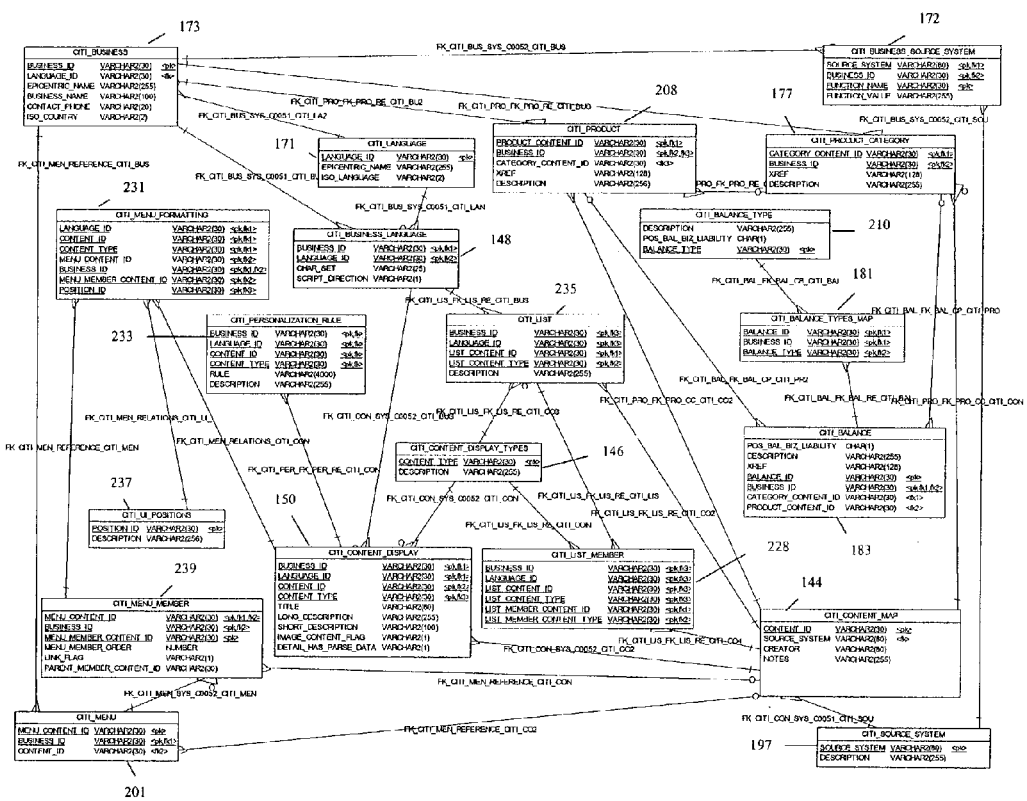
FIG. 15 is a diagram that expresses examples of the tables for the database schema for a version of the IPT for an embodiment of the present invention.

FIG. 14 is an entity diagram that expresses an example of the data model for a portal toolkit version for an embodiment of the present invention. FIG. 15 is a diagram that expresses examples of the tables for the database schema for an IPT version for an embodiment of the present invention. These tables are principally concerned, for example, with requirements for personalization, advertisements, and financial products.

In an embodiment of the present invention, content authors can tag content in the database in order to reference other database content. In order to allow each business to control their own information architecture, it is important to allow them to insert tagged content into the database. These tags allow the runtime system to resolve these tags at runtime. In particular, content authors are allowed to insert tags that will expand to the content types as illustrated in FIG. 16, which is a table that shows examples of tag types for an embodiment of the present invention. The XML schema of the tags that the user may insert into the database content as a standard part of a document type definition is defined, for example, as:

<! ELEMENT globalPhrase (#PCDATA)!>
<! ATTLIST globalPhrase contentID #REQUIRED>
<! ELEMENT image (#PCDATA) !>
<! ATTLIST image contentID #REQUIRED>
<! ELEMENT link (#PCDATA) !>
<! ATTLIST link contentID #REQUIRED>
<! ELEMENT menu (#PCDATA) !>
<! ATTLIST menu ContentID #REQUIRED
styleSheetName #REQUIERED
topMenuMember #IMPLIED
numberOfLevelsDown (1|2|3) "1">
>

Figure 17:
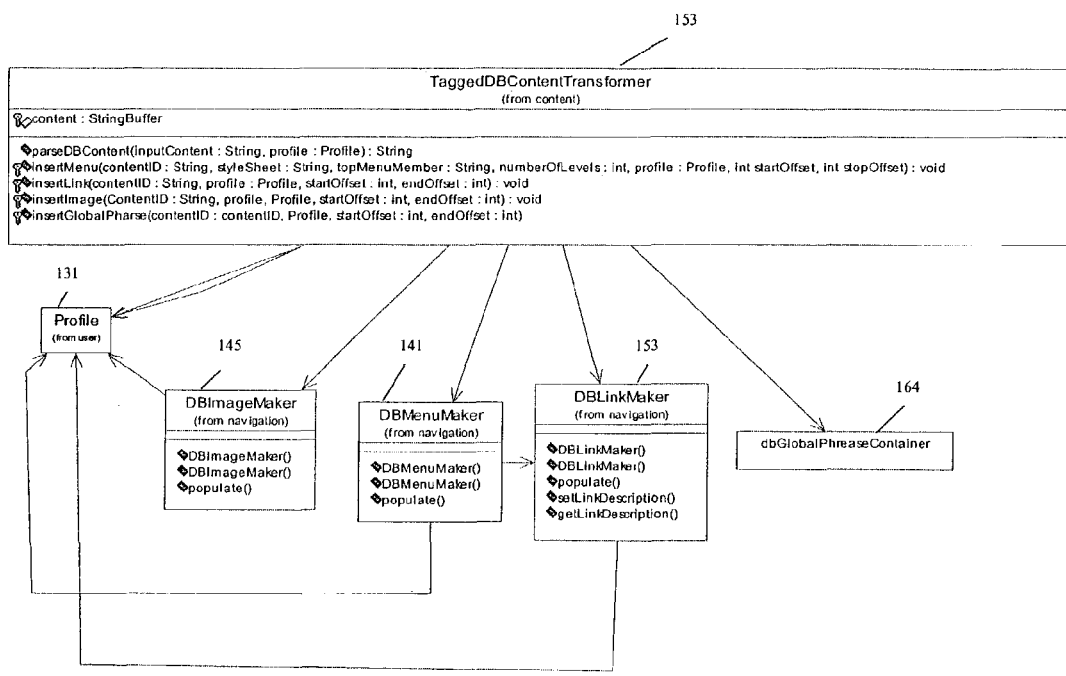
FIG. 17 is a table that illustrates an example of an object model for an embodiment of the present invention.

FIG. 17 is a table that illustrates an example of an object model for an embodiment of the present invention. In an aspect of the IPT 121 for an embodiment of the invention, the reference implementation only parses the detail field of the citi_content_display table 150. In order to support the Application Program Interface (API) of the parse routine, a has_Dynamic_content field is added to the Citi_clob_display table. Records such as the product and service record should contain a hasDetailParse field, so that the application layer can parse a detail only if that flag is set to 'true.' In another aspect of the IPT 121 for an embodiment of the invention, DBMenuMaker 141, DBLinkMaker 143, DBlmageMaker 145, and DBGlobalPhraseMaker 164 are integrated with the personalization engine, which can only be done at runtime. If a content author wishes to take advantage of this feature, the author must use Extensible Hypertext Markup Language (XHTML) Version 1.0 and also take the specification's recommendation for compliance with existing user agents. If this is done, all mark-up which is compliant with HTML 4.n will be rendered properly by browsers. A guide for making XHTML documents compliant with both HTML 4.0 and XHTML 1.0 can be found at http://www.w3.org/TR/xhtml1/#guidelines.

Figure 18:
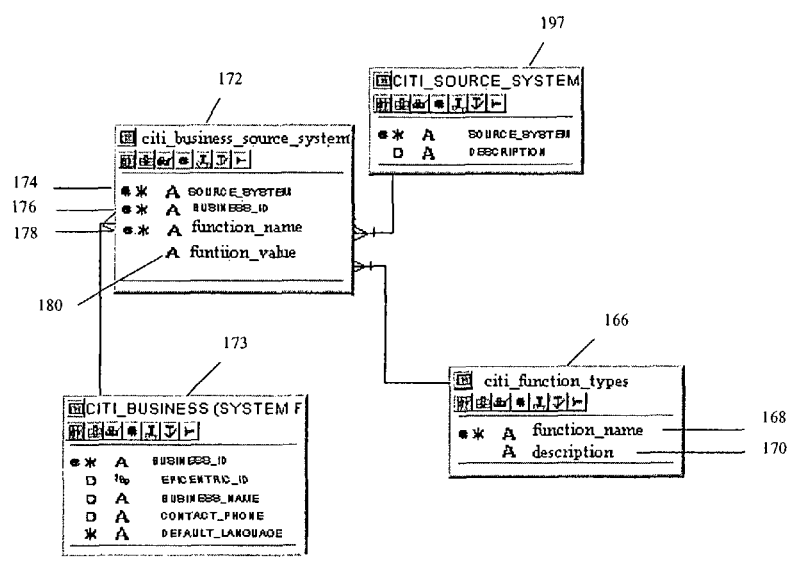
FIG. 18 is a block diagram that shows an example of database structures that support the delegate model for an embodiment of the invention.
Figure 19:
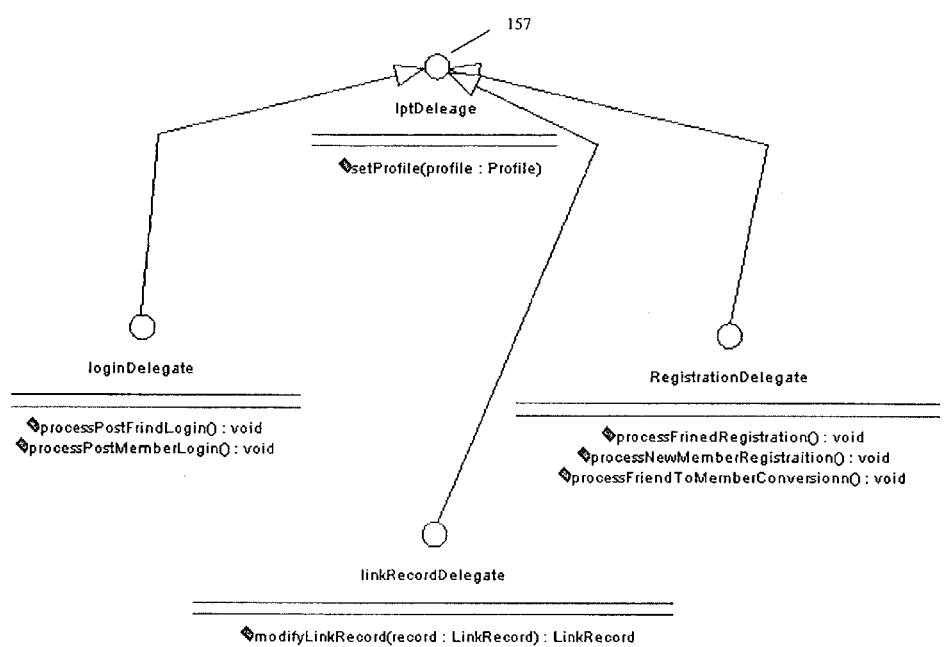
FIG. 19 is a schematic diagram that illustrates an example of the software layer for an embodiment of the present invention.

FIG. 18 is a block diagram that shows an example of database structures that support the delegate model for an embodiment of the invention. A business delegate is an object that each business can create and register in the database for an embodiment of the invention in order to do work that the framework does not anticipate. A basic principle of this delegation model is to allow businesses to register delegate classes in the database for functions that support delegation. Each function that does provide a delegation model provides an interface for the classes that are registered, and each function is found in the function table. Examples of values include:
In the citi_function_types table 166,
Function name 168=loginDelegate
description 170=The business delegate to be called after a successful login.
In the citi_business_source_system table 172,
Source_system 174=portal
Business_id 176=SGGCB
Function name 178=loginDelegate
Function value 180=com.citigroup.singaporePortal.delagates.SingaporeLoginDelagate FIG. 19 is a schematic diagram that illustrates an example of the software layer for an embodiment of the present invention. In general, for each functional area, an interface for the delegate is defined, and a function name is defined, for example, by an IPT team. For each of these defined functions, a state diagram documents at what point functions are called and how flow operates around the function.

Figure 20:
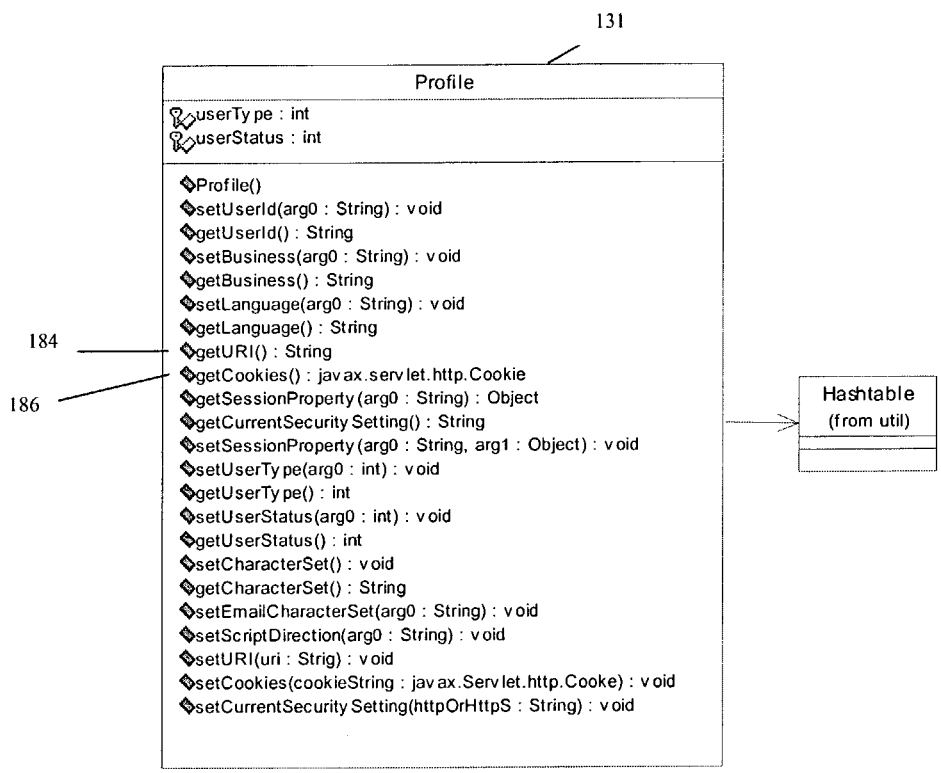
FIG. 20 is a table that shows an example of a profile object for an embodiment of the present invention.

FIG. 20 is a table that shows an example of a profile object for an embodiment of the present invention. The profile object 131 supports these delegates by insuring the addition of context. In particular, the delegates must be able to have state information about the user's context. It is necessary to call the setProfile object before calling the interfaces. Therefore, functionality is added to store, for example, two context strings in the profile 131, namely URL string and SetCookies. URI string is marshaled by calling HTTPServeletRequest. getURL( )function 184. SetCookies is obtained from the HTTPServeletRequest 186. Both of these variables are set by the global.inc file at the beginning of each request. Any non-Epicentric portal page that does not use this file must be sure to set these variables.

Figure 21:
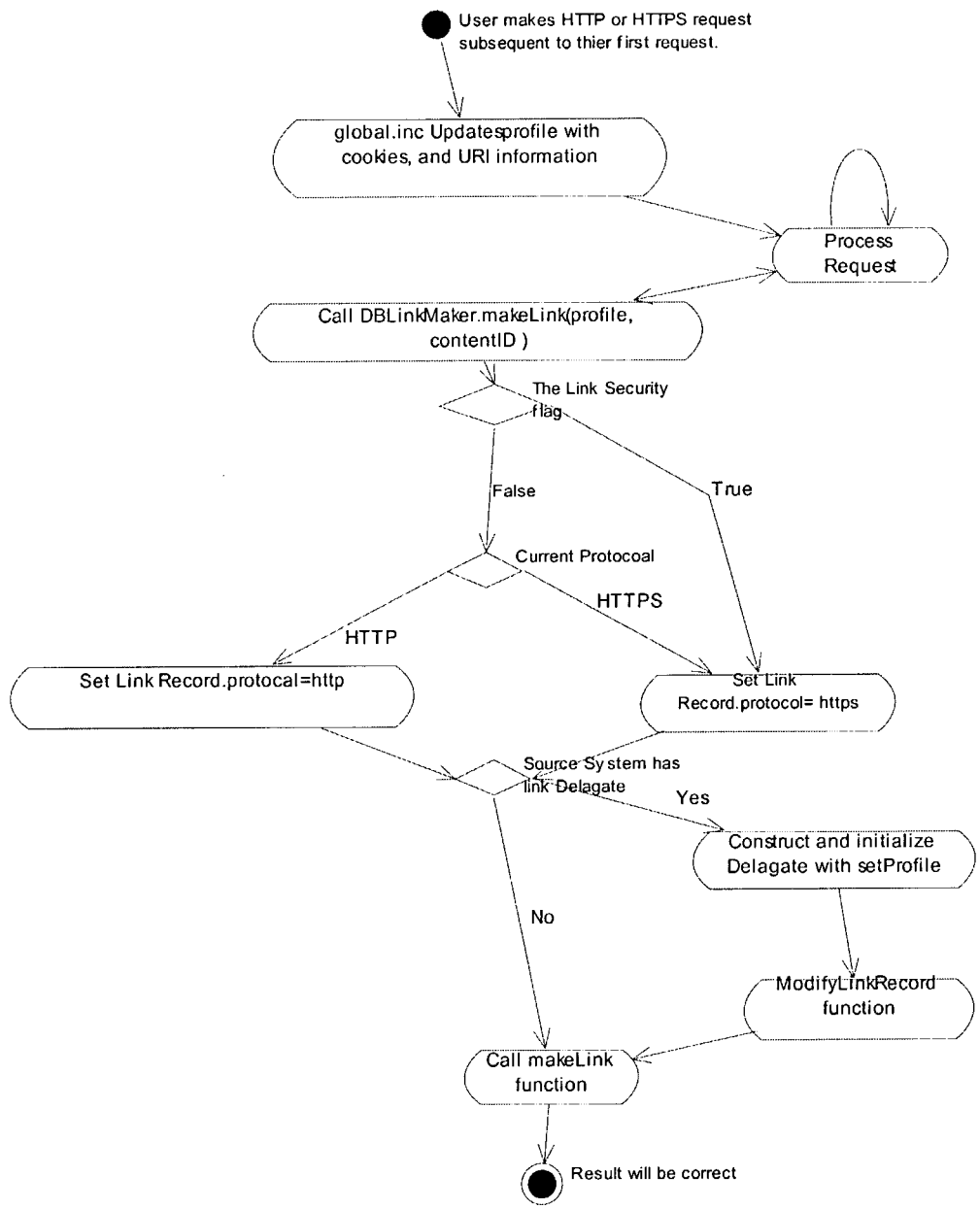
FIG. 21 is a sample Link Maker delegate state diagram for an embodiment of the present invention.

FIG. 21 is a sample Link Maker 140 delegate state diagram for an embodiment of the present invention. The Link delegate actually operates on a link record and must also be called when DBMenuMaker 141 is about to create a link and when DBFrameMaker is about to make a frame. Sequentially, the call occurs at the same time as Link Maker 140 makes a call.

Figure 22:
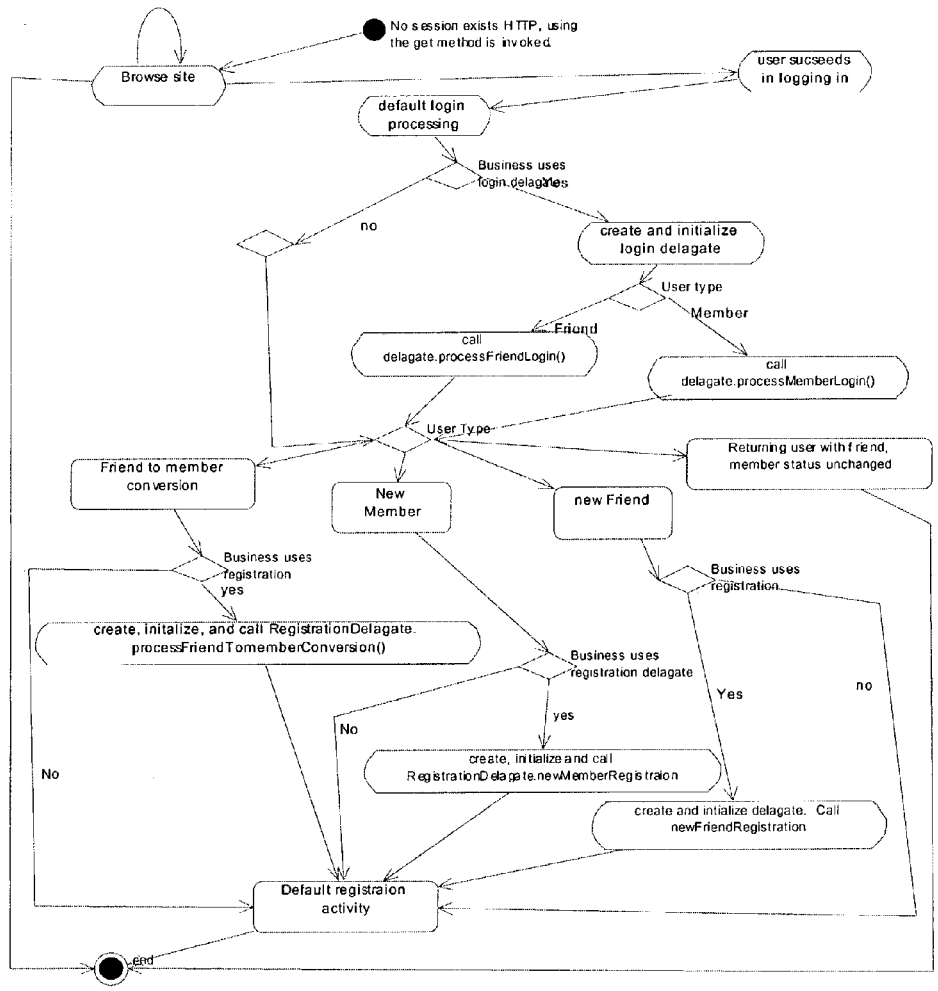
FIG. 22 is a sample post login and registration delegates state diagram for an embodiment of the present invention.

FIG. 22 is a sample post login and registration delegates state diagram for an embodiment of the present invention. In order to allow users to access the site for an embodiment of the invention using either the HTTP or HTTPS protocol, it is necessary that links be allowed to dynamically switch between the HTTP and the HTTPS protocol. This is supported through the DBLinkMaker 143 object and the database. It is necessary to do this in order to increase client side performance. Tests have shown that on a typical page, a gain of at least 30% performance can be expected when one switches from the HTTPS to the HTTP protocol. In general this is not because of a single HTTPS request and response, but because all the images on a page are also transmitted using the HTTPS protocol. There are a few rules that affect the manner in which protocols are dynamically created in the links. For example, dynamic protocols can be generated only for the HTTP protocol. The links are made using the preselected ports for HTTP and HTTPS. Once a user logs in, all requests to the server are made using the HTTPS protocol. This policy is adhered to because of the control frames that exist in the frameset after a user logs in.

Figure 23:
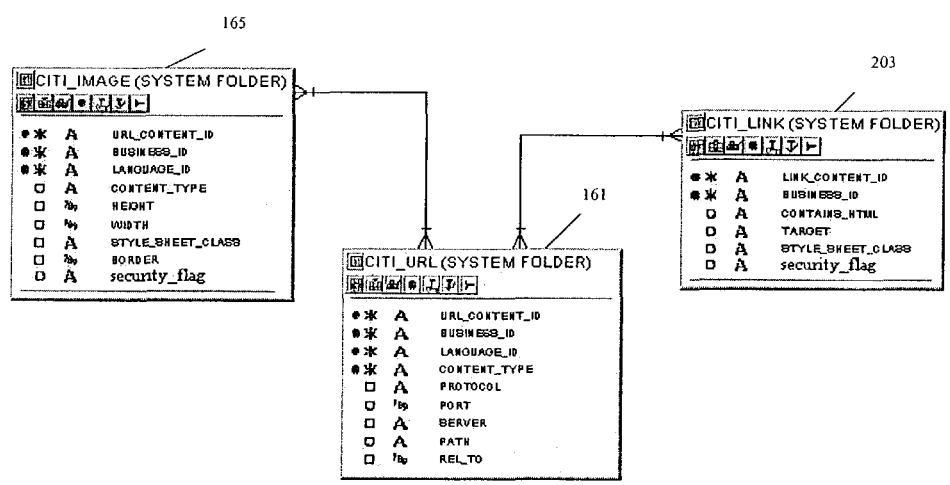
FIG. 23 is a table that illustrates an example of the structure for creating links from the database layer for an embodiment of the present invention.
Figure 24:
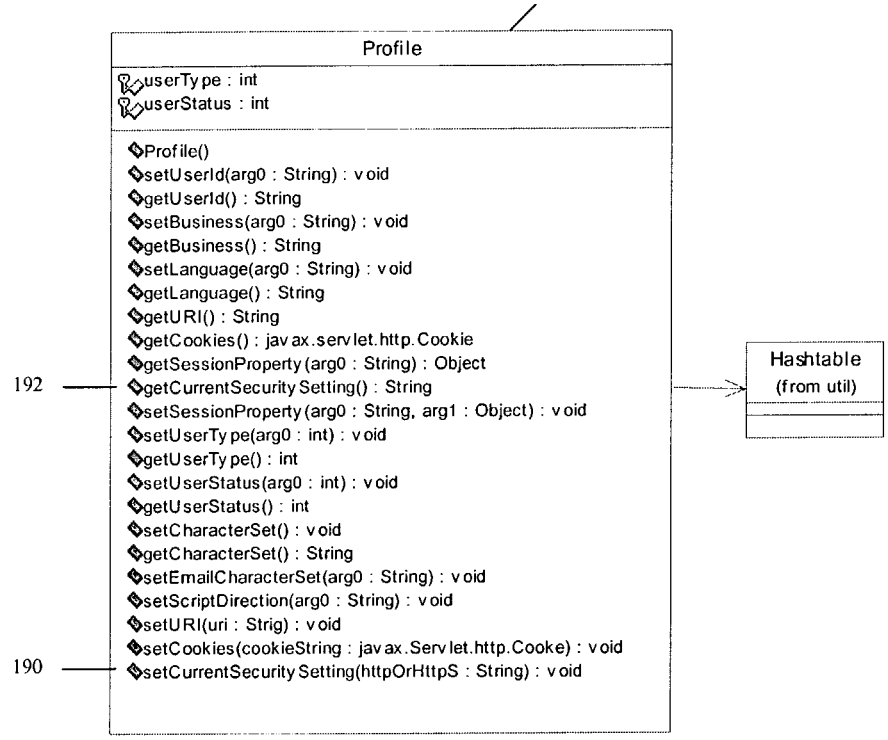
FIG. 24 is a table that shows an example of navigation objects for an embodiment of the present invention.
Figure 25:
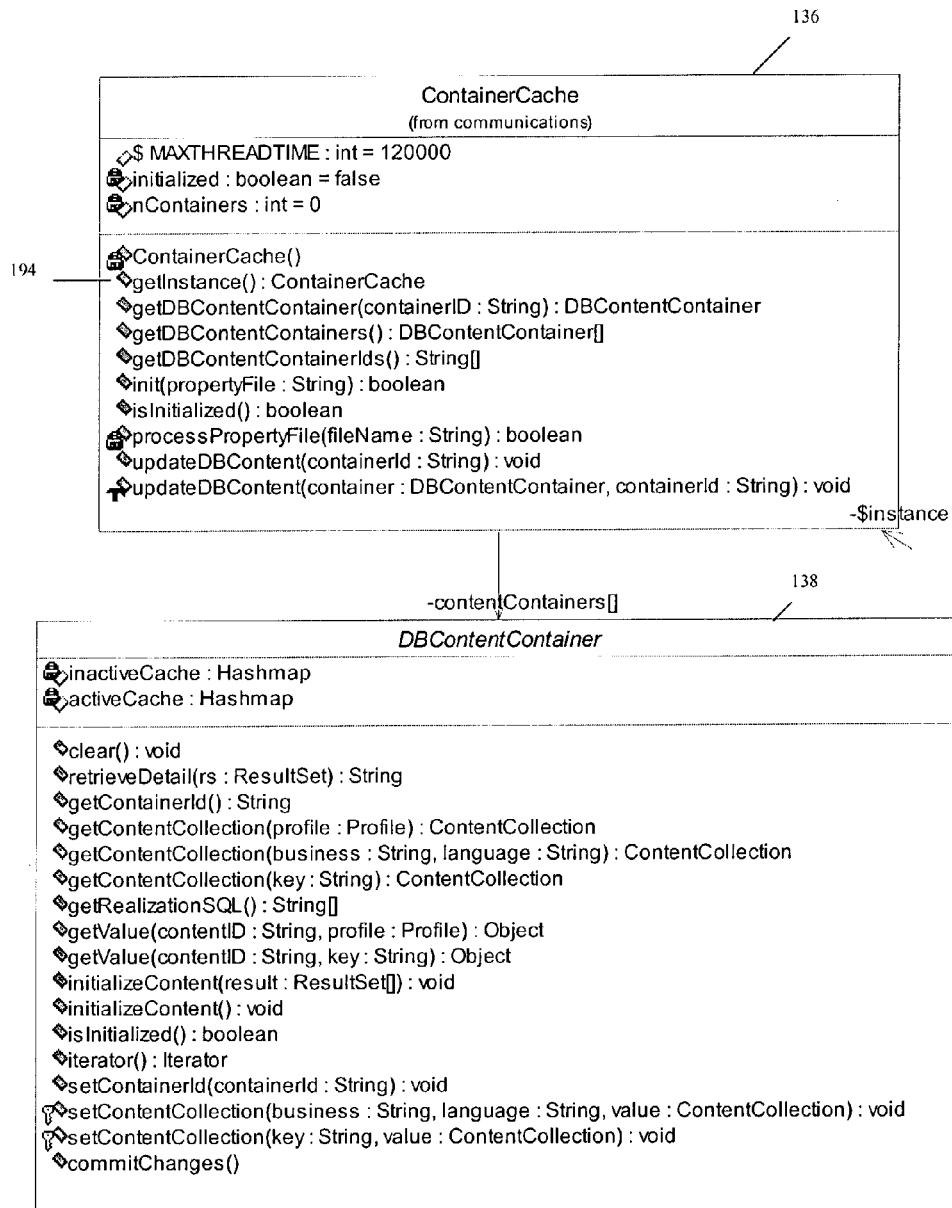
FIG. 25 is a table that shows examples of ContainerCache and DBContent Container for an embodiment of the present invention.

FIG. 23 is a table that illustrates an example of the structure for creating links from the database layer for an embodiment of the present invention; and FIG. 25 is a table that shows an example of navigation objects for an embodiment of the present invention. In creating links from the database layer, the security flag in the citi_URL table 161 determines if a link can be rendered in either the HTTP or HTTPS protocol. This flag can have three values. An 'S' value means all links to this URL must be made using the HTTPS protocol. An 'I' value means that all links to this URL must be made using the HTTP protocol. No link that targets content inside the portal frameset may use this value. A 'V' value means that links can be made using either the HTTP or the HTTPS protocol. Depending upon the state of the security flag in the profile object 131, links are made appropriately. In general, images should be relative, and if they are from other servers, their protocol security flag should be set to 'V.' Link records and Image records have the security flag embedded in them. DBMenuMaker 141, DBLinkMaker 143, and DBlmageMaker 145 all take into account the ability of the system to dynamically create a protocol based upon the value of the flag. DBMenuMaker 141 does this work explicitly and this transformation is transparent to the XSLT transformations. The profile object 131 contains the functions, SetCurrentSecuritySetting 190 and getCurrentSecuritySetting 192. Two possible values, HTTP or HTPS, can be used to set this variable.

FIG. 25 is a table that shows examples of ContainerCache 136 and DBContent Container 138 for an embodiment of the present invention. Content is cached in ContainerCache 136, and any user-specific data to be cached is cached in the profile object 131. In general, the DBContentContainer 138 has particular record sets that are capable of servicing particular application needs. These record sets can come from many tables, and can come from the results of many SQL statements to the database. In fact, they can contain data from sources other then the database. Containers are built by the application programmers who understand how to interrogate the database to get the appropriate data to the cache. With an ability to create a series of SQL statements, comes the ability to construct complex record objects that can be of great use to the programmer. For example, in link production, the DBLinkContainer 142 gets rows from the citi_URL 161, citi_URL-parameter 163, citi_image 165 and citi_content_display tables 150 in order to create a link record that is able to produce fully fledged HTTP links. The container is a super set that contains all links for all businesses and languages. The application can find the right link for the right user by passing in a profile object 131 to the container when it wants a link produced.

Another important aspect to objects stored in ContentCache 136, as well as the ContentCache 136, all of which are children of DBContentContainer 138, is that they are singleton objects. Thus, it is guaranteed that there can be only one instance of this object in any particular JVM, which insures data integrity and the optimization of the amount of memory used by these objects. Any user extending this model must do the same thing. The mechanism for doing this is to make the constructor of this object private and to create static instance of the object in that constructor. In this way, only the class loader can create one of these objects. If a public static getInstance 194 method is added to the object, all users will always be using the same object.

Figure 26:
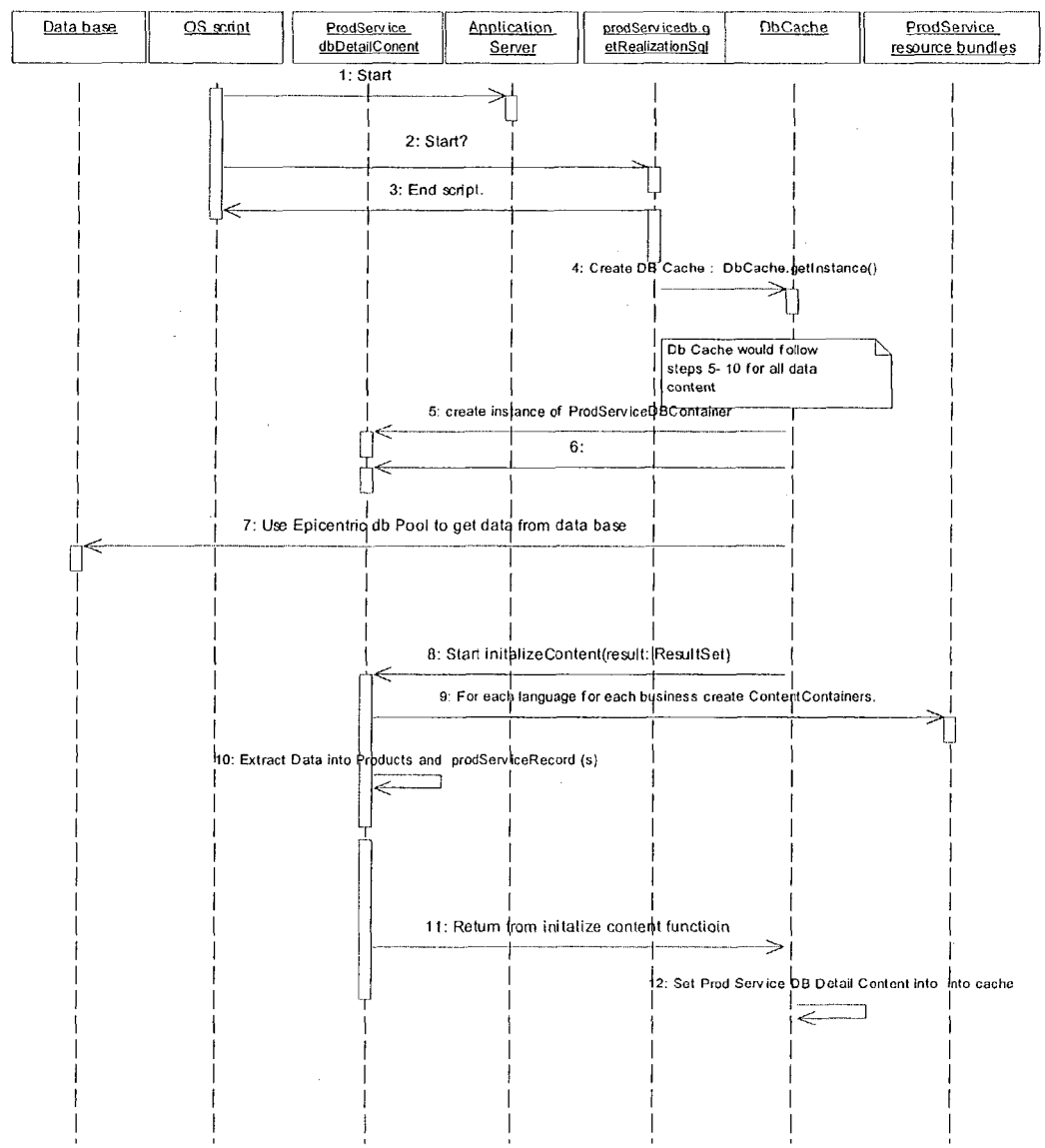
FIG. 26 is a sequence diagram that illustrates an example of the process of marshaling data from the database to the ProductsAndServicesBean for an embodiment of the present invention.

FIG. 26 is a sequence diagram that illustrates an example of how data is marshaled from the database and placed in the ProductsAndServicesBean for an embodiment of the present invention. In this case, it makes sense for the query to the database, for example, to join LinkDisplay (for display text only) and ContentDisplay tables where content type 154 is ProductsAndServices and where contentID, business, and language are equal. Then, full product and services display content can be created in a product and services record. It is likely that the Product and Services Bean will also keep a reference to a MenuMaker and DBLinkMaker 143 in order to do the work it needs to do.

Figure 27:
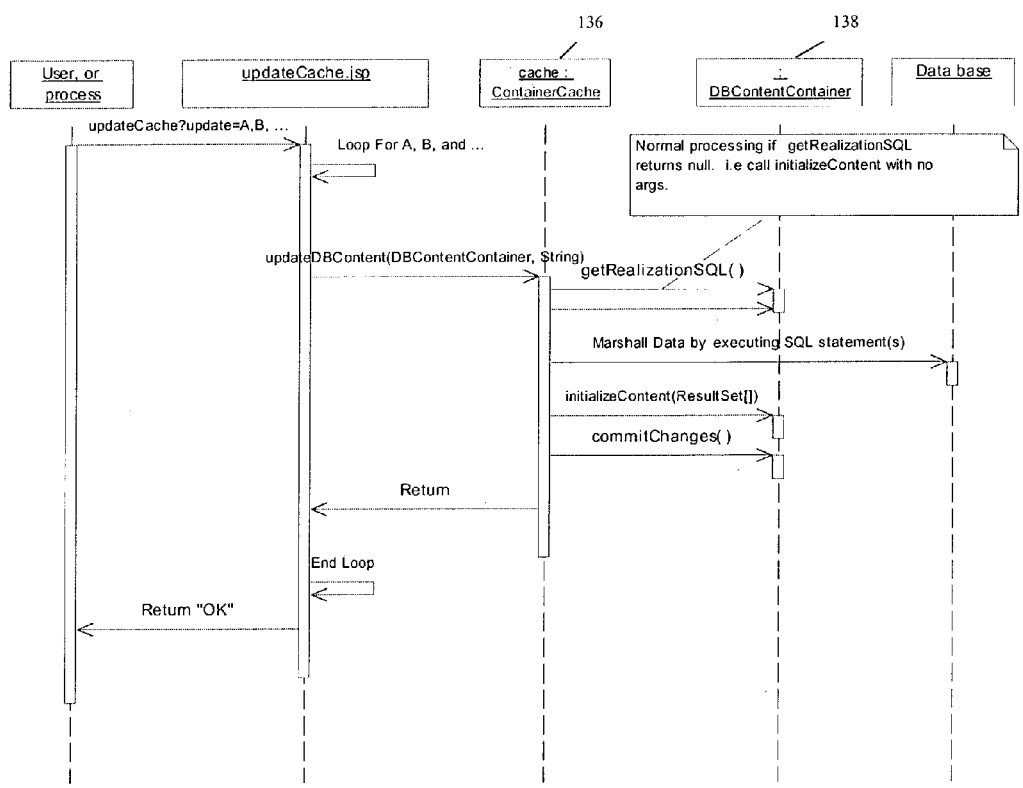
FIG. 27 is a sequence diagram that shows an example of the process of post initialization updating for a content container for an embodiment of the present invention.
Figure 28:
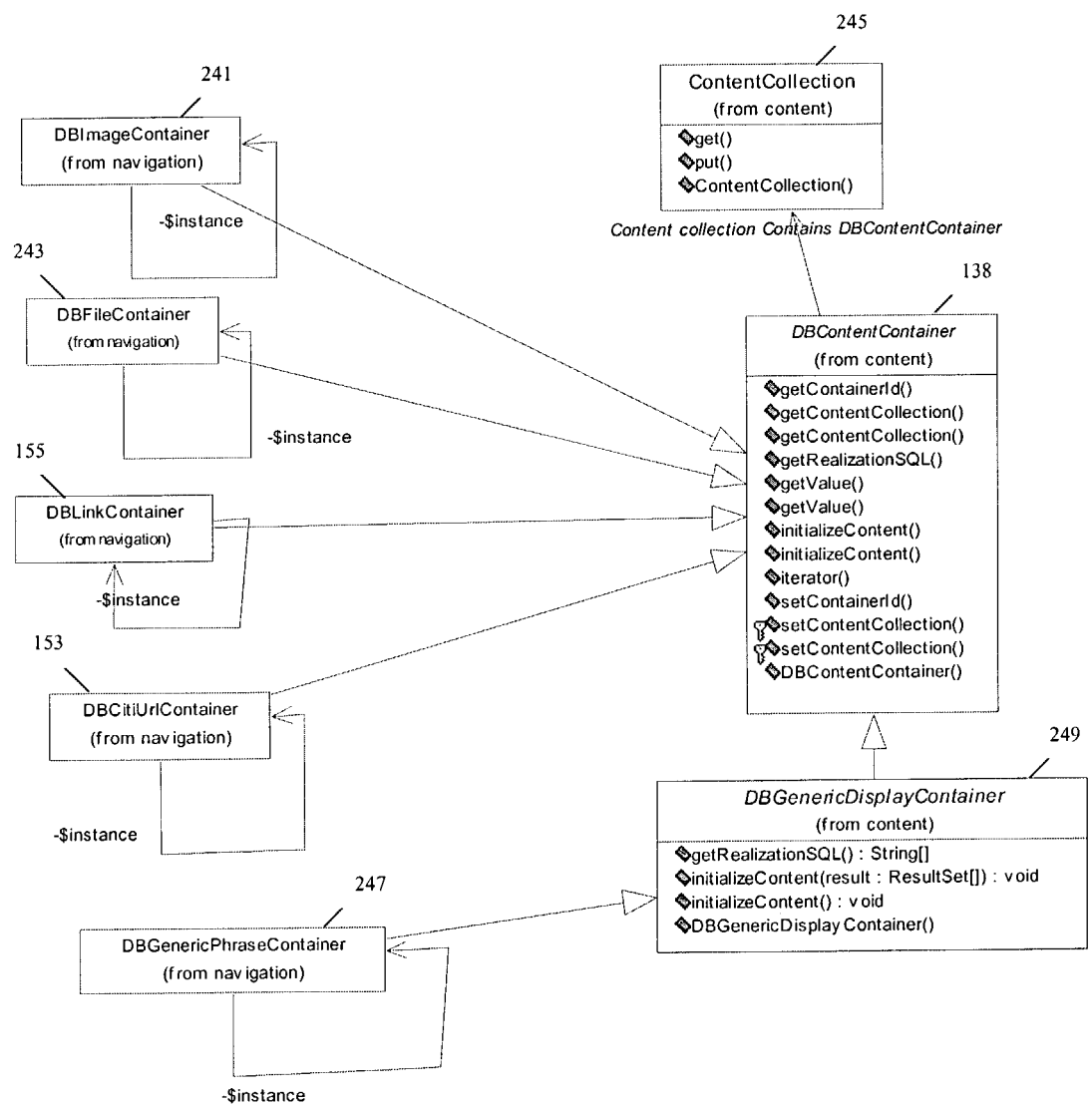
FIG. 28 is a diagram that illustrates examples of some of the core objects used in data caching for an embodiment of the present invention.

FIG. 27 is a sample sequence diagram for post initialization updating for a content container for an embodiment of the present invention. Clearly, any activity that changes the nature of the data stored in the object must be synchronized. This is true both at initialization and subsequent to initialization. In order to enhance performance, it is important that these activities take place as quickly as possible. This means that no methods that marshal data from the database should be synchronized. It is up to each container to protect the integrity of its own data. A page is developed that takes one argument 'update' and uses either the 'get' or the 'post' method. One or more container names, as they appear in the property file, can be used as the value to this argument. The basic principle of the update is that a call is made to the reinitialize (SQLResult) method of the DBContentContainer 138. In the reinitialization method, a new instance of the DBContentContainer 138 is created internally, and the content is initialized in that instance and then assigned to the static instance variable of the class. FIG. 28 is a diagram that illustrates examples of some of the core objects used in data caching for an embodiment of the present invention.

Turning now to a localization aspect involving, for example, language sensitive content for an embodiment of the present invention, a guiding principle of the localization aspect is that each business owns the content that ends up on a user's Internet device. Therefore, localization is on a hierarchy of business first and then language. A key requirement is that the businesses must be allowed to manage the content that is localized. In order to accomplish this, the text is stored in a database. Each business manages the content, for example, with Interwoven, and the content is then stored in the database ready to be initialized by the application for an embodiment of the invention. All local content is cached, for example, in the JVM in containers associated with each business language when the application is initialized. An API also refreshes content associated with various functions.

The way in which the basic caching mechanism works in an embodiment of the invention, for example, is that for each business and for each language, a container is constructed that contains content. Those containers are stored in a child of the base class, the DBContnentContainer 138 object. This container usually houses content as name value pairs. Given a name and a user profile 131 that contains the business and language associated with a user, these DBContentContainers 138 can retrieve records from themselves. These records would have been instantiated from the database when the application was initialized. A user presents the application with a request, and that user is associated with a business and a language. The request is associated, for example, with an Epicentric page that contains modules. Usually, a request is also associated with a content_ID from the Content_map table 144. The application passes that content ID and the Profile 131 into the view that is associated with control for that module. Each module's Epicentric bean will have marshaled the cached content needed to present content to the user. Then, at runtime the record object associated with the content is presented to the view, and the view hands the data, for example, to a JSP page that renders it efficiently. A good example of the foregoing is a product and services record. A product is localized per business per language. In other words, the same product is described differently in different languages. However, the data structure to support a product is the same for all businesses and all languages. Therefore, a product record is always the same and can be generically displayed by one JSP page. In the case that some language is particularly difficult, the JSP page can be customized to accommodate this.

In a localization aspect involving, for example, character encoding, all characters in the portal are, for example, Unicode encoded. This means that if some server is serving content to IPT 121 for an embodiment of the invention in some other encoding scheme, that scheme must be well known to the adapter that is reading the input and transformed to Unicode. In order to understand what the encoding is for data that is being processed by the portal other than database data, the URL table contains a character set field. All data stored outside of IPT 121 uses the URL table to point to the location of that data. For local files, the protocol is File, for web data the protocol is, for example, HTTP, or HTTPS. The HTTP response object transforms all character data to the proper encoding scheme. The IPT view contains a function to do this, which is supported, for example, by the JSP 1.2 standard.

In an embodiment of the invention, the portal is an integrator of content services, one of the most important of which is the portal database. Content is integrated, for example, in two ways, namely server side assembly of content and client side assembly of content. The difference between the two is that in client side assembly, the portal references content that is served directly to the user's browser from other trusted servers. In server side assembly, content is gathered from a variety of places, combined on a web page on the IPT server; and this content is then served from the IPT server to the customer's browser. Server-side assembly takes place in several ways.

For example, the toolkit for an embodiment of the invention collects data from the database and presents it. For another example, the toolkit uses the HTTP and HTTPS protocols to marshal XML documents and processes them either by hand or through the use of XSLT. For a further example, the toolkit uses the HTTP and HTTPS protocols in order to screen scrape. For still another example, the toolkit includes a banking account summary bean, which is capable of getting an account summary from online banking given only a CIN as a parameter. A simple example of server side assembly is the news module.

In a personalization aspect of an embodiment of the present invention, personalization occurs when the site's content is adapted to the user's runtime profile 131. The runtime profile contains information that comes from three sources, namely, the portal database 257, back end systems such as online banking, and a user's current state as defined by the user's activity inside of a particular session. Certain content types 154 are specifically extended to support personalization. In particular, data structures exist to allow the personalization of Ads, Menus 162, Links 160, and client side JavaScript. Other content types 154 can be personalized by following this extensible architecture either as it is commercially available or by extending the model as appropriate. One data structure that supports personalization is a set of tables to support an understanding of the product set. In particular, the product data structure allows an understanding of the account summary object in the profile 131, and helps to personalize ads based upon the characteristics of the information known about a customer's product set, assets, and liabilities.

Two main components to personalization include, for example, the user's runtime profile and the content. It is necessary to support personalization of the profile based upon two types of profile attributes. Some profile attributes are known when the system for an embodiment of the invention is built, such as a user's type. Such attributes are called 'named variables.' Other variables are business defined, and nothing is known about these variables until a particular business establishes them. Those variables are called 'dynamic variables.' Dynamic and named variables can come from the portal database or from some other source. IPT 121 personalizes content to customers, friends (prospects), and guests based upon the factors described above. The tool selected with which to integrate to build a rule engine, for example, is the JavaCC Lexical parser. This tool allows the user to define a grammar within which rules can be parsed and content can be selected. The JavaCC tool is extremely flexible and allows integration of the IPT toolkit with the parser in an extremely open manner.

In an embodiment of the present invention, personalization can be accomplished in a number of ways. For example, the rule engine can parse rules in order to choose content based upon the user's profile 131, which contains, for example, three types of information, namely, profile information stored in the portal database, runtime information about what ads have been displayed to a user and what pages have been shown to a customer during the particular session, and profile information collected from back end systems such as online banking OFX or the online banking AuthToc, or other information gathered by the login delegate. For another example, Javascript can be personalized by using the JavaScript database and the personalization infrastructure to change client side logic, depending on what is in a user's profile 131. For an additional example, the Profile 131 can be used to prefill variables into forms using a formMakerObject. For a further example, the profile 131 can be customized in the code to display personalized messages in accordance with any logic that a business wishes to create. Examples of this can be as rich as pie charts for account summaries or as trivial as displaying the user's CIN on a home page.

Figure 29:
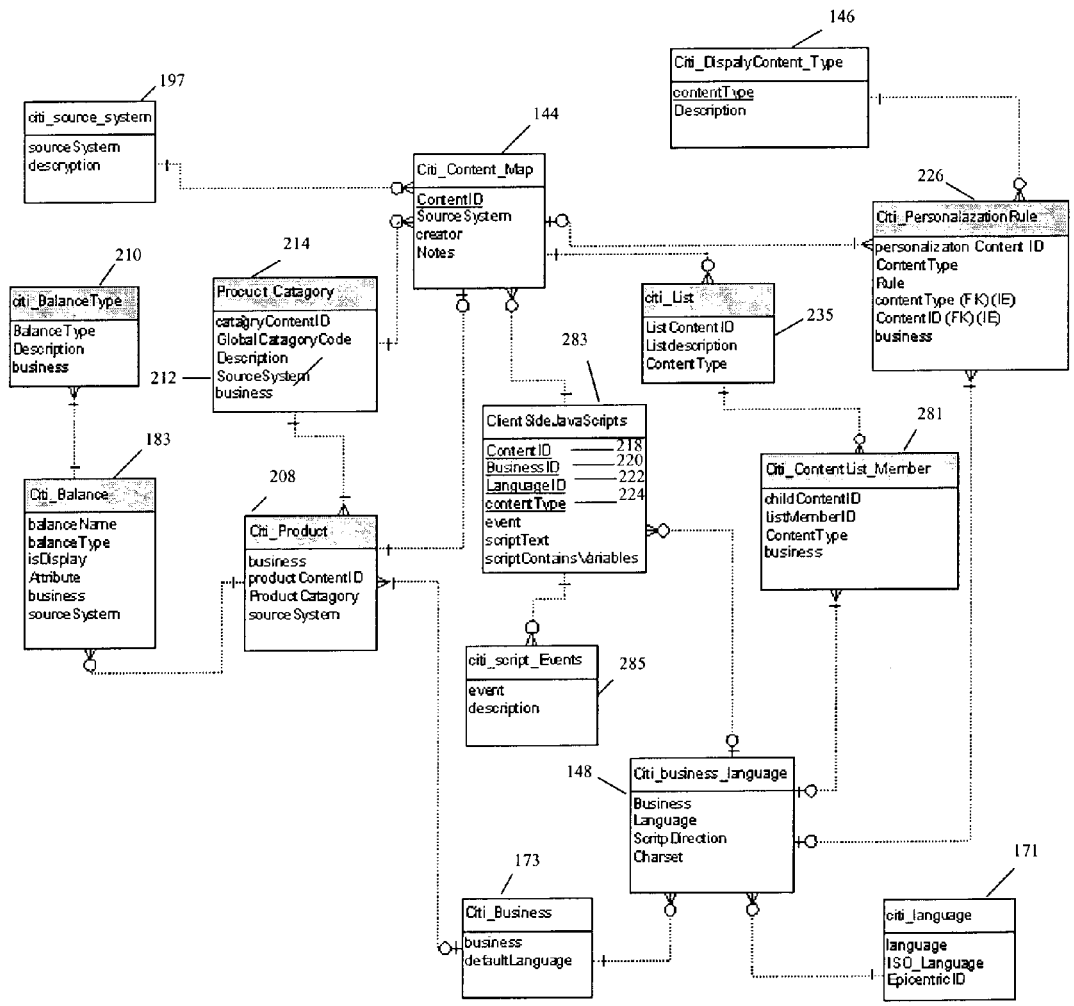
FIG. 29 is a diagram that illustrates an example of database support for personalization for an embodiment of the present invention.

FIG. 29 is a diagram that illustrates an example of database support for personalization for an embodiment of the present invention. In order to support personalization, three data structures are provided, namely, Rule tables, Products 185, and JavaScript. Javascript support is explored elsewhere herein. With regard to Products 185, the four main product tables are, for example, citiproduct_type, citiproduct 208, citi_product_balances, and citi_balance_type 210. All four tables have businesses as a part of their keys. There can be some global product data structures in some businesses across all constituencies of IPT 121 for an embodiment of the invention for which this is not true, and therefore preferably, products should not be turned into global structures. A financial institution can define banking products globally, which may not be recognized by all entities in the financial institution. An embodiment of the present invention includes source system 214 in the category table 216 and, by extension, the product table. This allows for non-banking products and services to potentially use overlapping product keys without creating any conflicts in the IPT database. These product tables allow personalization rules to map the products contained in the account summary object with the products contained in the content database. For example when online banking returns an account summary message, the product identified by the message does not necessarily correspond to the content ID for the marketing descriptions associated with these products in the portal. They can be mapped to the portal product set by associating a contentID with the product from the message. The product table allows this map to exist in the content database.

Categories for products allow the personalization rules for an embodiment of the invention to associate particular products with groups of products. For example, a rule might be not to sell a customer a checking account if the customer already has one. If a business offers five different product types, this rule can be made and enforced through the category table 214. The balance tables 216 allow the rule engine to understand and group these balances together. Several products have different types of balances. Balance type codes can be defined by the business in order to group various balances together across multiple products. A business balance expresses the many balance types a business uses. The balance type answers such questions as whether a balance is expressed in positive or negative terms. It might be an asset or a liability. The balance might indicate an ability to borrow, i.e., available credit. A balance might express how much money has been borrowed, i.e., a margin balance. The rule engine may need to understand and make rules concerning these balance types. For example, the business may want to market a loan consolidation account, such as a home equity loan, to a customer who has credit distributed across a wide set of products. It is up to each business to establish these balance types and allows a business to create arbitrarily complex relationships between account balances.

The rule table is a primary driver for personalization. Rules affect particular content types and are thus associated with fields, such as contentID 218, businessID 220, languageID 222 and a contentType 224 in order to become unique. The contentID 218 for a rule is the placeholder that the code or runtime system recognizes. When the rule is engaged, one of the child content items is selected by the rule. The contentID 218 of the rule is the master content ID for a set of children contentIDs. It is the child that is selected by the rule itself, which is contained in the rule field of the Citi Personalization Rule table 226. The content ID is chosen from a list of content IDs associated with the rule. The list is contained in the Citi_List_Member table 228. The purpose of this table is to contain lists of content IDs associated with content types that the rule will select. Ultimately, the paradigm for all personalization is to pick a content ID from a list of ContentIDs or to pick a value that is derived entirely from variables that are stored in the profile 131. If a product is to be selected, the product tables support the selection by defining the attributes that a rule may use as criteria. For link production or menu production, the rules are more straightforward. Ads are for products and are assisted by the products tables, which also include products.

The rules are strings that are parsed to either choose a runtime variable, such as a user's name, or a piece of content from a list container, such as productsAndServicesList.allAds. A general characteristic of all rules is that at least all operators must be surrounded by at least one white space character. A key feature of the rule engine is the ability to execute one rule inside of another rule, which allows businesses to create generic rules system rules. Many business rules can work on these system rules, which enables the business to have a fairly simple interface into the rule engine. The integrator creates complex system rules, such as the foregoing. The web master uses those rules to create the day-to-day business rules. The grammar of the rule engine is described, for example, with four terms, namely, Types, Operators, Verbs, and Reserved variables.

The following are examples of rules that are parsed using the syntax described herein:

RuleRule name: mainMenuRule—
/*
This rule chooses a default menu of guestMainMenu, or a friendMainMenu or a customerMainMenu from a list of menus named "mainMenuRule
*/
Integer CUSTOMER=1;
Integer FRIEND=2;
Integer VISITOR=3;
// Restrict content from the mainMenu contents
CHOOSE content FROM ListContainer.menuList.mainMenu;
IF (Profile.User.UserType==CUSTOMER)
    content="customerMainMenu";
ELSE IF (Profile.User.UserType==FRIEND)
    content="friendMainMenu";
ELSE
    content="guestMainMenu";
/*
   Analyzing the mainMenuRule in detail—
   At lines 1-3: Three constants, CUSTOMER, FRIEND, and VISITOR are defined.
   At line 5: CHOOSE a content FROM a list of contents with the
   ListContainer.menuList.mainMenu. The variable name content is reserved and will automatically be typed as a STRING.
   At line 6: An IF statement is made comparing a profile variable to a constant.
At line 7: If the IF is evaluated as true, then content will be assigned to
    'customerMainMenu'; after this is done, the function continues to process.
    At line 8: An ELSE IF statement is made; this statement is executed only if the result of line 6 is false.
    At line 9: If line 8 evaluates to true, this assignment is made.
    At line 10: The ELSE statement with no IF becomes the default behavior of the rule.
    At line 11: If both lines 6 and 8 return false, this line of code is executed, and content is returned. If the choice "customerMainMenu", "friendMainMenu", or "guestMainMenu" is not found in the mainMenu list, the default contentID from the field CITI_PERSONALIZATION_RULE.CONTENT_RETURNED_ON_ERROR is returned; if the field is NULL, an empty String is returned; if no return statement is found in a rule, the content is automatically returned at the end of processing; otherwise, a return statement automatically halts the interpreter, and the value of the content is returned; and the rule contains a CHOOSE <content|contentList> FROM <expression> where content is the contentID returned or contentList is a list of contentIDs returned.
*/
   Rule name: productAdList—
/*
This rule is a building block for other rules and is used by another rule within these examples.
The Choice is a list of content instead of a piece of content.
*/
Integer FULLAUTHENTICATED=1;
Integer CUSTOMER=1;
List ads=ListContainer.adList.allAds;
// Restrict contents from allAds
CHOOSE contentList FROM ads;
// Remove all ads we have seen already from the list of all ads
contentList=REMOVE Profile.User.AdHistory FROM ads;
IF (contentList)
    ads=contentList;
// Remove the current content page displayed from the list of ads
contentList=REMOVE Profile.User.CurrentPrimaryContentID FROM ads;
IF (contentList)
    ads=contentList;
// Remove all ads of products that the customer owns
IF (Profile.User.UserStatus==FULLAUTHENTICATED)
    {
    contentList=REMOVE AccountSummary.ProductContentIDs FROM contentList;
    IF (Profile.User.UserType==CUSTOMER AND contentList)
        ads=contentList;
    }
// Return the ads
contentList=ads;
/*
   Analyzing the productAdList in detail—
   At lines 1, 2: Two constants FULLAUTHENTICATED and CUSTOMER are defined.
   At line 3: A variable ads of type List (array of String) is assigned to a list through the statement List ads=ListContainer.adList.allAds; ListContainer is a reserved word in the personalization engine grammar; ListContainer is used for accessing the content list of CITI_LIST_MEMBER table through the DBRuleListContainer object; and ListContainer.contentType.contentID returns all the LIST_CONTENT_MEMBER_ID from the CITI_LIST_MEMBER with LIST_CONTENT_TYPE value contentType and LIST_CONTENT_ID value contentID.
   At line 5: CHOOSE contentList FROM ads places a restriction on the reserved variable contentList whereby contentList can only have contents that are in the allAds list.
   At line 7: The statement 'contentList=REMOVE Profile.User.AdHistory FROM ads' creates a list of all ads that have not been displayed to the user; the resulting list is empty if all of the history ads are in the allAds container; an empty list is evaluated as false for a Boolean operation; and contentList is assigned to the resulting list from the REMOVE statement.

At lines 8-9: If the contentList is not empty, the temporary list ads is assigned with the list from contentList.

At line 11: The statement 'contentList=REMOVE Profile.User.CurrentPrimaryContentID FROM ads' insures that the CurrentPrimaryContentID, i.e. the page being viewed is not in the container; it is important to note that for this operation one ad is taken out of the container of ads, rather than a list of ads, i.e., the verb REMOVE FROM is polymorphic; it can operate on containers with containers, or it can operate on containers with a single element; it is important to also note that the operation must be type safe; and an Integer list or a Boolean cannot be taken out of a String list, and an exception is thrown if that is attempted.

At lines 12-13: This line is identical to line 8-9.

At line 15: This IF statement checks whether the user has logged in.

At line 17: The statement 'contentList=REMOVE AccountSummary.ProductContentIDs FROM contentList' removes all the product ads from the contentList if the user already has these products.

At lines 18-19: If the user has indeed a financial account (CUSTOMER), and the contentList container is not empty, the ads container is assigned with the contentList.

At line 22: The contentList is assigned with the ads list container; this is the list that is returned from the execution of this rule.

*/

Rule name: GenericAdPick—
/*
    This rule uses the productAdList rule that chooses a list of ads, and then chooses a random add from that list. This rule demonstrates how rules can be used as building blocks to create more complex rules.
*/
// Get list of product ads from the "productAdList" rule
List productAdList=EXECUTE RULE "productAdList";
// Set the return for this rule
CHOOSE content FROM productAdList;
// Randomly pick one ad from the productAdList
content=RANDOM CHOICE FROM productAdList;
/*
    Analyzing the GenericAdPick in detail—
At line 2: Variable productAdList is assigned a content list returned by executing the rule productAdList.

At line 4: The statement 'CHOOSE content FROM productAdList' implies that one contentID is returned by this rule, and the contentID must be one of the content that is returned by the productAdList rule; this statement itself is not assigning any value to the reserved variable content.

At line 6: The variable content is assigned one content at random from the content list productAdList; the contentID assigned to content is the value returned by this rule.

Rule name: ContactNumber—
/*
    This rule gives a different contact number to persons who have substantial sums of money that is being managed for them.
*/
CHOOSE content FROM ListContainer.adList.allAds;
IF    (Profile.User.UserType==FULLAUTHENTICATED AND
    AccountSummary.NetValue.categoryTotal >100000)
    content="HighNetWorthContactNumber";
ELSE
    content="defaultContactNumber";
/*
    Analyzing the ContactNumber in detail—
At line 1: The statement 'CHOOSE content FROM ListContainer.adList.allAds' implies that one contentID is returned by this rule, and the contentID must be one of the contentID from the CITI_LIST_MEMBER, where LIST_CONTENT_TYPE=adList and LIST_CONTENT_ID=allAds; this statement itself is not assigning any value to the reserved variable content.

At lines 2-3: The IF statement is checking whether the user is logged in and that his/her net worth is greater than 10000.

At line 4: If the IF statement evaluates to true, the contact phone number is assigned to the high net worth link.

At line 5: Otherwise, the normal phone contact is given to the customer.
*/Rule
    Name: CreditCardLink—
/*
    This rule markets a credit card to users who are not eligible to use the credit card transaction engine. It links to the credit card transaction engine for users who are logged on and have a credit card.
*/
Integer FULLAUTHENTICATED=1;
Integer CUSTOMER=1;
CHOOSE content FROM ListContainer.linkList.creditCardsLink;
// If the user is a customer and logged on and has credit card product
// then take the customer to the account summary application.
IF    (Profile.User.UserStatus==FULLAUTHENTICATED AND
    Profile.User.UserType==CUSTOMER AND
    AccountSummary.CategoryContentIDs    CONTAINS "creditCard")
    content="fsCitiDirectAst";
// Else take the customer to credit card product information
ELSE
    content="creditCardsLink";
/*
    Analyzing the CreditCardLink in detail—
At lines 1, 2: Two constants FULLAUTHENTICATED and CUSTOMER are defined.

At line 3: The statement 'CHOOSE content FROM ListContainer.linkList.creditCardsLink implies that one contentID will be returned by this rule and the contentID is restricted to be within the content list returned by ListContainer.linkList.creditCardsLink.

At lines 6-8: The IF statement is checking whether the user is logged in, he/she is a customer, and has a credit card.

At line 9: If the IF statement evaluates to true, a contentID that reference to a link for a DA task is returned.

At line 12: Otherwise, a contentID that reference to a link for credit card product information is returned.
*/
    Rule name: CheckingAd—
/*
    This rule checks to see if the customer has twice as much money in savings and checking as he/she owes on his/her credit card. If the customer meets this criteria, the rule displays an ad that advises the customer to pay off his/her entire credit card balance. Otherwise a random ad is chosen
*/
    List ads=ListContainer.adList.allAds;
CHOOSE content FROM ads;

```
IF (ads CONTAINS "payOffYourCreditCardAd" AND
    (AccountSummary.    CategoryBalance.savings.catego-
ryTotal+
    AccountSummary.CategoryBal-
        ance.checking.categoryTotal
    >2*                    AccountSummary.CategoryBal-
ance.creditCards.categoryTotal) AND
    Profile.User.CurrentPrimaryContentID=="fsCitidirect
        PmkTfr")
        content=GET "payOffYourCreditCardAd" FROM ads;
ELSE
    content=RANDOM CHOICE FROM ads;
/*
    Analyzing the CheckingAd in detail—
At line 1: A variable ads of type List is assigned to a list
through the statement List ads=ListContainer.adList.allAds.
At line 2: CHOOSE contentList FROM ads places a restric-
tion on the variable contentList whereby it can have only
contents that are in the allAds list.
At lines 3-7: The IF statement is checking whether the adver-
tisement that it is desired to display is in the ads list, the
amount of money in savings and checking together is more
than twice the amount that is owed on the credit card, and the
customer is on the 'Make a Payment and Transfer' page.
At line 8: If the IF statement evaluates to true, a contentID
'payOffYourCreditCardAd' that displays an advertisement
for pay off your credit card is returned.
At line 10: Otherwise, a random advertisement contentID is
returned.
*/
```

Verbs are used in the foregoing rules, which are essentially operators that are expressed as a word or collection of words. Verbs have been separated from operators in a simple manner, and if the syntax element is a collection of words, the syntax is referred to as a verb. FIG. 30a-30e is a table that illustrates examples of verbs utilized for an embodiment of the present invention.

At runtime, a variable token in a script stored in the database is transformed to legitimate client side Javascript values. The values contained in the profile are substituted with the values in the <% variable %> tags, if the variable references the profile object 131. For example, a script in the database (CITI_JAVA_SCRIPTS.SCRIPT_TEXT) might contain the following string:

```
if (<% Profile.User.UserStatus %>=3)
    {alert("You are NOT signed in"); }
else if (<% Profile.User.UserStatus %>==2)
    {alert("You signed in as a FRIEND"); }
else if(<% Profile.User.UserStatus %>==1)
    {alert("You signed in as a CUSTOMER"); }
```

It is also possible to create one string from a complex combination of variables. For example, the token below should be resolved first into one number and then turned into a string.

<% AccountSummary.CategoryBalance.checking.categoryTotal+
AccountSummary.CategoryBalance.savings.categoryTotal %>

The object ExpressionParser is used in order to make this transformation. The personalization engine also uses this object. Finally, it is possible to evaluate variables that are unknown to the system as the software is created but become known later, as individual businesses add their own variables to the profile 131. These types of variables can be stored in the portal database or can be available only at runtime, and thus be session variables. Below are two examples of such tags.

<% Profile.Runtime.User.businessVariableName %>
<% Profile.Runtime.PersistentUser.businessVariableName %>

In the examples above, the businessVariableName can be the name of any value stored in the profile 131 through the method Profile.setSessionProperty( ) or the portal database (CITI_USER_DATA.CONTENT_ID). The rules for evaluating such expressions are exactly the same for the evaluation of JavaScript phrases and rule's statements. Examples of these rules include profile access methods and AccountSummary access methods.

IPT 121 for an embodiment of the invention supports dynamic client side JavaScript at runtime. These scripts can contain variables which change at runtime. The Javascripts exist at three levels of scope, namely, global scope, business scope, and business language scope. By scope, it is meant that one script might exist globally in order to cover a set of generic problems. A particular business might wish to customize the Javascript that exists globally, and therefore has a script of its own, but using the same contentID. In a business, it is possible that a language specific variant of the script might exist. A global, business, or business language script can all exist autonomously or together. A script can exist globally and in the business language context, or it can exist only in the business context, or any combination of scope. The rules of precedence are that the more refined a name space in which a script exists, the higher it is in terms of precedence. For example, if a script exists in all three name spaces, the script that is processed is the one that exists in the business language space and not the business or global space. Business language scope has priority of precedence; business scope has middle precedence; and global scope has the lowest precedence. A script exists in the context of a displayType 287. For example, scripts might affect links, images, FormMembers, Forms etc. It is possible that the same contentID for a script might affect more then one contentDisplayType. The Content ID of a script is the same ID as those content items associated with the script. For example, if a form has a content ID such as 'login', the script associated with that form is 'login.'

Figure 31:
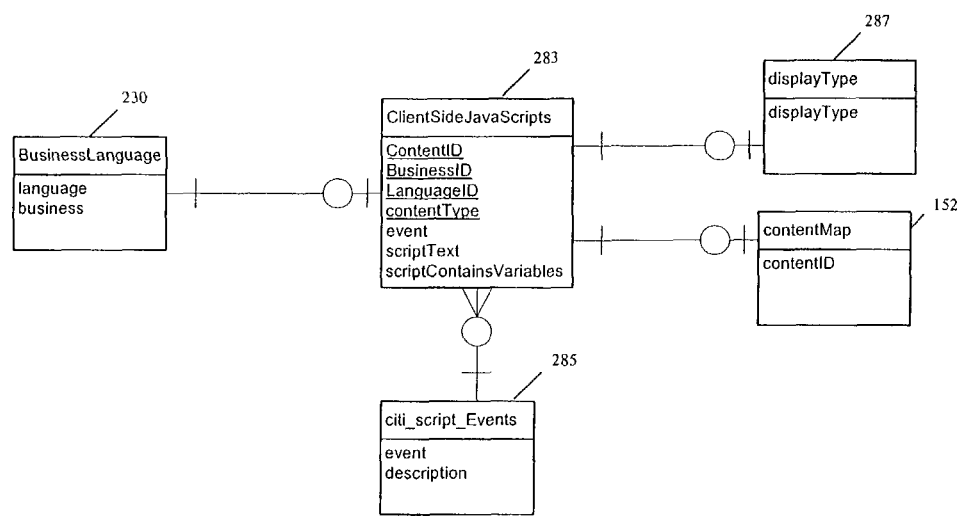
FIG. 31 is a diagram that illustrates an example of relationships to the IPT database for an embodiment of the present invention.

FIG. 31 is a diagram that illustrates an example of relationships to the IPT database for an embodiment of the present invention. Two basic problems that are solved by the data are, for example, creating a data structure and naming convention to support the various scopes and supporting the substitution of variables inside JavaScript at runtime. These problems are solved through software conventions rather than through database constraints, or the creation of many tables that can model the problem's solution in the database. This solution involves the creation of data elements, such as two Epicentric groups 'GlobalBusiness' and 'AllLanguages', a business named 'GlobalBusiness' in the business table, a language named 'AllLanguages' in the language table, and a record in the BusinessLanguage table 230 that contains both 'GlobalBusiness' and 'AllLanguages'.

Figure 32:
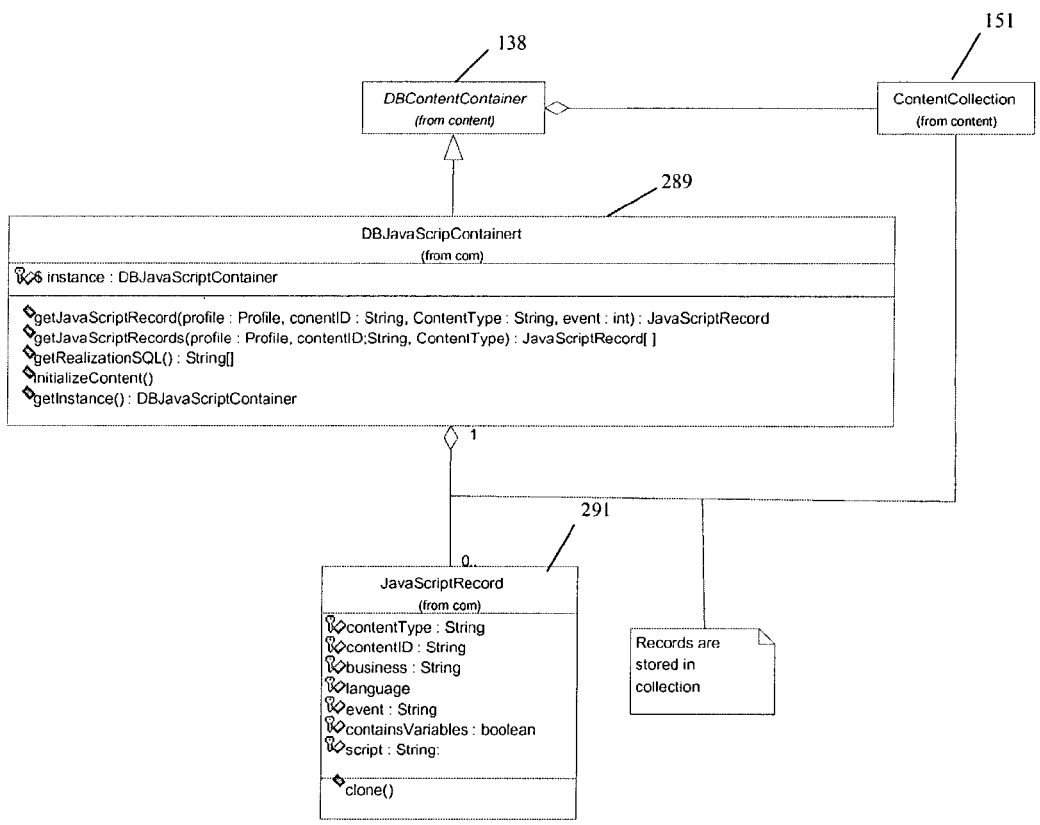
FIG. 32 is a diagram that shows examples of objects required to initialize the JavaScript records from the database for an embodiment of the present invention.
Figure 33:
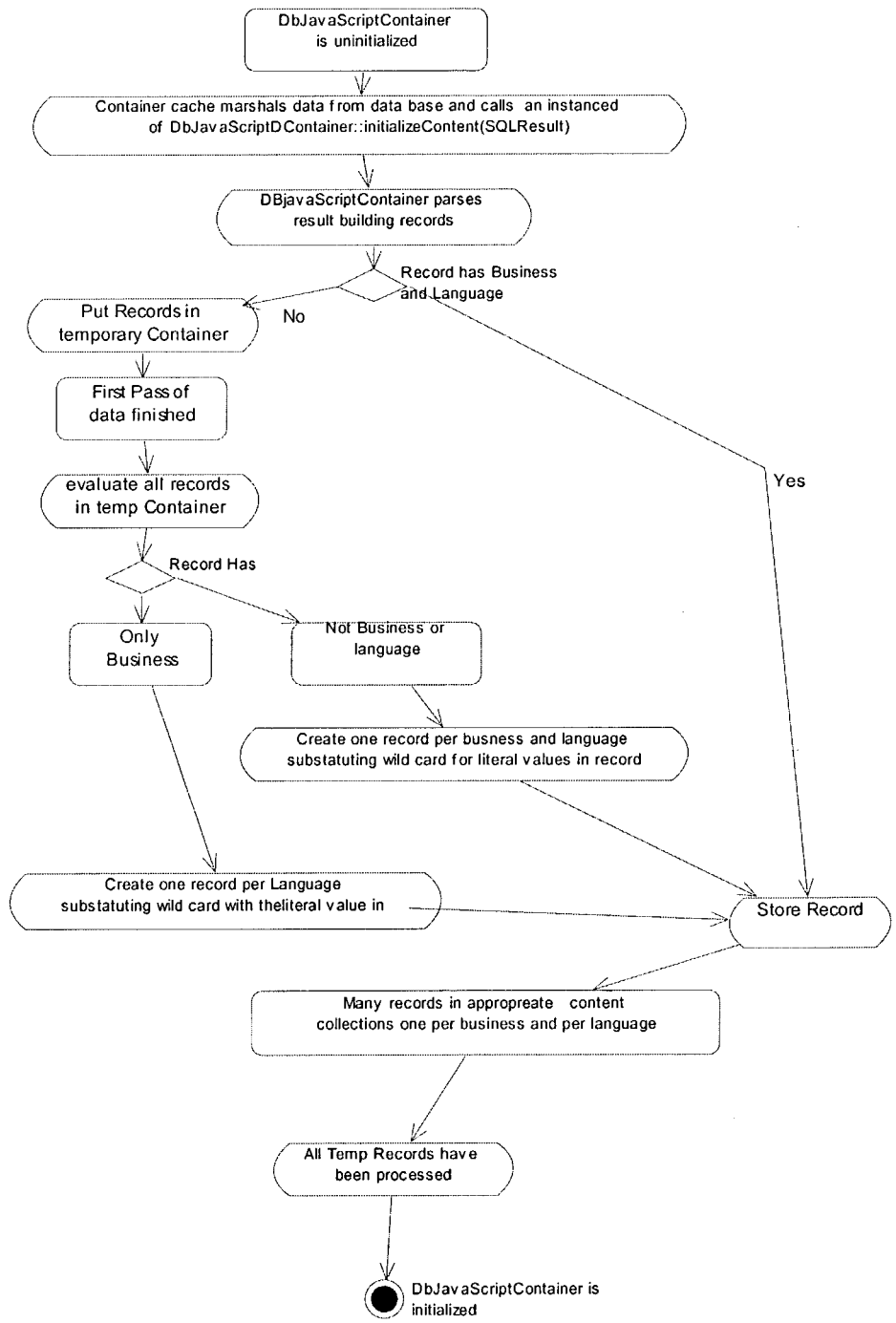
FIG. 33 is a flow chart that illustrates an example of the process of initializing the JavaScript records from the database for an embodiment of the present invention.
Figure 34:
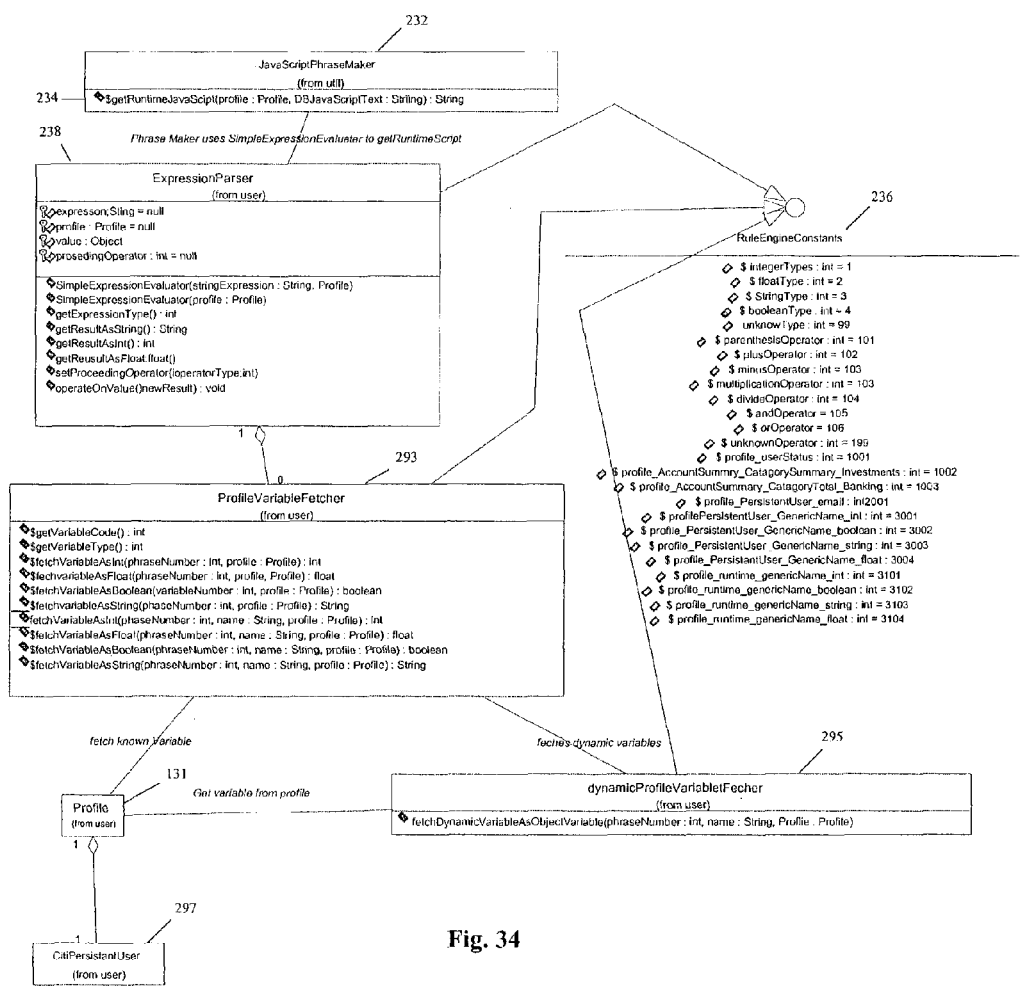
FIG. 34 is a diagram that shows examples of general mechanisms and the purpose of each object required to initialize the JavaScript records from the database for an embodiment of the present invention.

FIG. 32 is a diagram that shows examples of objects required to initialize the JavaScript records from the database for an embodiment of the present invention. In the loading process, no special consideration of the <% variable %> fields are taken. An approach to solving the problem that records are stored in the database 257 with wild cards is to de-normalize (i.e., create multiple records where one would be sufficient in order to simplify the runtime environment) that storage mechanism in the content container when the records are loaded. Multiple records are created in memory so that downstream processes need not take special consideration of the wildcards. FIG. 33 is a flow chart that illustrates an example of the process of initializing the JavaScript records from the database for an embodiment of the present invention. In order to load the container records that contain business and language, they are first loaded into appropriate containers, then records that contain wildcards are loaded into all containers that should contain them FIG. 34 is a diagram that shows examples of general mechanisms and purpose of each object required to initialize the JavaScript records from the database for an embodiment of the present invention. The JavaScriptPhraseMaker 232 object is the high-level encapsulation class that can be used, for example, in the JSP layer or by any of the core framework objects for an embodiment of the invention, such as Link-Maker 140, FormMaker, CitiPage 299 etc. The JavaScriptPhraseMaker 232 object has only one function, which is static. getRuntimeJavaScript 234 takes a record from the container and a profile 131 and thereafter returns a String with the personalized JavaScript. There are no side effects to this function, and the original String that is passed to this function is not altered. The function is thread safe, and the object has no attributes, except ones it inherits from its implementation of the RuleEngineConstants 236 interface. A basic manner in which this function works is to build a return String by swapping all the <% tags %> in the original strDBJavaScriptText argument for those that would be returned by calls to the ExpressionParser 238. The ExpressionParser 238 object is a core worker object, which carries state and is instantiated serially by the clients who use it. JavaScriptPhraseMaker 232 is an example of such an object. The ExpressionParser 238 object is constructed in the static function described above, and its purpose is to process an expression.

A key feature of the rule engine and the java script support of the IPT for an embodiment of the invention is that there is no need for a software release to take place in order to change, add, or delete a rule. Using the content management system, a business can try out different marketing strategies with little to no operational involvement. This feature reduces both the life-cycle of rule creation and the cost, which enables a business to react more rapidly to market conditions.

Figure 35:
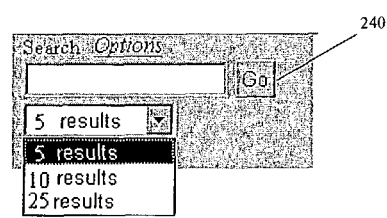
FIG. 35 is shows an example of a GUI screen for a simple search for an embodiment of the present invention.

The users of the IPT 121 for an embodiment of the present invention can search the site for information, which is a standard feature of portals that is imbedded in the core part of the IPT 121. Only the user's business and current language are searched, and search only takes place in the language associated with the session. The IPT database is enabled for search, and it is not necessary to examine dynamic content or flat files when making a search. Each business is allowed to have a delegate do additional tasks for search if is so chooses. FIG. 35 is shows an example of a GUI screen for a simple search for an embodiment of the present invention. Simple search allows the user to link to advanced search and to choose a number of results. The default of results returned is business configurable, and the default in the reference implementation is a predetermined number, such as five. Simple search allows the user to input a string and either press, for example, a 'Go' button 240 or the user's 'return' key to engage the search engine to do a search and return the results. This interface can be placed, for example, on the home page (index.jsp), or on citiPage.jsp.

Figure 36:
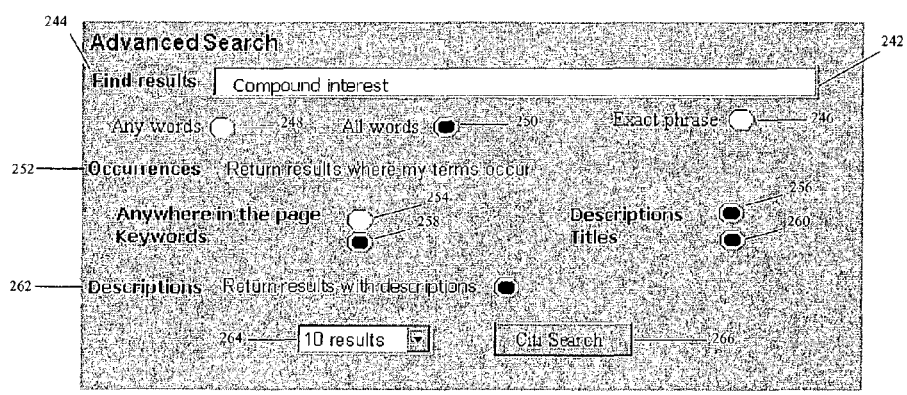
FIG. 36 is a sample GUI screen for advanced search for an embodiment of the present invention.

FIG. 36 is a sample GUI screen for advanced search for an embodiment of the present invention. Advanced search is not placed on the home page but is the primary content, for example, for a web page. Users can enter text into the text box. A different type of search is conducted with each choice of radio buttons in a 'Find results' area 244. The 'Exact phrase' button 246 allows the user to ask that an exact match for a phrase such as 'mortgage rates' be searched for. An 'Any words' button 248 allows the user to ask if all words in a group of words are found in a keyword, title, or body of a page. For example if the term 'mortgage rates' is entered here and a rate table has the word 'rates' and the word 'mortgage' in the body keywords or title of the page, this result is returned. However, if only the term 'rate' occurred, the page will not be returned. The 'All words' button 250 allows the user to ask if any word in a group of words can be found. For example, if the term 'mortgage rates' is entered here, and a rate table has the word 'rates' and the word 'mortgage' in the body keywords or title of the page, this result is returned. If only the term 'rate' occurs, this result will be returned as a positive one.

The 'Occurrences' selections 252 allow the user to choose the type of meta content that is searched. In particular, the user is able to search fields of the database for content, for example, 'Anywhere in the page' (the detail field) 254, 'Descriptions' 256, 'Keywords' 258, and 'Titles' 260. The user is able to pick one or many of these categories. The more categories a user chooses, the longer a search may take. The default of the reference implementation is the body of the page only. The 'Descriptions' button 262 allows the user to choose if the description of a link associated with search results is returned. The 'Number of results' field 264 acts the same way as its counterpart in the simple search. The 'Submit button' 266 allows the user to submit a search. If a user does not actually fill in a search term and selects the Submit button 266, the request is not submitted, and a JavaScript popup informs the user of the mistake. Two types of search results are returned. In one case, a set of links is returned. In the other case, the default search will return both the links and the descriptions of the links. Where there are no descriptions, a "No description available" phase will be implemented. Each result has a link to refine the search, which leads to the advanced search page. The advanced search page pre-fills all the parameters of the last search. Personalized content and links to personalized content are not searched.

The general architecture of searching uses the IPT general framework of an embodiment of the invention. For example, an Epicentric bean hosts three views, each of which corresponds to one of the search interfaces. The actual search engine, for example, is the Oracle database. In general, queries to the database using the SQL keyword is the mechanism used by the engine. Two tables are searched for content. In the content display table 150, a keyword field is used to search for keywords. The following is a description of an example of that field from the database:
Anywhere in the page=citi_lob_content_display.detail
Descriptions=citi_content_display.long_descryption, citi_content_display.short_descryption
Keywords=citi_content_display.keywords
Titles=citi content_display.title, citi_content_display_short-Descryption Each field that is searched corresponds to a field in the database. The only content that is searchable is content that shares a content ID with the link that a content type 154 can use. For example, if the term 'interest rate' is found in a productAndService detail field with the content ID EZChecking, it is assumed that there will be a link with the contentID EZChecking.

Figure 37:
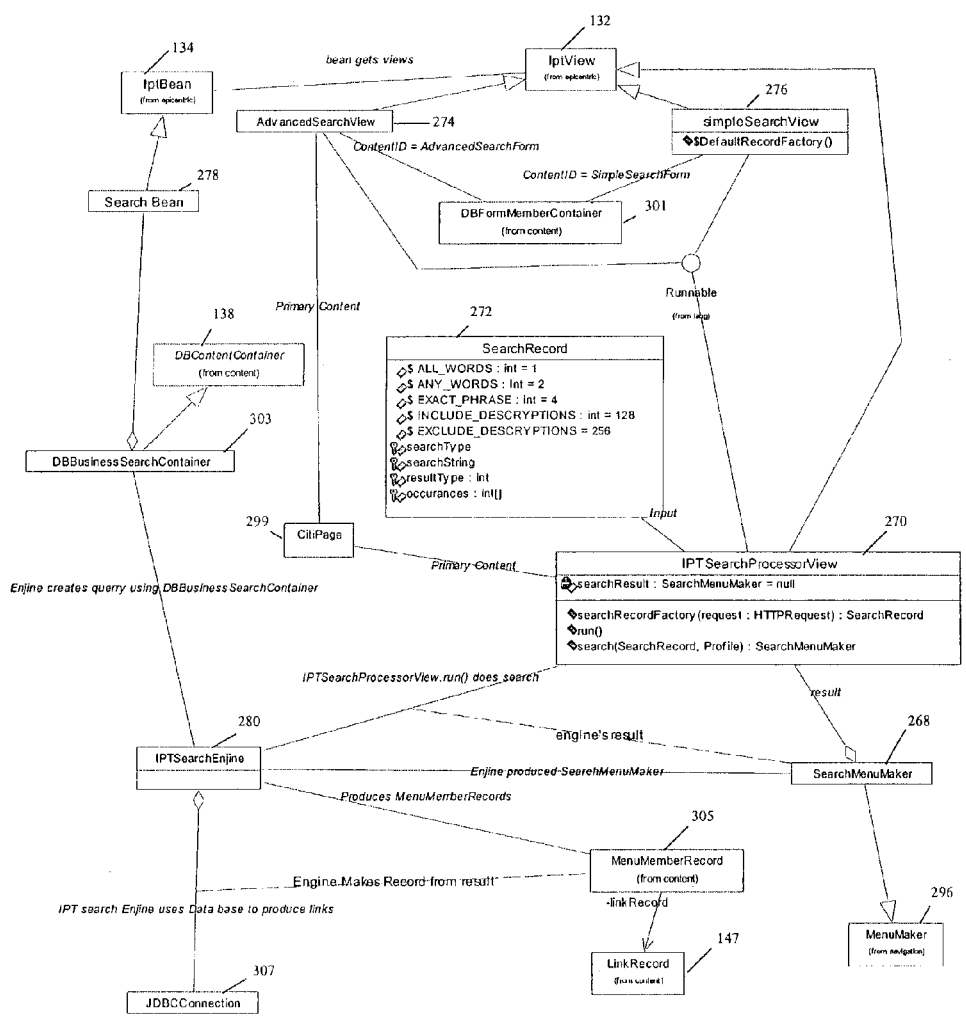
FIG. 37 is a schematic diagram that illustrates examples of the core helper classes that work together to implement search according to an embodiment of the present invention.

In an embodiment of the invention, almost no work takes place, for example, at the JSP, outside of presentation. FIG. 37 is a schematic diagram that illustrates examples of the core helper classes that work together to implement search according to an embodiment of the present invention. For the most part, even presentation is taken care of, for example, by the Java classes for SearchMenuMaker 268 that takes care of the display of the actual result.

The IPTProcessSearchView 270 object processes both the simple search and the advanced search. This means that both views must be capable of supplying this object with enough data to create an appropriate SearchRecord 272. A way to do this is to have both forms that are submitted to the JSP page that controls this view contain the same data. A way this is accomplished is to force the form that produces the simple search to put all the necessary values not collected by the user into hidden fields. This allows the input to be the same for both forms. It also allows the business to control the default parameters of search instead of the software. Because of this paradigm, it is not necessary to distinguish between the two forms in the IPTProcessSearchView 270 object. In a normal search sequence, the user submits a search. The search is processed, and sets of links that are the search results are passed back to the user. The com.citigroup.cdcla.ipt.applications.search package contains a set of classes that IPT 121 uses to facilitate search. The search engine is the driver class that coordinates the relationship between the query and the search mechanism. In one aspect, the search mechanism is JDBC, and what is searched is the database. A search record encapsulates a search query and a search result. The search bean 278 is an Epicentric adapter, i.e. an Epicentric bean. It is important to realize that this is not a Java bean, but an Epicentric bean, which represents the model in a model-view-controller class.

The controller classes, for example, are AdvancedSearchView 274, SimpleSearchView 276, and IPTSearchProcessorView 270. The two classes, AdvancedSearchView 274 and SimpleSearchView 276, present forms to the user. Both contain enough information to create a search record. They submit themselves to page=citipage bean=searchbean, view=IPTSearchProcessorView. This class creates a SearchRecord and passes it to the IPTSearchEngine 280. The search engine builds a query to the database and executes it using a dbConnection from the DB pool. The result of the search is then passed back to the IPTSearchEngine 280, which makes a SearchMenu from the result. The SearchMenu is passed to the JSP layer and the JSP page does the presentation. This Epicentric primary content module is then presented appropriately, for example, on citiPage 299.

A core of the architecture for an embodiment of the present invention is the production of content, and the portal functions largely as a content engine. There are many ways that content is presented to users. The following discussion focuses on how content is generated from the portal database, as well as many of the other possible paths for content production, client side assembly, and server side assembly using various techniques including the HTTP and HTTPS method. Client-side assembly takes place when content is presented from different servers inside the frameset in order to compose a user's pages. This is done, for example, by creating a frameset with another server as one of the frames, or by including images from other servers, or even by referencing objects, such as applets from other servers in the code for an embodiment of the invention.

Methods for performing client-side assembly according to an embodiment of the invention include, for example, presenting a federated server inside the IPT frameset, presenting a non-federated server in a new window, presenting content from the IPT web server inside the IPT frameset, and/or displaying images from other servers inside the IPT framesets. In presenting a federated server inside the IPT frameset, content is presented from a trusted server inside one of the IPT frames, such as the content frame. This can be done under an agreement with the federated server that allows it are to operate inside the portal frameset, and with navigation and UI issues related to look and feel resolved. It is also subject to an assurance that the federated server knows how to handle inactivity timeouts while it occupies the primary content position in the IPT frameset. With respect to presenting a non-federated server in a new window, for any server that is not in the IPT federation, content is displayed only in a window that is independent of the frame in which the IPT 121 is operating. This is done, for example, in case such guarantees are not received from the non-federated server.

With regard to presenting content from the IPT web server inside the IPT frameset, session management must be coordinated. This can be accomplished, for example, by including a Java-script page with all such content to perform the session management. With respect to displaying images from other servers inside the IPT framesets, images can be linked to from other servers inside the IPT frames. A reason for doing this, for example, is if the image is somewhat dynamic or volatile, and it is not desirable to put it on the IPT server. For example, content providers often create images of current market conditions that are replaced every few minutes or that are created in real time, such as creating images for stocks in real time.

An additional sub-function supported by the portal through client-side assembly is storage for multiple content types from remote servers. If content is owned by another system, it can be cached under circumstances, such as permission under licensing arrangements with vendors, content that is not customer related, and/or content that is not so time-sensitive as to make caching an unreasonable paradigm, such as real-time quotes. Further examples of sub-functions supported by the portal through client-side assembly include storage for multiple content types from IPT servers, dynamic gathering of multiple content types, dynamic transformation of content, dynamic creation of content, applying templates/style to content, creating and resolving "virtual" links, static and dynamic cross-linking of content, internationalization of dynamic and static content, customization of content by user/group, compositing and serving of portal content, and navigation framework and frameset for content. For each of the sub-functions mentioned, the global portal toolkit for an embodiment of the invention defines the approach and a standard set of practices, processes, and software objects by which these functions are fulfilled.

Content types supported by the portal for an embodiment of the present invention include, for example, static-file-based HTML content resident on a portal file system, parameterized content stored in the database in normalized RDBMS data structures, static-file-based XML content resident on a portal file system, static database Boot Loader Object (BLOB) based HTML content resident in a portal database, static database BLOB based XML content resident in a portal database, dynamically created content from a portal database plus a template, dynamically "gathered" HTML content from third-party servers, dynamically "gathered" XML content from third-party servers, and composite content, such as content composed of all of the above.

Regarding dynamic content for an embodiment of the invention, all dynamic content is capable of accepting language and business arguments. The content that is returned is be language sensitive. The basic design principle here is that businesses own the content and must sign off on the presentation. This allows each business to be responsible for the maintenance of its own content. A naming convention is not mandatory but is helpful, with contents containing names, such as ResourceName_Agrenina_Spanish. With respect to parameterized content, structured content is also called parameterized content. It is content that can naturally be broken up into fields, which can be displayed using a wellunderstood templating approach. An example is information in the products and services channel for an embodiment of the invention. This type of information is stored in a database rather than flat files. A content display table 150 is supplied where it is possible for users to create generic parameterized content. For example, 'products and services' and 'help desk' can fit into this structure. Further, many of the business's channels can use this table to create localized channels.

With respect to unstructured dynamic content, if a business wants to host its content in the portal database for an embodiment of the invention instead of in a file system, it gains several advantages. A business can take advantage of a number of features of the IPT 121, but remain absolutely free in terms of the presentation of its content. Such features include, for example, an ability to display the business' page using either HTTP or HTTPS, an ability to take advantage of inserting menus onto a page, an ability to insert images onto a page without having to create both HTTP and HTTPS pages, an ability to insert global phases such as the business phone number on a page and control its content throughout a set of pages, and an ability to insert the same link on many pages and control that link's behavior in one central place. In order to accomplish this goal the IPT 121 for an embodiment of the invention provides a 'GenericContentPage' module. This module has only one view and should not be placed upon a business's home page. This page provides two services. The title of the page found in the HTML head tag is taken from the title field of the display record. The entire body of the page is taken from the detail field of the same record. A content type GenericContentPage exists in the citi_content_display_types table 146. A container named the 'GenericContentPage' container is provided that is derived from the DBGenericDisplayContainer 249. The entire action of this page is to get content from the container, to put the title into the title field, and to put the detail into the detail field. If the detail contains parsed data, which it usually does, the content is parsed for menus, images, global phases, and links. A model use of this page is a privacy statement in the reference implementation.

Figure 38:
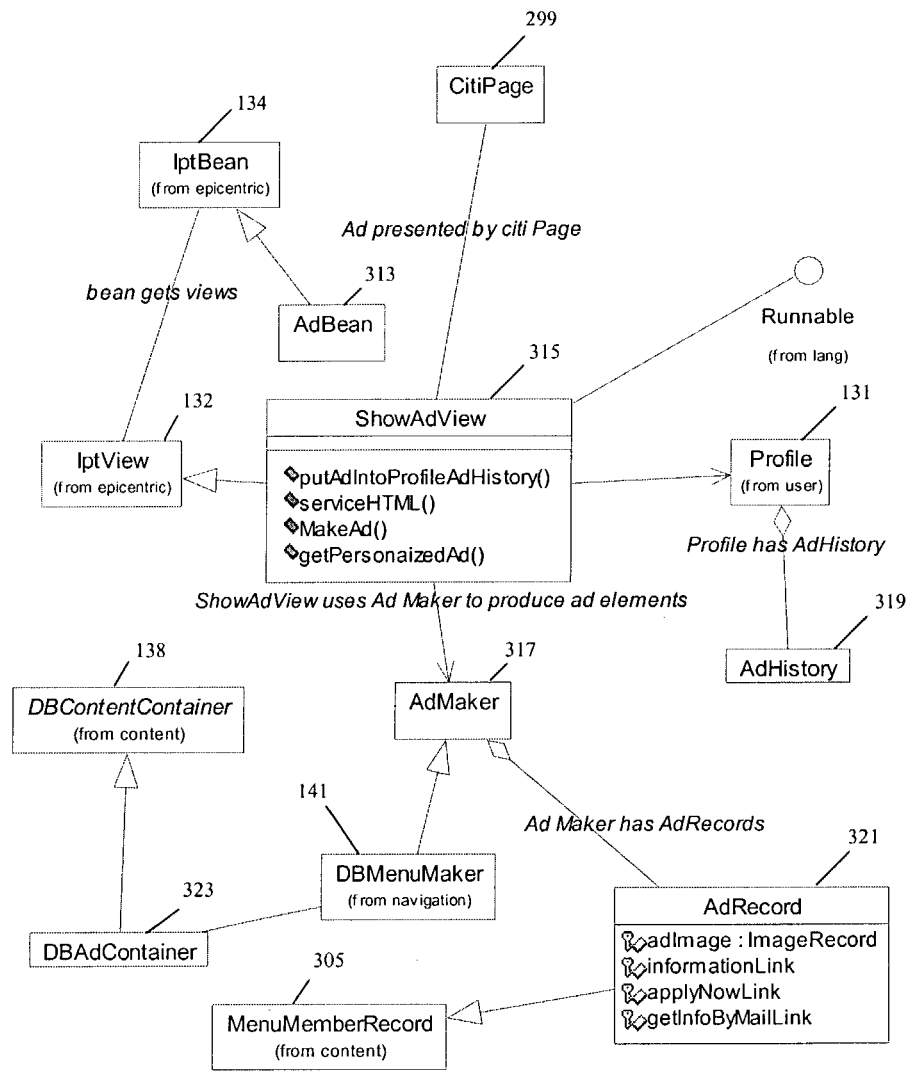
FIG. 38 is a diagram that shows an example of the object model for the advertising module for an embodiment of the invention.
Figure 39:
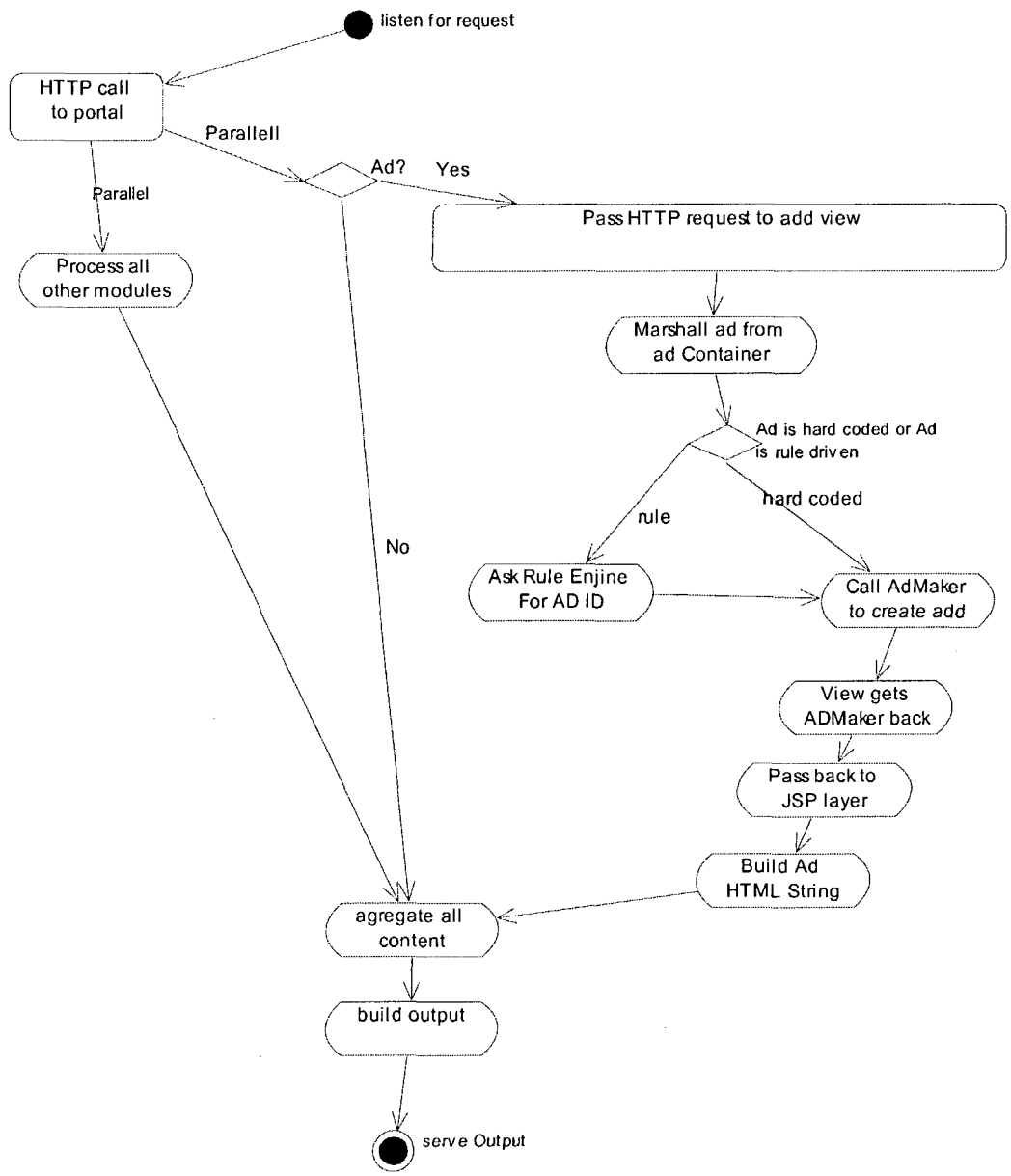
FIG. 39 is a diagram that illustrates an example of high level flow for the advertising module for an embodiment of the present invention.

The portal for an embodiment of the present invention "serves-up" both composite and non-composite content. An example of composite content is the portal "home page", which typically consists of several modules, each backed by a set of Java beans for collecting content, applying templates, and rendering the content for that module's "rectangular view port". Compositing content is accomplished, for example, with Epicentric mechanisms and follows the model-view-controller pattern, as well as Epicentric mechanisms for separating content from style and applying templates. Non-composite content includes matters, such as a single static HTML page or the results of dynamically fetched or created data from a single "module". The advertising module serves ads that are personalized, stores the history of ads served into the profile 131, and allows ads to be presented as a business would like by utilizing the XSLT transformer. FIG. 38 is a diagram that shows an example of the object model for the advertising module for an embodiment of the invention. FIG. 39 is a diagram that illustrates an example of high level flow for the advertising module for an embodiment of the present invention.

Figure 40:
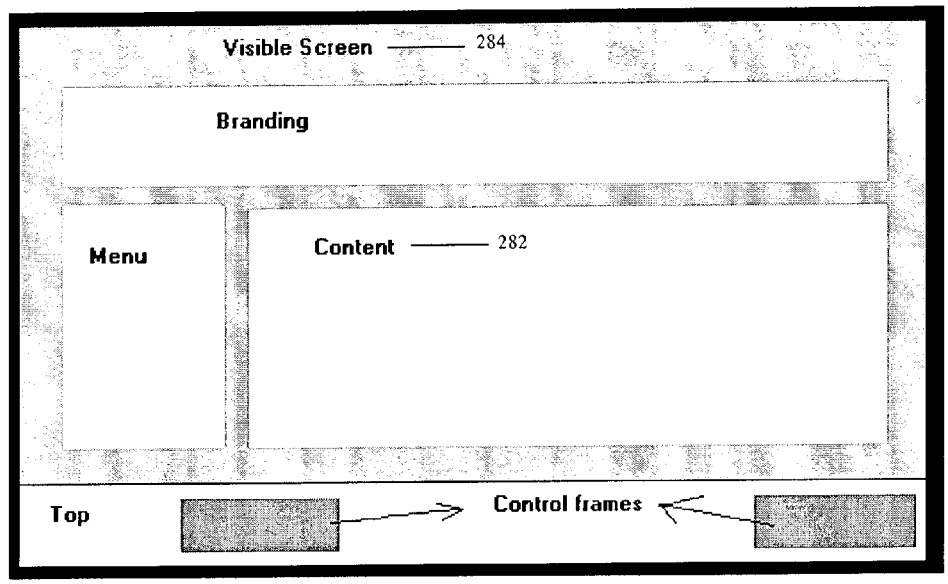
FIG. 40 shows an example of a default frameset for an embodiment of the present invention.

The navigation framework for an embodiment of the invention employs a powerful set of tools associated with the production of navigation objects without demanding a particular look and feel. An implementation creates a default information architecture, but can also create an entirely different look and feel. A high level of compositing supported by the global portal toolkit of the present invention is the overall navigation framework and frameset. The global portal toolkit is responsible for developing the high-level menu structure for the portal that establishes the various root nodes under which all content, both portal based and federated-server based, can be accessed. In order to allow the businesses the most flexibility to extend this model the MenuMaker 296 and DBMenuMaker 141 objects are created. These objects produce XML documents that can be transformed by an XSLT object that is supplied. The approach utilized for compositing at the highest level is client-side compositing through the use of a shared frameset that is shared across the portal and across the set of federated servers under the portal umbrella. The global portal toolkit defines and maintains this frameset, as well as any objects needed to ease the maintenance and abstraction of menus. FIG. 40 shows an example of a default frameset for an embodiment of the present invention. The frameset affords numerous choices for presenting content 282. For example, the default frameset can be accepted, or if there is a preference to create a one-page look, while still retaining the actual frameset, that may also be done. This can be done by replacing the visible screen 284 frame, in which case, any federated servers can still maintain a presence on the browser. This is particularly important for session management.

Figure 41:
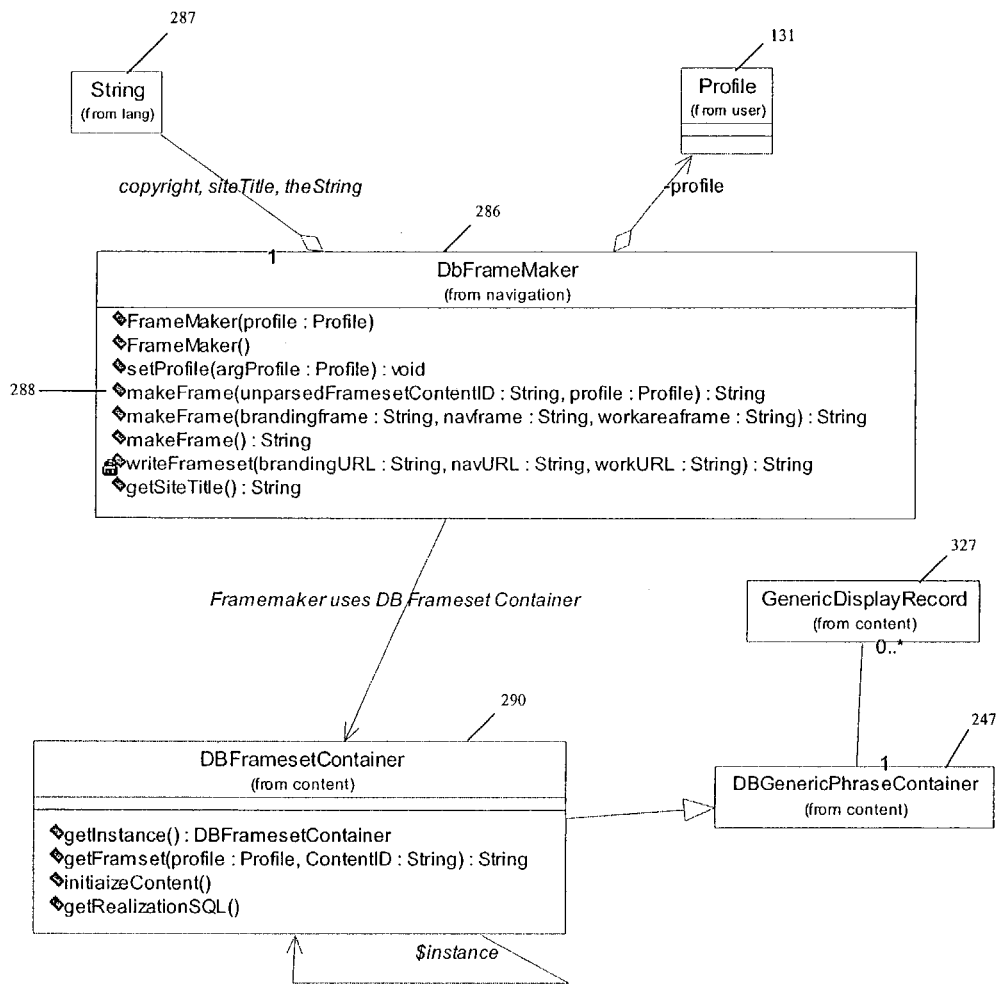
FIG. 41 is a diagram that illustrates an example of modeling for the DBFrameMaker object for an embodiment of the present invention.

Regarding dynamic framesets, in addition to supporting the default frameset, an embodiment of the invention provides an object named FrameMaker, used by Top.jsp, which is the page that paints the framesets. FIG. 41 is a diagram that illustrates an example of modeling for the DBFrameMaker 286 object for an embodiment of the present invention. In order to do this, the DBFrameMaker 286 object is used, generally, by the page top.jsp. However, it can function as a stand alone object. Top.jsp can take several arguments, such as BRAND the branding frame, Nav the navigation frame, WORK the work area, and FRAMESETID the Frameset ID to render, but if given no arguments, it uses the default frameset and the default content for the frameset. If a user uses the FRAMESET ID, as a standard approach, no other argument should be used. If a user uses the FRAMESETID, a Frame is created by calling the DBFrameMaker. makeFrame (frameSetContentID:String, profile:Profile):String 288 at runtime. The DBFrameMaker 286 allows for frames to be defined in the database and for the content IDs associated with the URLs used by these frames to be processed at runtime. For the most part, this pattern follows the normal design of the system for an embodiment of the invention. At an implementation level, the DBFramesetContainer 290 object can be derived from a FrameMaker object.

The following is an example of public operations involved in deriving from a DBFrameMaker object:
FrameMaker (profile:Profile):
   *@param profile
FrameMaker ( ):
setProfile (argProfile:Profile): void
makeFrame (frameSetContentID:String, profile:Profile): String This function takes a contentID and finds a frameset definition in the FramesetContainer 290 based on contentID and profile 131. Wherever it finds the script tag<[ContentID]%>, where Content ID is a link, it calls on DBLinkMaker 143 to get the 'raw URL', using the getRawURL call of Link Maker 140. It then surrounds the raw URL with quotation marks and replaces the script tag with the URL, @param frameSetContentID, which is the ID of the entire frameset. The frameset is then parsed by this function for additional IDs. @param profile 131 is the runtime profile.

makeFrame (brandingframe:String, navframe:String, workareaframe:String): String.
    *@param brandingframe contentID String.
    *@param navframe contentID String
    *@param workareaframe contentID String.
    *@return String
makeFrame ( ): String
    * with no parameters it looks for the default in the database in the * defaultframe function in the business_source_system table.
    *It used the DefaultBrandingFrame, DefaultNavFrame, and DefaultWorkFrame. * under the PORTAL SOURCE SYSTEM
getSiteTitle ( ): String.
    * it from the database, generic phrase siteTitle.
    *@return siteTitle String Private operations involved in deriving from a DBFrameMaker 286 object: Private Operations include, for example: writeFrameset (brandingURL:String, navURL:String, workURL:String): String
    *@param brandingURL string
    *@param navURL string *@param workURL string
    *@return String A key aspect of the navigation framework for an embodiment of the present invention resides in the methods exposed to dynamically create links and menus in the portal. The ability of the portal to support the creation and resolution of dynamic links provides many benefits. For the content developer, it provides a convenient way to "cross-reference" one piece of content to another piece of content on the site without needing to know an explicit "hard link" to the content. For the portal as a whole, it provides great flexibility in terms of where content is stored, because links can be resolved at runtime. It also facilitates certain aspects on internationalization. For example, a virtual link from one piece of content to another can be resolved at runtime to a language-specific version of a piece of content, and the text associated with a link can be localized. The ability to create menus allows each business to create an information architecture from the database rather than from the code. The toolkit produces XML in order to marshal the information about a menu. Thus, the presentation layer can offer many types of menus. For example, the menu tools support a tab look and feel, and a hierarchical tree structure. The only thing a business needs to do is to create the appropriate stylesheet to apply to the XML in the presentation tier.

An embodiment of the invention provides a robust method to create links at every level of the application and supports links both inside a page, inside an image map, and inside menus. Links are supported, for example, to outside URLs and Epicentric URLs. Link production is supported from the database, as well as from the code in a manner which is independent of the database. There are, for example, three basic use cases for the production of links, which are generalizations of the use case 'System needs to present links'. In a first such use case, the system creates links without going to the database or, for example, the Epicentric site map; in a second such use case, the system creates links to other Epicentric pages by using the Epicentric API; and in a third such use case, the system creates links by using the Links table 160 in the database. The system allows a programmer to present links in a variety of ways. The principle manner in which this flexibility is accomplished is by breaking down a URL into its smallest atomic parts. This is done at the persistent level by use of the data base schema; this is done at the runtime level by use of the URLRecordObject.

Figure 42:
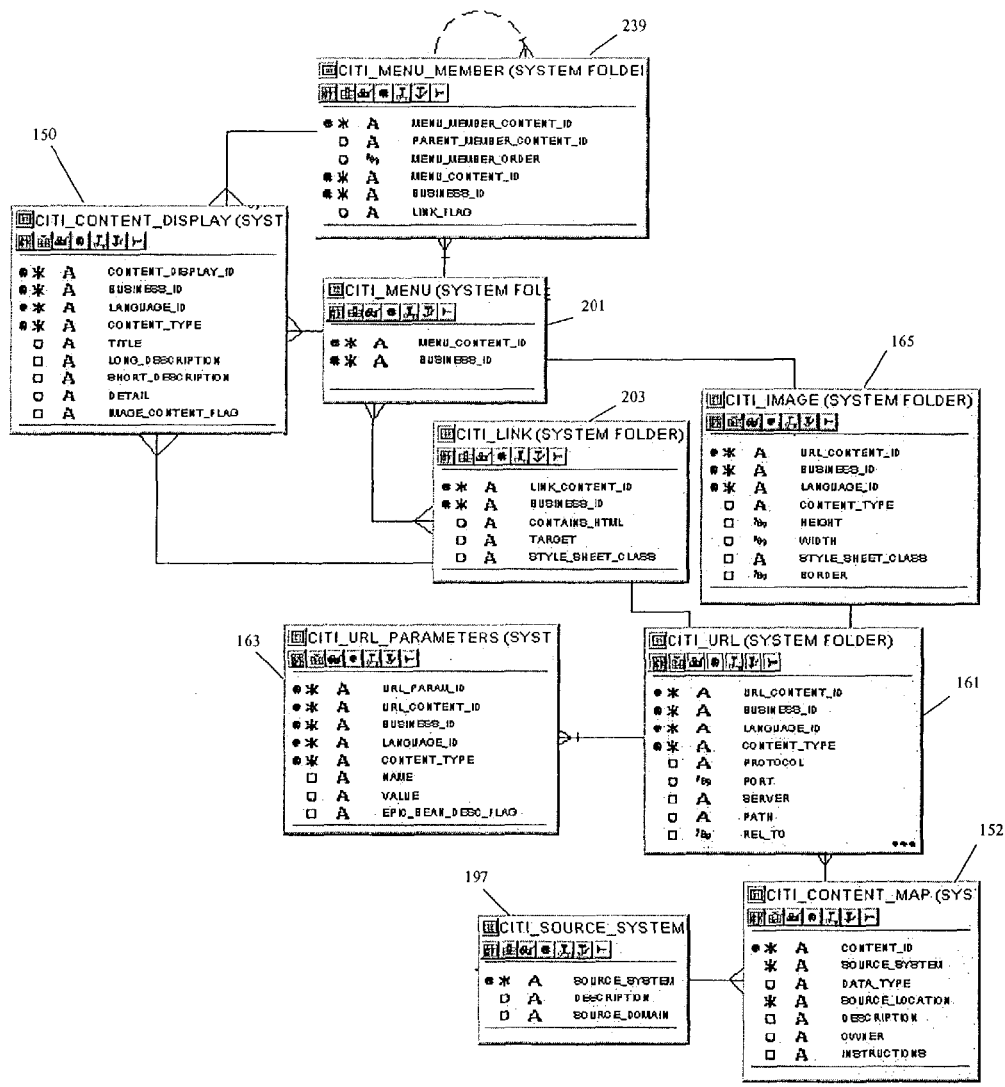
FIG. 42 is a flow chart which shows an example of use of the database to produce links for an embodiment of the present invention.

The most robust solution available to a programmer in an embodiment of the invention is to use the database in order to produce links. Using this solution, the language problems can be solved in accordance with the framework's language solution, and the user is allowed to link to external or internal content and target the frame of the user's choice. FIG. 42 is a flow chart which shows an example of use of the database to produce links for an embodiment of the present invention. Links and menus are supported in the database on a per business basis. Each link and menu is owned by a particular business in order to place responsibility on each business for its own content. The link table is associated with the Citi Content Display table 150 with a content type of link in each Link Record 147. The records in this table exist on a per language per business basis. Menus are composed of links and members that are not linked. The non-linked members are supported by the content display table 150 using the display type of menuMember.

Images are supported in links and menus. For each link, the descriptions for the links must be entered in the languages that are to be supported by the link. If a business only wishes to support some subset of links in a particular language, no logic is necessary to suppress those links from the speakers of an unsupported language. The links are not visible, because the records associated with displaying those links are not present, so the system does not attempt to display the link. If a business wants to support a menu in one language and not in another, the business does create content display for the menu, and the menu is unavailable. It is not necessary to customize a module, such as the products and services module, at the code level by an individual business. A hard reference is provided to the 'products' menu and a 'services' menu. Since the key of a row in this table consists of the products menu and the services menu, all a business must do is create a new record in the menu table using the content ID for the services menu that is found in the content_map table 152. The business then adds content to the channels and links them to the menu. The business must put the appropriate data into the database, as well as add them to the appropriate menu, and the products and services 103 channel will work. For each module that the is provided by IPT 121 for an embodiment of the invention, the data type field in Citi content map 152, or the Citi Content Display table 150 is a signal to the module how to create a list of appropriate links for production. As a general rule, when the content associated with a module is contained in the database, the content type field in the content display table 150 is used. If the content is contained elsewhere, such as in the local file system, the data type field in the content map 152 is used.

Figure 43:
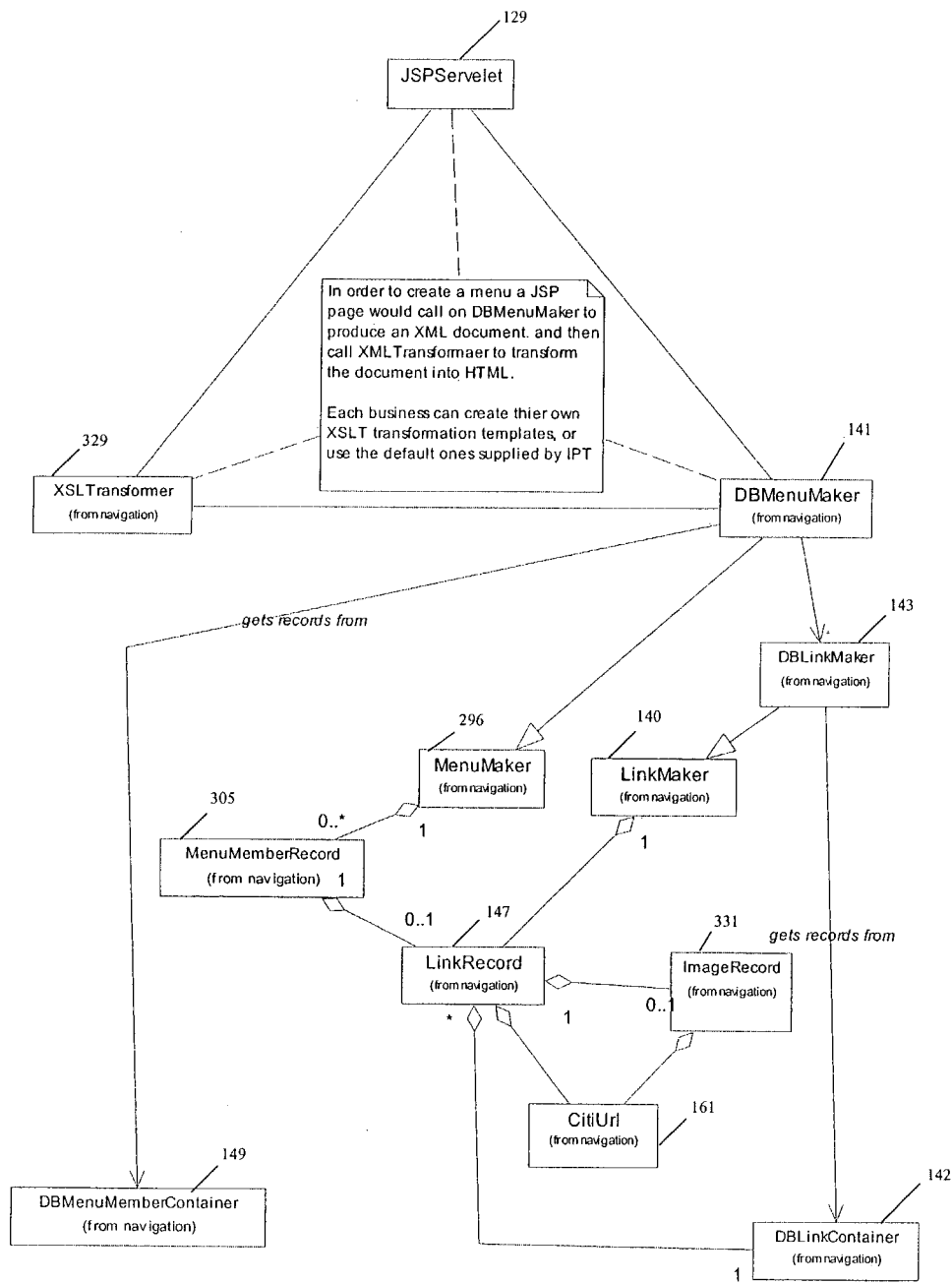
FIG. 43 is a diagram that illustrates examples of making a link at the software layer according to an embodiment of the invention.

FIG. 43 is a diagram that illustrates examples of making a link at the software layer according to an embodiment of the invention. There are, for example, three ways a deployment programmer can make a link, namely by hand, using the LinkMaker 140 object, and/or using the DBLinkMaker 143 object. A programmer can choose to make a link by hand, or use any mechanism the programmer wishes, to create a link. However, the services offered by the LinkMaker 140 object encapsulate the elements of a link neatly and help to maintain the code around a link. A link can be made using the LinkMaker 140 to set the attributes of a link and create the link by calling the makeLink function. This method is particularly useful when something about the link changes at runtime, such as a server name, some aspect of the query string, or anything else. This object is particularly useful, for example, where aspects of the link are too complex for the database model to properly create the link, such as cases where complex runtime java scripts must be generated in order for the links to work. In such cases, it may be advisable to use the DBLinkMaker 143 and then supplement its use at runtime. The LinkMaker 140 object is also particularly useful in cases where so many records must be created in a database in order to cover the cases, that the impact to the business is too great. An example is online banking system OFX messages which require each business to enter URLs for each language it supports for each message.

By far the most robust solution to the production of links provided by an embodiment of the present invention is in the DBLinkMaker 143. Essentially, all of the data required to make a link is captured in the database. A programmer merely passes a contentID and a user profile 131 to this object, and the object does the work of producing a link for the programmer. The way in which the LinkMaker 140 works is that it marshals data from tables, such as Citi_Link 203, Citi_Url 161, and Citi_display_Content 150 to create a set of link records based upon the results. The LinkMaker 140 separates the records into a set of containers, one container per language per business. It creates these containers on the fly, based upon the data that is marshaled from the database. These records are stored in the DBLinkContainer 142. When DBLinkMaker 143 is constructed, it takes the arguments of business and language associated with the user's profile 131 and the content ID that is associated with the request and goes to the right container and finds the appropriate Link Record 147. It sets all the appropriate properties into its parent classes attributes and returns the string associated with a call to the makeLink function. Again, an embodiment of the invention does not require this database solution. Just as DBLinkMaker is derived from LinkMaker, so also could another object, such as 'DomLinkMaker', be derived from LinkMaker to support an XML menu instead of a database driven menu.

In order to produce a menu according to an embodiment of the invention, the LinkMaker 140 is built upon to create a MenuMaker 296, the DBLinkMaker 143 is built upon to create a DBMenuMaker 141. Essentially, a menu consists of a group of records that are associated with links or descriptions. Menus have names, and one can link to a menu. Therefore, one menu can simply call a child menu. Menu records contain parent attributes, an ordering attribute, and a content attribute. If the content attribute is associated with a link, the menu member becomes a link. If it is associated only with a description, the menu member becomes a descriptive phrase. The presentation of menus is handled by XSLT, and menu maker produces XML. The stylesheets that instruct the software how to render the menus is kept in the database field citi_lob_content_display.detail with a content type styleSheet. In this way, each business controls each menu type's presentation. Many different menu styles can be created, including ordered lists, tgab menus, hiarchacal menus, and drop down menus just by switching stylesheets.

The architecture for entrancing the portal site for an embodiment of the present invention allows for the site to be accessed in a particular language, for the site to be accessed for a particular business, for passwords to be protected from misuse upon a login, and for delegation of labor where businesses want to do special processing to create links for particular federated services. When a user enters the portal, the user always enters inside a business and is always presented with one language. Businesses and language can share pages both inside a session and at the beginning of a session. A single page, for example, index.jsp, can be accessible for many businesses and many languages. This type of page can be a gateway to a site. In other words, a user can access these pages without any session or cookie context. A frameset is exactly like a single page. For each HTTP request, the system insures that the user is not trying to switch business or language based upon the query string or the domain/path pair.

Figure 44:
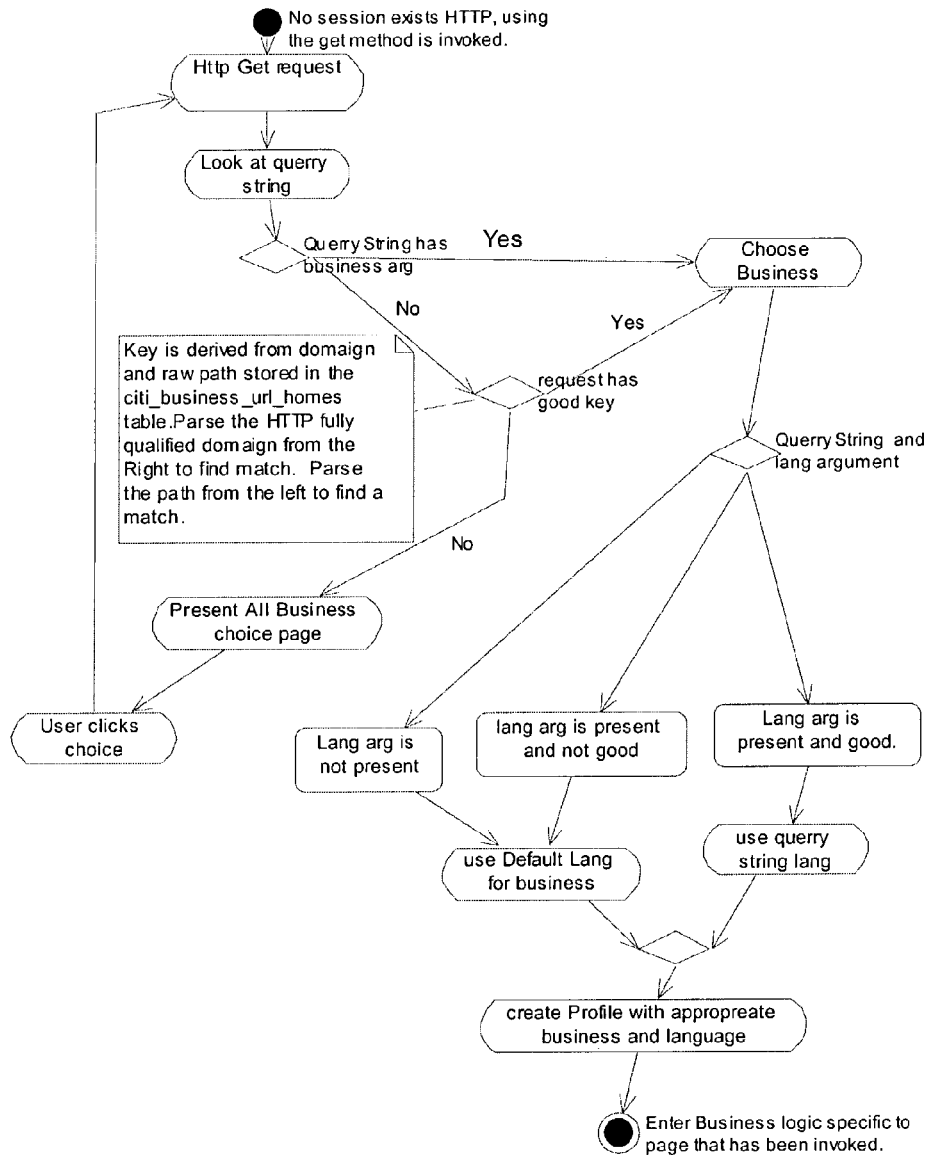
FIG. 44 is a state diagram that illustrates the processing for a user entering a site without a session for an embodiment of the present invention.

For a user without a session, when users enter the site without a session, they present a URL only. The calls to these acquiring pages always use the get method of HTTP or HTTPS. Based upon the existence of a proper key in the citi_business_url_homes table or an appropriate parameter in the URL used to start a session, an acquiring business can be determined. Cookies are not used to determine to which business a user belongs or to which language a customer belongs. If a customer enters the site without sufficient information to determine an acquiring business, a choice page is generated that links to a default front page for all businesses supported by the server. The look and feel of this page is as simple as possible. The Content_IDs of these links, along with the business and the language associated with them, are placed in the global property file where database initialization objects are stored. FIG. 44 is a state diagram that illustrates the processing for a user entering the site without a session for an embodiment of the present invention. For a user with a session, for each HTTP request, global.inc insures, either that the URL is not a legitimate entrance URL or if it is, that it belongs to the business of which the user is a member. If the URL is an entrance URL for another business, it is assumed that no business will link to another business without top. A new Profile object is created putting the user into the new business and appropriate language. The old profile is removed from the session, and the new one is added.

As a financial transaction portal, security considerations are of primary importance in an embodiment of the present invention. Financial institution businesses that use the portal need to be certain that they are being exposed to no unnecessary risk of fraud or impropriety. It is of paramount importance to protect not only against the reality of an insecure environment but also against the appearance of an insecure environment as well. Security is considered at every layer of the application. The operating system of each network node is made secure in accordance with the standards set out by financial institution teams responsible for deployment and policy. The network is also made secure. For example, data encryption between data centers is relied upon by IPT 121 in order to allow for some sensitive information to travel in the clear around the globe. The Web servers are surrounded by firewalls, isolating them from both the corporate network, and the Internet. Where filtered routers exist on the outside of that perimeter, it is permissible in accordance with the standards of particular data centers. The application layer is likewise secure. In particular, information that is intend for individual groups or users is never exposed to those who are not entitled to see it. In addition, the database layer is secure. Where sensitive data is transmitted to the database, it is transmitted in an encrypted fashion. Where sensitive information is stored in the database, it stored in an encrypted form. System passwords are protected and are generally not be allowed to exist on file systems in the clear, or if they are, those file systems are locked down so that only users who need access to these passwords can possibly get to them. The security tools keep a strict audit trail of all access to the file system by all console users.

For content management, the IPT 121 for an embodiment of the present invention integrates with a vendor, such as Interwoven, for example in connection with work flow, authoring tools, and migration of content from one environment to another. Another important aspect of content management is screen input forms that map to the portal environment. FIG. 45 shows a sample generic structured content input form for an embodiment of the present invention. The portal's businesses use the screen, and the behavior of the data submitted on that form is specified by an embodiment of the invention. Records are both created and edited and deleted. Therefore, each screen gives a method to retrieve records. Once a record has been retrieved, an option is given to either edit or delete the record. An embodiment of the invention utilizes a number of forms. In some cases, such as an Image form, content must be delivered to the web server as well as the database. In other cases, such as the HTML fragment form, content must be delivered to the portal application server, as well as the database. The forms include, for example, image creation, URL and HTML fragment creation, link creation, and registration field creation.

A key feature of an embodiment of the IPT 121 for an embodiment of the present invention allows for a 'single sign on' to a collection of federated servers. A server is in the federation if it adheres to a number of policies that are specified in the single sign-on document. A set of servers establishes a trust chain where a particular member of the federation agrees to trust another. Once a server is trusted, it can hand a user ID and a server credential to another server, whereupon the receiving server logs the user in without a password. This federation activity can take place using the web browser as the middle tier. A significant advantage of this is that no complex single sign-on server authority is established, and a light weight protocol is possible.

Figure 46:
FIG. 46 shows a sample home page for an on-line banking application with which an embodiment of the present invention supports task level integration.

FIG. 46 shows a sample home page for an on-line banking application with which an embodiment of the present invention supports task level integration. The IPT 121 for an embodiment of the invention supports task level integration, for example, with an on-line banking web site. This means that the items found in the online banking site map can be accessed from links in the portal. In a link to the online banking web site on the client side, the HREF part of the anchor tags associated with these calls uses a JavaScript routine instead of a URL. The IPT LinkMaker 140 object supports the notion that a source system can have a delegate class that is configured to do the work of manipulating a Link Record 147 after the data associated with it is marshaled from the database into the DBLinkContainer 142 object. Each source system can install its own delegate into DBLinkMaker 143. The contract between DbLinkMaker 143 and the delegate is that the delegate will do its work on the Link Record 147. This way DBMenuMaker 141 can take advantage of this paradigm as well.

Figure 47:
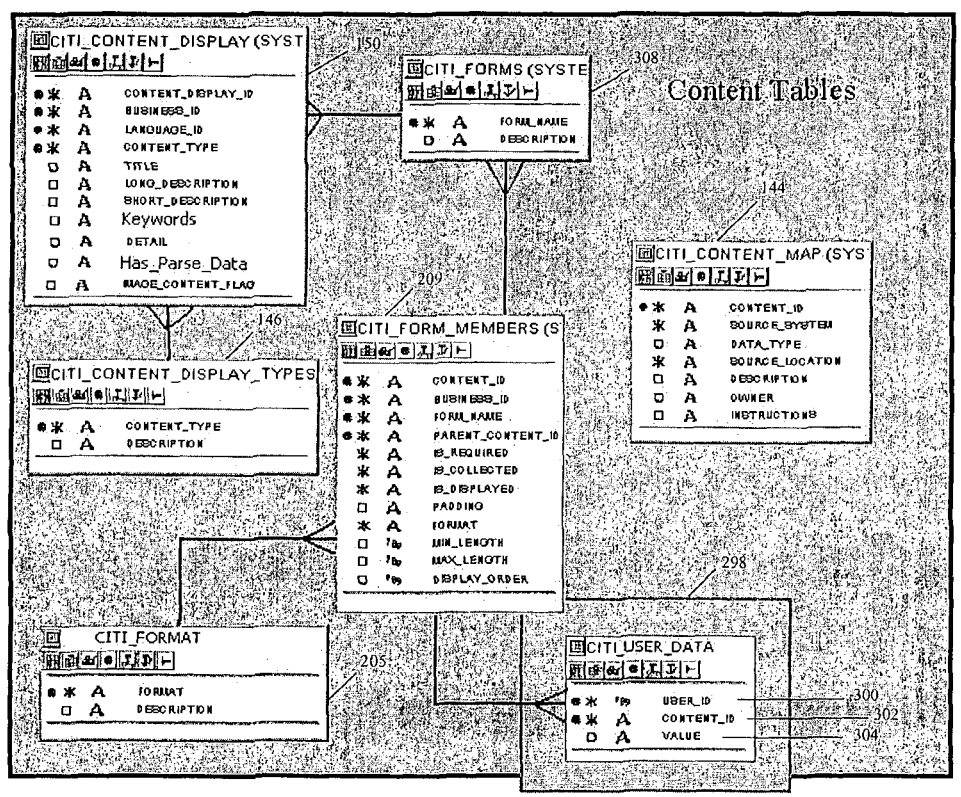
FIG. 47 shows sample content tables for portal user registration and maintenance according to an embodiment of the present invention.

FIG. 47 shows sample content tables for portal user registration and maintenance according to an embodiment of the present invention. The IPT 121 supports registration on a database level. In one aspect, each business writes business logic to process the input from the a registration module. IPT 121 provides, for example, two data structures to support forms. One such data structure is a citi_user_data table 298 that uses the user's unique ID (user ID) for example 300 and a content_ID 302 as its primary key. This table consists of a set of name value pairs 304. A piece of demographic information, such as gender is entered into this table as a record where the name was 'gender', and the value might be 'female' or 'male'. In order to create a row in this table, a content ID must be found in the citi_form_members table 209. A form member is created much the same way a menu 162 is created. A form exists in the citi_forms table 308 that has members. Forms have hierarchy, and within that hierarchy, they have order. The citi_form_member table 209 is associated with the format table 205. The IPT 121 provides software to generate HTML forms using these tables.

User types for an embodiment of the present invention include, for example, visitors, friends, and customers. Visitors are casual prospects who come to the portal to look at the most public information available. These are the people businesses wish to convert into friends or members and who do not register. Cookies may by left on the browsers of visitors, no response is made to these cookies to customize the user's experience, and no information about these users is stored in the database. Friends are registered prospects or customers who have not identified themselves as customers to the site. These users have a greater set of privileges to see content then do friends. For example, they can customize the site and have access to tools, wherein information must be stored about the customer. When these types of users are registered, demographic information about these users is collected. The toolkit for an embodiment of the invention supplies a completely generic database for storing the information collected. It is expected that each business will create a registration module of its own for validation and presentation of the data to be stored. A registration module can be created to make this process simpler. Each time a friend logs in, the last login date field is updated. Each time a Friend customizes the site, the last customization field is updated. Each time a friend customizes, the number in the number of customizations field is updated. Customers are also referred to as members and are customers, for example, of a financial institution. In order to register, it is not necessary to secure any information from a customer. When a customer registers, a user record is created in the database, and customers can customize the site as they wish.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A method for building an Internet portal, comprising:
providing a portal toolkit platform consisting at least in part of a portal application server, at least one database storing code for servicing a predetermined number of different end user human languages for each of a predetermined number of businesses, and a database links container separated into a number of containers equal to said predetermined number of languages multiplied by said predetermined number of businesses, each container containing a set of links for each of said languages for each of said businesses, wherein text related to an on-line banking service is displayed in a plurality of different end user human languages, consisting at least in part of non-english characters, while the on-line banking service is supported by a single piece of code executing at runtime that is the same for each of the businesses and for each of the different end user human languages;
providing a web server associated with the portal platform accessible by at least one end user;
allowing one of the plurality of businesses to access the portal application server and fill at least one content management template from a selection of content management templates governing content elements for the web server presented for the business by the portal application server;
presenting content governed by the template for the end user by the portal application server via the web server, said content being presented for a user in a user's language at least in part by passing a user's profile object to the database links container, wherein presenting content further comprises performing client side assembly of content consisting at least in part of displaying federated server information inside a portal frameset under an agreement with the federated server, displaying non-federated server information in a new window that is independent of a frame in which the portal is operating, presenting content from the web server inside the portal frameset under coordinated session management, and displaying images from other servers inside the portal frameset, and wherein presenting the content further comprises:

controlling an information architecture and content by altering only the content, presenting the content by a computer program without handcrafting web pages by a programmer, providing integrated single end user sign-on and session coordination, controlling the content according to at least one of end user business, end user language, and end user community, at least one of presenting content served by the portal application server and presenting content served by other servers, presenting at least one of content associated with the end user and content associated with particular pages, presenting content stored in user tables of the portal application server, presenting content associated with a description of a particular on-line banking service, and presenting content by server side assembly; and, providing a content management system consisting at least in part of a content cache, the content cache allowing content to be refreshed without impact on run time.

2. The method of claim 1, wherein the portal toolkit platform further comprises network devices, relational database management systems, and other application servers, integrated with one another via computer applications.

3. The method of claim 1, wherein the portal toolkit platform further comprises databases storing information about end users, content for multiple businesses, system configurations particular to the multiple businesses, languages within each of the multiple businesses, and hosting a database schema to service the portal toolkit platform.

4. The method of claim 1, wherein the portal toolkit platform further comprises a portal database having logical entities consisting at least in part of user tables, system tables, and content tables.

5. The method of claim 1, further comprising providing runtime support for multiple businesses users by via portal application server.

6. The method of claim 1, further comprising providing runtime support for multiple end user languages via the portal application server.

7. The method of claim 1, wherein allowing the business to access the portal application server further comprises allowing the business to create or change information architectures.

8. The method of claim 1, further comprising providing the business a default information architecture via the portal application server.

9. The method of claim 1, further comprising allowing the business to integrate an on-line financial transaction engine via the portal application server.

10. The method of claim 1, further comprising providing support for multiple businesses on the portal application server.

11. The method of claim 1, further comprising allowing the business to create or change a look and feel, a default look and feel via the portal application server.

12. The method of claim 1, further comprising providing the business an online financial account opening tool via the portal application server.

13. The method of claim 1, further comprising providing the business a site search tool via the portal application server.

14. The method of claim 1, further comprising providing the business end user customization via the portal application server.

15. The method of claim 1, further comprising providing the business and end user data aggregation via the portal application server.

16. The method of claim 1, further comprising allowing the business to manage content elements consisting of at least one of flat HTML files on the website server, flat files on the portal application server, images on the web site server, PDF files on the website server, and database content in a portal application server database via the portal application server.

17. The method of claim 1, wherein controlling the content according to end user community further comprises establishing the end user's membership in a community at least in part through stored meta-data attributes found in a profile object for the end user.

18. A system for building an Internet portal, comprising:
a portal toolkit platform consisting at least in part of a portal application server and at least one database storing code for servicing a predetermined number of different end user human languages for each of a predetermined number of businesses, and a database links container separated into a number of containers equal to said predetermined number of languages multiplied by said predetermined number of businesses, each container containing a set of links for each of said languages for each of said businesses, wherein text related to an on-line banking service is displayed in a plurality of different end user human languages, consisting at least in part of non-english characters, while the on-line banking service is supported by a single piece of code executing at runtime that is the same for each of the businesses and for each of the different end user human languages;

a web server associated with the portal platform accessible by at least one end user and adapted for allowing one of the plurality of businesses to access the portal application server and fill at least one content management template from a selection of content management templates governing content elements for the web server presented for the business by the portal application server;

wherein the portal application server is adapted for presenting content governed by the template for the end user via the web server, said content being presented for a user in a user's language at least in part by passing a user's profile object to the database links container, wherein presenting content further comprises performing client side assembly of content consisting at least in part of displaying federated server information inside a portal frameset under an agreement with the federated server, displaying non-federated server information in a new window that is independent of a frame in which the portal is operating, presenting content from the web server inside the portal frameset under coordinated session management, and displaying images from other servers inside the portal frameset, and wherein presenting the content further comprises;

controlling an information architecture and content by altering only the content.

presenting the content by a computer program without handcrafting web pages by a programmer, providing integrated single end user sign-on and session coordination.

controlling the content according to at least one of end user business, end user language, and end user community, at least one of presenting content served by the portal application server and presenting content served by other servers, presenting at least one of content associated with the end user and content associated with particular pages, presenting content stored in user tables of the portal application server, presenting content associated with a description of a particular on-line banking service, and presenting content by server side assembly; and, a content management system consisting at least in part of a content cache, the content cache allowing content to be refreshed without impact on run time.

19. The system of claim 18, wherein the portal toolkit platform further comprises network devices, relational database management systems, and other application servers, integrated with one another via computer applications.

20. The system of claim 18, wherein the portal toolkit platform further comprises databases storing information about end users, content for multiple businesses, system configurations particular to the multiple businesses, languages within each of the multiple businesses, and hosting a database schema to service the portal toolkit platform.

21. The system of claim 18, wherein the portal toolkit platform further comprises a portal database with logical entities consisting at least in part of user tables, system tables, and content tables.

22. The system of claim 18, wherein the portal application server is further adapted for providing runtime support for multiple businesses users.

23. The system of claim 18, wherein the portal application server is further adapted for providing runtime support for multiple end user languages.

24. The system of claim 18, wherein the portal application server is further adapted for allowing the business to create or change information architectures.

25. The system of claim 18, wherein the portal application server is further adapted for providing the business a default information architecture.

26. The system of claim 18, wherein the portal application server is further adapted for allowing the business to integrate an on-line financial transaction engine.

27. The system of claim 18, wherein the portal application server is further adapted for supporting multiple businesses.

28. The system of claim 18, wherein the portal application server is further adapted for allowing the business to create or change a look and feel.

29. The system of claim 18, wherein the portal application server is further adapted for providing the business a site search tool.

30. The system of claim 18, wherein the portal application server is further adapted for providing the business end user customization.

31. The system of claim 18, wherein the portal application server is further adapted for providing the business support of multiple end user client devices.

32. The system of claim 18, wherein the portal application server is further adapted for allowing the business to manage content elements consisting of at least one of flat HTML files on the website server, flat files on the portal application server, images on the web site server, PDF files on the website server, and database content in a portal application server database.

33. The system of claim 18, wherein the portal application server is further adapted for establishing the end user's membership in a community at least in part by stored meta-data attributes found in a profile object for the end user.

34. The system of claim 18, wherein the portal application server is further adapted for establishing the end user's membership in a community at least in part by gathering information from other systems that are integrated.

* * * * *